United States Patent
Verheyen

(10) Patent No.: US 12,529,096 B2
(45) Date of Patent: Jan. 20, 2026

(54) STABILIZATION AND/OR COMPACTION OF NUCLEIC ACID STRUCTURES

(71) Applicant: 10x Genomics, Inc., Pleasanton, CA (US)

(72) Inventor: Toon Verheyen, Solna (SE)

(73) Assignee: 10X GENOMICS, INC., Pleasanton, CA (US)

( * ) Notice: Subject to any disclaimer, the term of this patent is extended or adjusted under 35 U.S.C. 154(b) by 634 days.

(21) Appl. No.: 17/816,984

(22) Filed: Aug. 2, 2022

(65) Prior Publication Data

US 2023/0039148 A1   Feb. 9, 2023

Related U.S. Application Data

(60) Provisional application No. 63/228,857, filed on Aug. 3, 2021.

(51) Int. Cl.
 *C12Q 1/68* (2018.01)
 *C12Q 1/6853* (2018.01)
 *C12Q 1/6806* (2018.01)
 *C12Q 1/6841* (2018.01)

(52) U.S. Cl.
 CPC ......... *C12Q 1/6853* (2013.01); *C12Q 1/6806* (2013.01); *C12Q 1/6841* (2013.01)

(58) Field of Classification Search
 None
 See application file for complete search history.

(56) References Cited

U.S. PATENT DOCUMENTS

| | | | |
|---|---|---|---|
| 4,318,846 | A | 3/1982 | Khanna et al. |
| 4,757,141 | A | 7/1988 | Fung et al. |
| 4,849,336 | A | 7/1989 | Miyoshi et al. |
| 5,066,580 | A | 11/1991 | Lee |
| 5,091,519 | A | 2/1992 | Cruickshank |
| 5,151,507 | A | 9/1992 | Hobbs et al. |
| 5,168,049 | A | 12/1992 | Meade et al. |
| 5,188,934 | A | 2/1993 | Menchen |
| 5,198,537 | A | 3/1993 | Huber et al. |
| 5,344,757 | A | 9/1994 | Holtke et al. |

(Continued)

FOREIGN PATENT DOCUMENTS

| | | |
|---|---|---|
| WO | WO 1991/017160 | 11/1991 |
| WO | WO 2017/143155 | 8/2017 |

(Continued)

OTHER PUBLICATIONS

Zhong et al., "Visualization of oligonucleotide probes and point mutations in interphase nuclei and DNA fibers using rolling circle DNA amplification," Proc Natl Acad Sci USA. (2001) 98(7):3940-5.

(Continued)

*Primary Examiner* — Aaron A Priest
(74) *Attorney, Agent, or Firm* — MORRISON & FOERSTER LLP

(57) ABSTRACT

The present disclosure in some aspects relates to methods and compositions for accurately detecting and quantifying multiple analytes present in a biological sample. In some aspects, the methods and compositions provided herein address one or more issues associated with the stability and/or size of nucleic acid structures such as rolling circle amplification products in the biological sample.

20 Claims, 5 Drawing Sheets

Biotin dNTP (e.g., biotin-dUTP or biotin-14-dATP)

Streptavidin

Addition of streptavidin leads to binding of biotin and compaction of the RCA product

(56) References Cited

U.S. PATENT DOCUMENTS

| | | |
|---|---|---|
| 5,354,657 A | 10/1994 | Boehringer et al. |
| 5,366,860 A | 11/1994 | Bergot et al. |
| 5,599,675 A | 2/1997 | Brenner |
| 5,635,352 A | 6/1997 | Urdea et al. |
| 5,688,648 A | 11/1997 | Mathies |
| 5,695,940 A | 12/1997 | Drmanac et al. |
| 5,702,888 A | 12/1997 | Holtke et al. |
| 5,750,341 A | 5/1998 | Macevicz |
| 5,800,996 A | 9/1998 | Lee et al. |
| 5,847,162 A | 12/1998 | Lee et al. |
| 5,990,479 A | 11/1999 | Weiss et al. |
| 6,022,951 A | 2/2000 | Sano et al. |
| 6,054,274 A | 4/2000 | Sampson et al. |
| 6,103,493 A | 8/2000 | Skerra et al. |
| 6,156,493 A | 12/2000 | Stayton |
| 6,172,218 B1 | 1/2001 | Brenner |
| 6,207,392 B1 | 3/2001 | Weiss et al. |
| 6,251,303 B1 | 6/2001 | Bawendi et al. |
| 6,265,552 B1 | 7/2001 | Schatz |
| 6,291,187 B1 | 9/2001 | Kingsmore et al. |
| 6,306,597 B1 | 10/2001 | Macevicz |
| 6,319,426 B1 | 11/2001 | Bawendi et al. |
| 6,322,901 B1 | 11/2001 | Bawendi et al. |
| 6,323,009 B1 | 11/2001 | Lasken et al. |
| 6,344,329 B1 | 2/2002 | Lizardi et al. |
| 6,368,801 B1 | 4/2002 | Faruqi |
| 6,368,813 B1 | 4/2002 | Reznik et al. |
| 6,391,937 B1 | 5/2002 | Beuhler et al. |
| 6,423,551 B1 | 7/2002 | Weiss et al. |
| 6,426,513 B1 | 7/2002 | Bawendi et al. |
| 6,444,143 B2 | 9/2002 | Bawendi et al. |
| 6,534,266 B1 | 3/2003 | Singer |
| 6,576,291 B2 | 6/2003 | Bawendi et al. |
| 6,969,488 B2 | 11/2005 | Bridgham et al. |
| 7,057,026 B2 | 6/2006 | Barnes et al. |
| 7,255,994 B2 | 8/2007 | Lao |
| 7,264,929 B2 | 9/2007 | Rothberg et al. |
| 7,345,159 B2 | 3/2008 | Ju et al. |
| 7,473,767 B2 | 1/2009 | Dimitrov |
| 7,534,991 B2 | 5/2009 | Miller et al. |
| 7,544,794 B1 | 6/2009 | Benner |
| 7,555,155 B2 | 6/2009 | Levenson et al. |
| 7,566,537 B2 | 7/2009 | Balasubramanian et al. |
| 7,632,641 B2 | 12/2009 | Dirks et al. |
| 7,655,898 B2 | 2/2010 | Miller |
| 7,721,721 B1 | 5/2010 | Kronengold et al. |
| 7,893,227 B2 | 2/2011 | Wu et al. |
| 7,910,304 B2 | 3/2011 | Drmanac |
| 7,941,279 B2 | 5/2011 | Hwang et al. |
| 7,989,166 B2 | 8/2011 | Koch et al. |
| 8,124,751 B2 | 2/2012 | Pierce et al. |
| 8,199,999 B2 | 6/2012 | Hoyt et al. |
| 8,268,554 B2 | 9/2012 | Schallmeiner |
| 8,330,087 B2 | 12/2012 | Domenicali |
| 8,415,102 B2 | 4/2013 | Geiss et al. |
| 8,431,691 B2 | 4/2013 | McKernan et al. |
| 8,460,865 B2 | 6/2013 | Chee et al. |
| 8,462,981 B2 | 6/2013 | Determan et al. |
| 8,481,258 B2 | 7/2013 | Church et al. |
| 8,519,115 B2 | 8/2013 | Webster et al. |
| 8,551,710 B2 | 10/2013 | Bernitz et al. |
| 8,632,975 B2 | 1/2014 | Vander Horn et al. |
| 8,658,361 B2 | 2/2014 | Wu et al. |
| 8,771,950 B2 | 7/2014 | Church et al. |
| 8,986,926 B2 | 3/2015 | Ferree et al. |
| 9,201,063 B2 | 12/2015 | Sood et al. |
| 9,217,178 B2 | 12/2015 | Fedurco et al. |
| 9,273,349 B2 | 3/2016 | Nguyen et al. |
| 9,371,563 B2 | 6/2016 | Geiss et al. |
| 9,371,598 B2 | 6/2016 | Chee |
| 9,376,717 B2 | 6/2016 | Gao et al. |
| 9,512,422 B2 | 12/2016 | Barnard et al. |
| 9,541,504 B2 | 1/2017 | Hoyt |
| 9,551,032 B2 | 1/2017 | Landegren et al. |
| 9,624,538 B2 | 4/2017 | Church et al. |
| 9,650,406 B2 | 5/2017 | Zhou et al. |
| 9,714,446 B2 | 7/2017 | Webster et al. |
| 9,714,937 B2 | 7/2017 | Dunaway |
| 9,727,810 B2 | 8/2017 | Fodor et al. |
| 9,778,155 B2 | 10/2017 | Gradinaru et al. |
| 9,783,841 B2 | 10/2017 | Nolan et al. |
| 9,889,422 B2 | 2/2018 | Smith et al. |
| 9,909,167 B2 | 3/2018 | Samusik et al. |
| 10,032,064 B2 | 7/2018 | Hoyt |
| 10,059,990 B2 | 8/2018 | Boyden et al. |
| 10,126,242 B2 | 11/2018 | Miller et al. |
| 10,138,509 B2 | 11/2018 | Church et al. |
| 10,179,932 B2 | 1/2019 | Church et al. |
| 10,227,639 B2 | 3/2019 | Levner et al. |
| 10,246,700 B2 | 4/2019 | Dunaway et al. |
| 10,266,888 B2 | 4/2019 | Daugharthy et al. |
| 10,267,808 B2 | 4/2019 | Cai |
| 10,309,879 B2 | 6/2019 | Chen et al. |
| 10,317,321 B2 | 6/2019 | Tillberg et al. |
| 10,364,457 B2 | 7/2019 | Wassie et al. |
| 10,370,698 B2 | 8/2019 | Nolan et al. |
| 10,415,080 B2 | 9/2019 | Dunaway et al. |
| 10,457,980 B2 | 10/2019 | Cai et al. |
| 10,465,235 B2 | 11/2019 | Gullberg et al. |
| 10,494,662 B2 | 12/2019 | Church et al. |
| 10,495,554 B2 | 12/2019 | Deisseroth et al. |
| 10,501,777 B2 | 12/2019 | Beechem et al. |
| 10,501,791 B2 | 12/2019 | Church et al. |
| 10,510,435 B2 | 12/2019 | Cai et al. |
| 10,526,649 B2 | 1/2020 | Chen et al. |
| 10,545,075 B2 | 1/2020 | Deisseroth et al. |
| 10,550,429 B2 | 2/2020 | Harada et al. |
| 10,580,128 B2 | 3/2020 | Miller |
| 10,640,816 B2 | 5/2020 | Beechem et al. |
| 10,640,826 B2 | 5/2020 | Church et al. |
| 10,669,569 B2 | 6/2020 | Gullberg et al. |
| 10,746,981 B2 | 8/2020 | Tomer et al. |
| 10,774,372 B2 | 9/2020 | Chee et al. |
| 10,774,374 B2 | 9/2020 | Frisén et al. |
| 10,794,802 B2 | 10/2020 | Gradinaru et al. |
| 10,802,262 B2 | 10/2020 | Tomer et al. |
| 10,815,519 B2 | 10/2020 | Husain et al. |
| 10,829,814 B2 | 11/2020 | Fan et al. |
| 10,837,879 B2 * | 11/2020 | Burns ...................... G01N 1/30 |
| 10,844,426 B2 | 11/2020 | Daugharthy et al. |
| 10,858,698 B2 | 12/2020 | Church et al. |
| 10,872,679 B2 | 12/2020 | Cai et al. |
| 10,964,001 B2 | 3/2021 | Miller |
| 11,078,520 B2 | 8/2021 | Church et al. |
| 11,118,220 B2 | 9/2021 | Daugharthy et al. |
| 11,174,281 B1 | 11/2021 | Graham et al. |
| 11,287,422 B2 | 3/2022 | Previte et al. |
| 11,434,525 B2 | 9/2022 | Glezer |
| 11,459,603 B2 | 10/2022 | Tyagi et al. |
| 11,499,185 B2 | 11/2022 | Vijayan et al. |
| 11,643,679 B2 | 5/2023 | Glezer et al. |
| 11,999,999 B2 | 6/2024 | Ju et al. |
| 2002/0045045 A1 | 4/2002 | Adams et al. |
| 2003/0013091 A1 | 1/2003 | Dimitrov |
| 2003/0017264 A1 | 1/2003 | Treadway et al. |
| 2003/0235849 A1 * | 12/2003 | Lizardi ................ C12Q 1/6862 |
| | | 435/6.12 |
| 2005/0100900 A1 | 5/2005 | Kawashima et al. |
| 2006/0188901 A1 | 8/2006 | Barnes et al. |
| 2006/0234261 A1 | 10/2006 | Pierce et al. |
| 2006/0240439 A1 | 10/2006 | Smith et al. |
| 2006/0281109 A1 | 12/2006 | Barr et al. |
| 2007/0166705 A1 | 7/2007 | Milton et al. |
| 2007/0166708 A1 | 7/2007 | Dimitrov et al. |
| 2008/0242560 A1 * | 10/2008 | Gunderson ............ C12Q 1/682 |
| | | 506/26 |
| 2009/0118128 A1 | 5/2009 | Liu et al. |
| 2010/0015607 A1 | 1/2010 | Geiss et al. |
| 2010/0047924 A1 | 2/2010 | Webster et al. |
| 2010/0055733 A1 | 3/2010 | Lutolf et al. |
| 2010/0112710 A1 | 5/2010 | Geiss et al. |
| 2010/0261026 A1 | 10/2010 | Ferree et al. |
| 2010/0262374 A1 | 10/2010 | Hwang et al. |

(56) References Cited

U.S. PATENT DOCUMENTS

| | | | |
|---|---|---|---|
| 2010/0286290 A1* | 11/2010 | Lohmann | C12Q 1/6844 514/789 |
| 2011/0059865 A1 | 3/2011 | Smith et al. | |
| 2011/0223585 A1 | 9/2011 | Gullberg et al. | |
| 2012/0270305 A1 | 10/2012 | Reed et al. | |
| 2013/0079232 A1 | 3/2013 | Kain et al. | |
| 2013/0260372 A1 | 10/2013 | Buermann et al. | |
| 2013/0288249 A1 | 10/2013 | Gullbert | |
| 2013/0323729 A1 | 12/2013 | Landegren et al. | |
| 2014/0194311 A1 | 7/2014 | Gullberg et al. | |
| 2014/0371088 A1 | 12/2014 | Webster | |
| 2015/0018228 A1* | 1/2015 | Koch | C12Q 1/00 435/6.15 |
| 2016/0024555 A1 | 1/2016 | Church et al. | |
| 2016/0108458 A1 | 4/2016 | Frei et al. | |
| 2016/0305856 A1 | 10/2016 | Boyden et al. | |
| 2016/0369329 A1 | 12/2016 | Cai et al. | |
| 2016/0376642 A1 | 12/2016 | Landegren et al. | |
| 2017/0009278 A1 | 1/2017 | Söderberg et al. | |
| 2017/0081489 A1 | 3/2017 | Rodriques et al. | |
| 2017/0101672 A1 | 4/2017 | Luo et al. | |
| 2017/0219465 A1 | 8/2017 | Desseroth et al. | |
| 2017/0220733 A1 | 8/2017 | Zhuang et al. | |
| 2017/0253918 A1 | 9/2017 | Kohman | |
| 2018/0052081 A1 | 2/2018 | Kohman | |
| 2018/0080876 A1 | 3/2018 | Rockel et al. | |
| 2018/0208967 A1 | 7/2018 | Larman et al. | |
| 2018/0237864 A1 | 8/2018 | Imler et al. | |
| 2018/0251833 A1 | 9/2018 | Daugharthy et al. | |
| 2018/0320226 A1 | 11/2018 | Church et al. | |
| 2018/0327818 A1 | 11/2018 | Landegren et al. | |
| 2019/0017106 A1 | 1/2019 | Frisen et al. | |
| 2019/0032121 A1 | 1/2019 | Daugharthy et al. | |
| 2019/0032128 A1 | 1/2019 | Chen et al. | |
| 2019/0055594 A1 | 2/2019 | Samusik et al. | |
| 2019/0106733 A1 | 4/2019 | Kishi et al. | |
| 2019/0112599 A1 | 4/2019 | Church et al. | |
| 2019/0119735 A1 | 4/2019 | Deisseroth et al. | |
| 2019/0144940 A1 | 5/2019 | Landegren et al. | |
| 2019/0155835 A1 | 5/2019 | Daugharthy et al. | |
| 2019/0161796 A1 | 5/2019 | Hauling et al. | |
| 2019/0177718 A1 | 6/2019 | Church et al. | |
| 2019/0177800 A1 | 6/2019 | Boutet et al. | |
| 2019/0194709 A1 | 6/2019 | Church et al. | |
| 2019/0203269 A1* | 7/2019 | Zingg | C12Q 1/6876 |
| 2019/0218608 A1 | 7/2019 | Daugharthy et al. | |
| 2019/0249248 A1 | 8/2019 | Beechem et al. | |
| 2019/0264270 A1 | 8/2019 | Zhuang et al. | |
| 2019/0271028 A1 | 9/2019 | Khafizov et al. | |
| 2019/0276881 A1 | 9/2019 | Zhuang et al. | |
| 2019/0339203 A1 | 11/2019 | Miller et al. | |
| 2019/0367969 A1 | 12/2019 | Belhocine | |
| 2020/0010891 A1 | 1/2020 | Beechem et al. | |
| 2020/0071751 A1 | 3/2020 | Daugharthy et al. | |
| 2020/0123597 A1 | 4/2020 | Daniel | |
| 2020/0140920 A1 | 5/2020 | Pierce et al. | |
| 2020/0224243 A1 | 7/2020 | Desai et al. | |
| 2020/0224244 A1 | 7/2020 | Nilsson et al. | |
| 2020/0239946 A1 | 7/2020 | Dewal | |
| 2020/0354774 A1 | 11/2020 | Church et al. | |
| 2020/0354782 A1 | 11/2020 | Dewal | |
| 2020/0362398 A1 | 11/2020 | Kishi et al. | |
| 2020/0393343 A1 | 12/2020 | Kennedy-Darling et al. | |
| 2020/0399689 A1 | 12/2020 | Luo et al. | |
| 2021/0017587 A1 | 1/2021 | Cai et al. | |
| 2021/0115504 A1 | 4/2021 | Cai et al. | |
| 2021/0198723 A1 | 7/2021 | Kuhnemund et al. | |
| 2021/0238662 A1 | 8/2021 | Bava | |
| 2021/0238674 A1 | 8/2021 | Bava | |
| 2021/0254140 A1 | 8/2021 | Stahl et al. | |
| 2021/0262018 A1 | 8/2021 | Bava et al. | |
| 2021/0277460 A1 | 9/2021 | Bava | |
| 2021/0340618 A1 | 11/2021 | Kuhnemund et al. | |
| 2021/0340621 A1 | 11/2021 | Daugharthy et al. | |
| 2021/0388423 A1 | 12/2021 | Bava et al. | |
| 2021/0388424 A1 | 12/2021 | Bava | |
| 2022/0010358 A1 | 1/2022 | Kuhnemund et al. | |
| 2022/0049302 A1 | 2/2022 | Daugharthy et al. | |
| 2022/0049303 A1 | 2/2022 | Busby et al. | |
| 2022/0064697 A1 | 3/2022 | Zhuang et al. | |
| 2022/0083832 A1 | 3/2022 | Shah | |
| 2022/0084628 A1 | 3/2022 | Shah | |
| 2022/0084629 A1 | 3/2022 | Shah | |
| 2022/0136049 A1 | 5/2022 | Bava et al. | |
| 2022/0186300 A1 | 6/2022 | Bava | |
| 2022/0195498 A1 | 6/2022 | Kuhnemund et al. | |
| 2022/0213529 A1 | 7/2022 | Kuhnemund et al. | |
| 2022/0228200 A1 | 7/2022 | Bava | |
| 2022/0235403 A1 | 7/2022 | Costa | |
| 2022/0282306 A1 | 9/2022 | Bava et al. | |
| 2022/0282316 A1 | 9/2022 | Bava | |
| 2022/0282319 A1 | 9/2022 | Verheyen | |
| 2022/0372570 A1 | 11/2022 | Costa | |
| 2022/0380838 A1 | 12/2022 | Kuhnemund et al. | |
| 2022/0403458 A1 | 12/2022 | Bava | |
| 2023/0002808 A1 | 1/2023 | Mignardi | |
| 2023/0012607 A1 | 1/2023 | Kuhnemund et al. | |
| 2023/0013775 A1 | 1/2023 | Chen et al. | |
| 2023/0015226 A1 | 1/2023 | Chen et al. | |
| 2023/0026886 A1 | 1/2023 | Chen | |
| 2023/0031305 A1 | 2/2023 | Neuta et al. | |
| 2023/0031996 A1 | 2/2023 | Neuta et al. | |
| 2023/0035685 A1 | 2/2023 | Neuta et al. | |
| 2023/0037182 A1 | 2/2023 | Bava et al. | |
| 2023/0039148 A1 | 2/2023 | Verheyen | |
| 2023/0041485 A1 | 2/2023 | Neuta et al. | |
| 2023/0044650 A1 | 2/2023 | Dockter | |
| 2023/0057571 A1 | 2/2023 | Costa et al. | |
| 2023/0061542 A1 | 3/2023 | Kuhnemund | |
| 2023/0084407 A1 | 3/2023 | Neuta et al. | |
| 2023/0159997 A1 | 5/2023 | Belhocine et al. | |
| 2023/0160794 A1 | 5/2023 | Dockter et al. | |
| 2023/0183787 A1 | 6/2023 | Bava et al. | |
| 2023/0242974 A1 | 8/2023 | Costa et al. | |
| 2023/0279465 A1 | 9/2023 | He et al. | |
| 2023/0279475 A1 | 9/2023 | Kuhnemund et al. | |
| 2023/0279480 A1 | 9/2023 | Kuhnemund | |
| 2023/0287478 A1 | 9/2023 | Bava | |
| 2023/0314327 A1 | 10/2023 | Hoffman | |
| 2023/0314328 A1 | 10/2023 | Costa | |
| 2023/0323427 A1 | 10/2023 | Schnall-Levin | |
| 2023/0323430 A1 | 10/2023 | Shastry | |
| 2023/0323437 A1 | 10/2023 | Chen et al. | |
| 2023/0374573 A1 | 11/2023 | Qian et al. | |
| 2023/0374580 A1 | 11/2023 | Costa | |
| 2023/0416821 A1 | 12/2023 | Bava et al. | |
| 2024/0002902 A1 | 1/2024 | Jakobsen et al. | |
| 2024/0026426 A1 | 1/2024 | Bava | |
| 2024/0026427 A1 | 1/2024 | Kuhnemund et al. | |
| 2024/0026439 A1 | 1/2024 | Sasaki | |
| 2024/0026448 A1 | 1/2024 | Costa | |
| 2024/0035070 A1 | 2/2024 | Christopherson | |
| 2024/0035071 A1 | 2/2024 | Delaney et al. | |
| 2024/0035072 A1 | 2/2024 | Christopherson | |
| 2024/0043910 A1 | 2/2024 | Shastry | |
| 2024/0043914 A1 | 2/2024 | Chen et al. | |
| 2024/0060119 A1 | 2/2024 | Bava | |
| 2024/0084378 A1 | 3/2024 | Marks et al. | |
| 2024/0158842 A1* | 5/2024 | Neumann | C12Q 1/6858 |

FOREIGN PATENT DOCUMENTS

| | | |
|---|---|---|
| WO | WO 2018/026873 | 2/2018 |
| WO | WO 2019/199579 | 10/2019 |
| WO | WO 2020/076976 | 4/2020 |
| WO | WO 2020/076979 | 4/2020 |
| WO | WO 2020/096687 | 5/2020 |
| WO | WO 2020/099640 | 5/2020 |
| WO | WO 2020/117914 | 6/2020 |
| WO | WO 2020/123316 | 6/2020 |
| WO | WO 2020/123742 | 6/2020 |
| WO | WO 2020/142490 | 7/2020 |
| WO | WO 2020/240025 | 12/2020 |
| WO | WO 2020/254519 | 12/2020 |

(56) References Cited

FOREIGN PATENT DOCUMENTS

| WO | WO 2021/123282 | 6/2021 |
|---|---|---|
| WO | WO 2021/123286 | 6/2021 |
| WO | WO 2021/138676 | 7/2021 |
| WO | WO 2021/155063 | 8/2021 |
| WO | WO 2021/168326 | 8/2021 |
| WO | WO 2023/108139 | 6/2023 |
| WO | WO 2023/141476 | 7/2023 |
| WO | WO 2023/172915 | 9/2023 |
| WO | WO 2023/192302 | 10/2023 |

OTHER PUBLICATIONS

Allawi et al., "Thermodynamics and NMR of internal G.T mismatches in DNA," Biochemistry, (1997) 36:10581-94.

Archer et al., "Selective and flexible depletion of problematic sequences from RNA-seq libraries at the cDNA stage," BMC Genomics. (2014) 15(1):401.

Baner et al., "Signal amplification of padlock probes by rolling circle replication," Nucleic Acids Res. (1998) 26(22):5073-5078.

Bibikova et al., "Quantitative gene expression profiling in formalin-fixed, paraffin-embedded tissues using universal bead arrays," Am J Pathol. Nov. 2004; 165(5):1799-807.

Bolognesi et al., "Multiplex Staining by Sequential Immunostaining and Antibody Removal on Routine Tissue Sections," J. Histochem. Cytochem. (2017); 65(8): 431-444.

Capodieci et al., "Gene expression profiling in single cells within tissue," Nat Methods. (2005) 2(9): 663-5.

Chemeris et al., "Real-time hybridization chain reaction," Dokl Biochem Biophys. (2008) 419: 53-55.

Chen et al., "Nanoscale imaging of RNA with expansion microscopy," Nat Methods. (2016) 13:679-684.

Chen et al., "RNA imaging. Spatially resolved, highly multiplexed RNA profiling in single cells," Science. (2015) 348(6233): aaa6090. 16 pgs.

Chen et al., "Expansion Microscopy," Science (2015) 347(6221):543-548.

Choi et al., "Programmable in situ amplification for multiplexed imaging of mRNA expression," Nat Biotechnol. (2010) 28(11): 1208-1212.

Conze et al., "Single molecule analysis of combinatorial splicing," Nucleic Acids Res. (2010) 38(16): e163.

Dean et al., "Rapid Amplification Of Plasmid And Phage DNA Using Phi29 DNA Polymerase And Multiply-Primed Rolling Circle Amplification," Genome Research (2001) 11:1095-1099.

Dirks et al., "Triggered amplification by hybridization chain reaction," Proc Natl Acad Sci USA. (2004) 101(43): 15275-15278.

Eng et al., "Transcriptome-scale super-resolved imaging in tissues by RNA seqFISH," Nature. (2019) 568(7751): 235-239.

Fairhead et al., "Plug-and-play pairing via defined divalent streptavidins," J Mol Biol. (2014) 426(1):199-214.

Fang et al., "Fluoride-Cleavable Biotinylation Phosphoramidite for 5'-end-Labelling and Affinity Purification of Synthetic Oligonucleotides," Nucleic Acids Res. (2003) 31(2): 708-715.

Faruqi et al., "High-throughput genotyping of single nucleotide polymorphisms with rolling circle amplification," BMC Genomics. (2001) 2:4.

Femino et al., "Visualization of single RNA transcripts in situ," Science. (1998) 280(5363): 585-90.

Gavrilovic et al., "Automated classification of multicolored rolling circle products in dual-channel wide-field fluorescence microscopy," Cytometry A. (2011) 79(7): 518-27.

Geiss et al., "Direct multiplexed measurement of gene expression with color-coded probe pairs," Nat Biotechnol. (2008) 26(3): 317-25.

Glass et al., "SIMPLE: a sequential immunoperoxidase labeling and erasing method," J Histochem Cytochem. (2009) 57(10); 899-905.

Goh, J.J.L. et al. (Jul. 2020, e-pub. Jun. 15, 2020). "Highly Specific Multiplexed RNA Imaging In Tissues With Split-FISH," Nat Methods 17(7):689-693. doi: 10.1038/s41592-020-0858-0. Epub Jun. 15, 2020.

Goransson et al., "A single molecule array for digital targeted molecular analyses," Nucleic Acids Res. 2009 37(1): e7. doi: 10.1093/nar/gkn921.

Gunderson et al. "Decoding randomly ordered DNA arrays." Genome research 14.5 (2004): 870-877.

Gyllborg et al., "Hybridization-based in situ sequencing (HybISS) for spatially resolved transcriptomics in human and mouse brain tissue," Nucleic Acids Res. (2020) 48(19): e112.

Han et al., "Quantum-dot-tagged microbeads for multiplexed optical coding of biomolecules," Nat Biotechnol. (2001) 19(7): 631-5.

Henegariu et al., "Custom fluorescent-nucleotide synthesis as an alternative method for nucleic acid labeling," Nature Biotechnol. (2000) 18:345.

Itzkovitz et al., "Single-molecule transcript counting of stem-cell markers in the mouse intestine," Nat Cell Biol. (2011) 14(1): 106-14.

Itzkovitz et al., "Validating Transcripts with Probes and Imaging Technology," Nat Methods. (2011) 8(4 Suppl): S12-S19.

Jamur et al., "Permeabilization of cell membranes," Method Mol. Biol. (2010) 588: 63-66 (abstract only).

Kanehisa, "Use of statistical criteria for screening potential homologies in nucleic acid sequences," Nucleic Acids Res. (1984) 12:203-213.

Korlach et al. "Selective aluminum passivation for targeted immobilization of single DNA polymerase molecules in zero-mode waveguide nanostructures." *Proceedings of the National Academy of Sciences* 105.4 (2008): 1176-1181.

Krzywkowski et al., "Fidelity of RNA templated end-joining by chlorella virus DNA ligase and a novel iLock assay with improved direct RNA detection accuracy," Nucleic Acids Res. (2017) 45(18): e161.

Lagunavicius et al., "Novel application of Phi29 DNA polymerase: RNA detection and analysis in vitro and in situ by target RNA-primed RCA," RNA. (2009) 15(5):765-71.

Lakowicz et al., "Silver particles enhance emission of fluorescent DNA oligomers," Bio Techniques (2003) 34(1); 62-66.

Larsson et al. "In situ detection and genotyping of individual mRNA molecules," Nat Methods. (2010) 7(5):395-397.

Lee et al. "Highly Multiplexed Subcellular RNA Sequencing In Situ", Science (2014) 343(6177):1360-1363.

Levene et al. "Zero-mode waveguides for single-molecule analysis at high concentrations." science 299.5607 (2003): 682-686.

Levsky et al., "Fluorescence in situ hybridization: past, present and future," J Cell Sci. (2003) 116(Pt 14): 2833-8.

Levsky et al., "Single-cell gene expression profiling," Science. (2002) 297(5582): 836-40.

Lim et al., "Engineered streptavidin monomer and dimer with improved stability and function," Biochemistry. (2011) 50(40):8682-91.

Lin et al., "Highly multiplexed imaging of single cells using a high-throughput cyclic immunofluorescence method," Nat Commun. (2015) 6:8390.

Liu et al. Barcoded oligonucleotides ligated on RNA amplified for multiplexed and parallel in situ analyses. Nucleic Acids Res. (2021) 49(10):e58, 15 pages. doi: 10.1093/nar/gkab120.

Lizardi et al., "Mutation detection and single-molecule counting using isothermal rolling-circle amplification," Nat Genet. (1998) 19(3): 225-232.

Lundquist et al. "Parallel confocal detection of single molecules in real time." Optics letters 33.9 (2008): 1026-1028.

Lyamichev et al., "Comparison of the 5' nuclease activities of taq DNA polymerase and its isolated nuclease domain," Proc Natl Acad Sci USA. (1999) 96(11): 6143-6148.

Ma et al., "RNA template-dependent 5' nuclease activity of Thermus aquaticus and Thermus thermophilus DNA polymerases," J Biol Chem. (2000) 275(32): 24693-700.

Maierhorfer et al., "Multicolor deconvolution microscopy of thick biological specimens," Am J Pathol. (2003) 162(2): 373-9.

McGinn et al., "New technologies for DNA analysis—a review of the READNA Project," N Biotechnol. (2016) 33(3): 311-30. doi: 10.1016/j.nbt.2015.10.003.

(56) References Cited

OTHER PUBLICATIONS

Meade et al. "Multiplexed DNA detection using spectrally encoded porous SiO2 photonic crystal particles," Anal Chem. (2009) 81(7): 2618-25.
Mitra et al., "Fluorescent in situ sequencing on polymerase colonies," Anal. Biochem. (2003) 320, 55-65.
Moffitt et al., "RNA Imaging with Multiplexed Error-Robust Fluorescence In Situ Hybridization (MERFISH)," Methods in Enzymology, (2016) 572; 1-49.
Mohsen et al., "The Discovery of Rolling Circle Amplification and Rolling Circle Transcription," Acc Chem Res. (2016) 49(11): 2540-2550.
Nallur et al., "Signal amplification by rolling circle amplification on DNA microarrays," Nucleic Acids Res. (2001) 29(23): e118.
Niu et al., "Fluorescence detection for DNA using hybridization chain reaction with enzyme-amplification," Chem Commun (Camb). (2010) 46(18): 3089-91.
Payne et al. "In situ genome sequencing resolves DNA sequence and structure in intact biological samples," Science. (2021) 371(6532): eaay3446. doi: 10.1126/science.aay3446. Epub Dec. 31, 2020.
Pirici et al., "Antibody elution method for multiple immunohistochemistry on primary antibodies raised in the same species and of the same subtype," J Histochem Cytochem. (2009) 57(6); 567-75.
Raj et al., "Imaging individual mRNA molecules using multiple singly labeled probes," Nat Methods. (2008) 5(10): 877-879.
Rouhanifard et al. "ClampFISH detects individual nucleic acid molecules using click chemistry-based amplification," Nat Biotechnol. (2018) 17 pages. doi: 10.1038/nbt.4286.
Schweitzer et al. "Immunoassays with rolling circle DNA amplification: A versatile platform for ultrasensitive antigen detection," Proc. Natl Acad. Sci. USA (2000) 97:10113-119.
Schweitzer et al., "Multiplexed protein profiling on microarrays by rolling-circle amplification," Nature Biotech. (2002) 20:359-365.
Shendure et al, "Accurate multiplex polony sequencing of an evolved bacterial genome," Science (2005) 309(5741); 1728-1732.
Song et al., "Hybridization chain reaction-based aptameric system for the highly selective and sensitive detection of protein," Analyst. (2012) 137(6):1396-1401.
Sun et al., "Composite organic-inorganic nanoparticles as Raman labels for tissue analysis," Nano Lett. (2007) 7(2): 351-6.
Takei et al., (Feb. 2021, e-pub Jan. 27, 2021). "Integrated Spatial Genomics Reveals Global Architecture Of Single Nuclei," Nature 590(7845):344-350, 53 pages. doi: 10.1038/s41586-020-03126-2.
Vandernoot et al., "cDNA normalization by hydroxyapatite chromatography to enrich transcriptome diversity in RNA-seq applications," Biotechniques, (2012) 53(6) 373-80.
WÄHLBY et al., "Sequential immunofluorescence staining and image analysis for detection of large numbers of antigens in individual cell nuclei," Cytometry. (2002) 47(1): 32-41.
Wang et al., "Three-dimensional intact-tissue sequencing of single-cell transcriptional states," Science. (2018) 361(6400): eaat5691.
Weibrecht et al., "Simultaneous visualization of both signaling cascade activity and end-point gene expression in single cells," PLoS One. (2011) 6(5): e20148.
Wetmur, "DNA Probes: Applications of the Principles of Nucleic Acid Hybridization," Critical Reviews in Biochemistry and Molecular Biology, (1991) 26(91); 227-259.
Wilson et al., "Encoded microcarriers for high-throughput multiplexed detection," Angew Chem Int Ed Engl. (2006) 18;45(37): 6104-17.
Wu, C. et al. "RollFISh Achieves Robust Quantification Of Single-Molecule RNA Biomarkers In Paraffin-Embedded Tumor Tissue Samples," Commun Biol. (2018) 1:(209): 1-8. doi: 10.1038/s42003-018-0218-0.
Wu et al., "Engineering soluble monomeric streptavidin with reversible biotin binding capability," J Biol Chem. (2005) 280(24): 23225-31.
Xia et al. "Multiplexed detection of RNA using MERFISH and branched DNA amplification." Scientific reports 9.1 (2019): 1-13.
Zhao et al., "Advances of multiplex and high throughput biomolecular detection technologies based on encoding microparticles," Sci China Chem. (2011) 54(8):1185.
Chen et al., "Efficient in situ barcode sequencing using padlock probe-based BaristaSeq," Nucleic Acids Res. (2018) 46(4): e22.
Sun et al., "Integrating barcoded neuroanatomy with spatial transcriptional profiling enables identification of gene correlates of projections," Nat Neurosci. (2021) 24(6):873-885.

\* cited by examiner

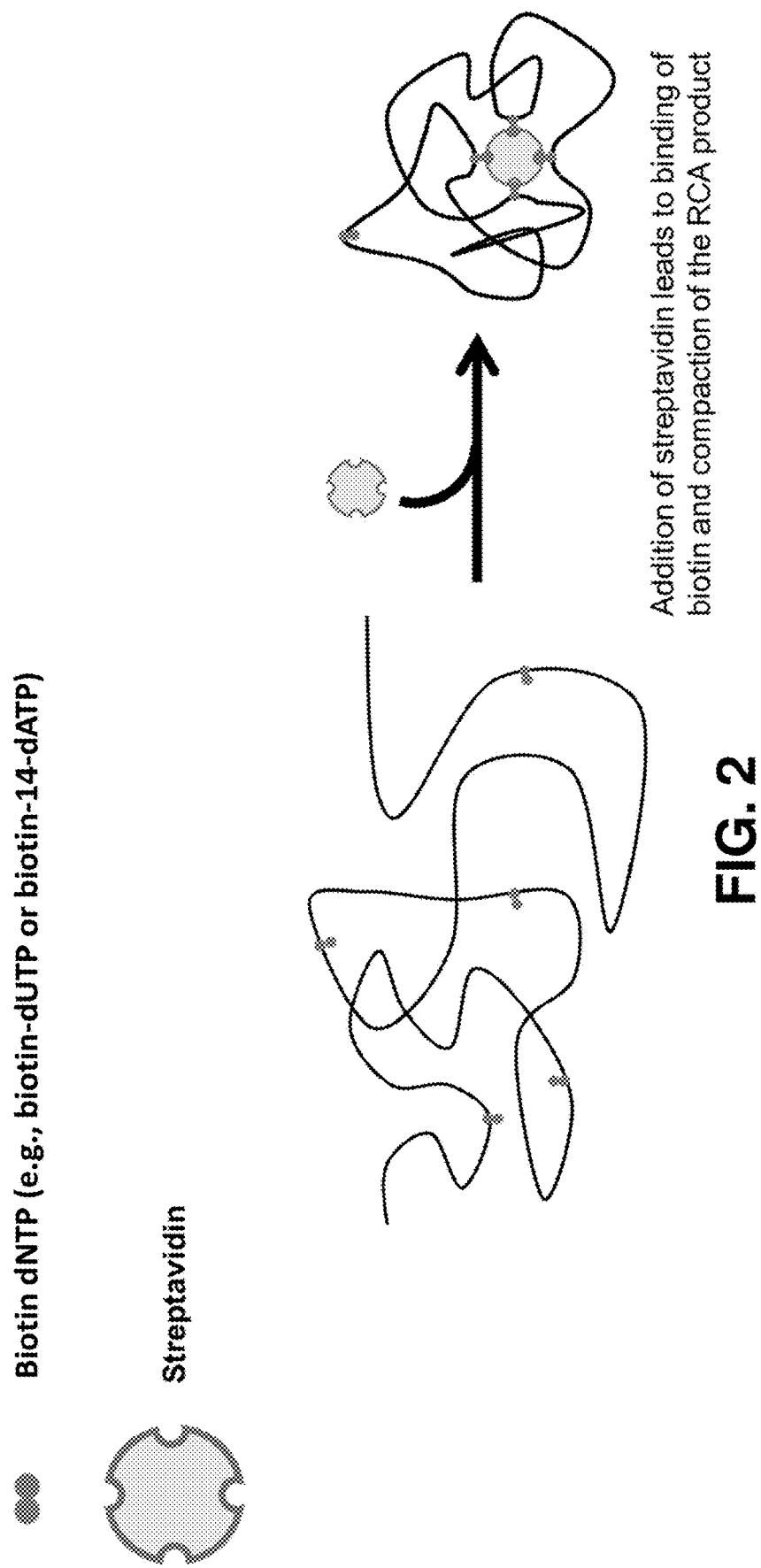

STABILIZATION AND/OR COMPACTION OF NUCLEIC ACID STRUCTURES

CROSS-REFERENCE TO RELATED APPLICATIONS

This application claims priority to U.S. Provisional Patent Application No. 63/228,857, filed Aug. 3, 2021, entitled "Stabilization and/or Compaction of Nucleic Acid Structures," which is herein incorporated by reference in its entirety for all purposes.

FIELD

The present disclosure relates in some aspects to methods and compositions for analyzing a biological sample, such as for stabilizing and/or compacting nucleic acid structures in the biological sample for in situ analysis.

BACKGROUND

Methods are available for analyzing nucleic acids in a biological sample in situ, such as a cell or a tissue. For instance, advances in single molecule fluorescent hybridization (smFISH) have enabled nanoscale-resolution imaging of RNA in cells and tissues. However, oligonucleotide probe-based assay methods for in situ analysis may suffer from low sensitivity, specificity, and/or detection efficiency and may require careful and laborious optimization. Improved methods for in situ analysis are needed. The present disclosure addresses these and other needs.

BRIEF SUMMARY

There is a need for increasing the stability and/or compaction of structures including nucleic acid molecules (e.g., nucleic acid concatemers such as rolling circle amplification products) during in situ analysis of a biological sample. For example, probe/target hybridization complexes and/or rolling circle amplification products may become destabilized (e.g., when wash conditions are too stringent), which may result in a decrease in the number of useful signals, impaired spatial fidelity of signals between hybridization cycles, and loss of information in the assay. Furthermore, compaction of nucleic acid in the sample (e.g., a cell or tissue sample) may allow for better resolution of signals.

Provided herein are methods and compositions for compaction and/or stabilization of structures including nucleic acid molecules in situ in a biological sample, including methods for enhancing the stability and/or compaction of nucleic acid molecules during in situ analysis, e.g., for decoding nucleic acid barcode sequences through sequential cycles of detectable probe hybridization (directly or indirectly) to the nucleic acid molecules (e.g., nucleic acid concatemers such as rolling circle amplification products).

Described herein is a method, including generating a rolling circle amplification (RCA) product by performing a rolling circle amplification (RCA) reaction on a template nucleic acid molecule (e.g., comprising DNA and/RNA), wherein the RCA product includes a biotin moiety conjugated to one or more nucleotides of the RCA product; and adding avidin or streptavidin to the RCA product, thereby generating a compacted RCA product. In some embodiments, the template nucleic acid molecule comprises DNA and/or RNA. In some embodiments, the template nucleic acid molecule is DNA. In some embodiments, the template nucleic acid molecule is RNA. In some embodiments, the RCA reaction includes use of a biotinylated nucleotide, and wherein said biotinylated nucleotide is incorporated into the RCA product to generate the RCA product including the biotin moiety. In some embodiments, the biotinylated nucleotide is a biotinylated dATP. In some embodiments, a ratio of the non-biotinylated nucleotides to the biotinylated nucleotide is between 100:1 and 10,000:1. In some embodiments, a ratio of the non-biotinylated nucleotides to the biotinylated nucleotide is 4000:1. In some embodiments, the biotinylated nucleotide is a biotinylated dCTP. In some embodiments, the biotinylated nucleotide is a biotinylated dGTP. In some embodiments, the biotinylated nucleotide is a biotinylated dUTP and/or dTTP. In some embodiments, the moiety conjugated to one or more nucleotides includes a linker of 7 to 14 atoms.

In some embodiments, the adding avidin or streptavidin includes $MgCl_2$ at a concentration of between 50 mM to 1 M. In some embodiments, the template nucleic acid molecule (e.g., comprising DNA and/RNA) is a circular molecule (e.g., a circular probe hybridizing to a target nucleic acid molecule) or circularized molecule. In some embodiments, the circularized molecule is a circularized probe generated from a circularizable probe or probe set. In some embodiments, the circularized probe is a circularized padlock probe complementary to a target nucleic acid molecule, and wherein the method further includes hybridizing said padlock probe to the target nucleic acid molecule and circularizing the padlock probe to generate the circularized probe. In some embodiments, the circular probe or circularizable probe or probe set comprises one or more ribonucleotides. In some embodiments, In some embodiments, the circular probe or circularizable probe or probe set comprises no more than four consecutive ribonucleotides. In some embodiments, the one or more ribonucleotides are at and/or near a ligatable 3' end of the circularizable probe or probe set. In some embodiments, the circularizable probe or probe set comprises a ribonucleotide at its 3' end. In some embodiments, the target nucleic acid molecule is an RNA molecule. In some embodiments, the RNA molecule is an mRNA molecule. In some embodiments, the target nucleic acid molecule is a complementary DNA (cDNA) molecule. In some embodiments, the cDNA molecule is generated by performing a reverse transcription reaction on an mRNA template. In some embodiments, the RNA molecule is in a biological sample. In some embodiments, the biological sample includes a plurality of cells. In some embodiments, the biological sample is or is derived from a fresh, fresh frozen or formalin-fixed paraffin embedded (FFPE) tissue. In some embodiments, the method includes detecting the compacted RCA product. In some embodiments, the compacting the RCA product reduces size by about 20%.

Described herein is a method for analysis, including: (a) contacting a biological sample with a probe to provide the probe bound to a target nucleic acid molecule; (b) generating a rolling circle amplification (RCA) product in the biological sample by performing a rolling circle amplification (RCA) reaction using the probe as a template, wherein the RCA product includes a biotin moiety conjugated to one or more nucleotides of the RCA product; (c) using avidin or streptavidin to generate a compacted RCA product; and (d) detecting the compacted RCA product. In some embodiments, the probe is a circular probe. In some embodiments, the probe is a circularizable probe, wherein the method further includes, prior to the generating in step (b), circularizing the circularizable probe.

Described herein is a method including generating a rolling circle amplification (RCA) product by performing rolling circle amplification (RCA) on DNA, wherein the RCA product includes biotin conjugated to one or more nucleotides; and adding avidin or streptavidin, thereby compacting the RCA product. In some embodiments, the one or more nucleotides includes dATP. In some embodiments, the RCA includes addition of biotinylated dATP. In some embodiments, the ratio of non-biotinylated nucleotides to the biotinylated dATP is between 100:1 and 10,000:1. In some embodiments, the ratio of non-biotinylated nucleotides to the biotinylated dATP is 4000:1. In some embodiments, the one or more nucleotides includes dCTP. In some embodiments, the one or more nucleotides includes dGTP. In some embodiments, the one or more nucleotides includes dUTP and/or dTTP. In some embodiments, the biotin conjugated to one or more nucleotides includes a linker of 7 to 14 atoms. In some embodiments, the generating a RCA product includes $MgCl_2$ at a concentration of between 50 mM to 1 M. In some embodiments, the DNA is complementary DNA (cDNA). In some embodiments, the cDNA is complementary to mRNA. In some embodiments, the mRNA is in a sample. In some embodiments, the sample is fresh, fresh frozen or formalin-fixed paraffin embedded (FFPE) tissue. In some embodiments, the method includes detecting the compacted RCA product. In some embodiments, the compacting the RCA product reduces size by about 20%. In some embodiments, the compacting the RCA product includes adding avidin. In some embodiments, the compacting the RCA product includes adding streptavidin.

Also described herein is a method, including generating a rolling circle amplification (RCA) product by performing rolling circle amplification on complementary DNA (cDNA), wherein the cDNA is complementary to mRNA in a sample and the RCA product includes biotin conjugated to one or more nucleotides; and adding avidin or streptavidin, thereby compacting the RCA product. In some embodiments, the one or more nucleotides includes dATP. In some embodiments, the RCA includes addition of biotinylated dATP. In some embodiments, the ratio of non-biotinylated nucleotides to the biotinylated nucleotides is 4000:1. In some embodiments, the one or more nucleotides includes dCTP. In some embodiments, the one or more nucleotides includes dGTP. In some embodiments, the compacting the RCA product includes adding avidin. In some embodiments, the compacting the RCA product includes adding streptavidin.

BRIEF DESCRIPTION OF THE DRAWINGS

The drawings illustrate certain embodiments of the features and advantages of this disclosure. These embodiments are not intended to limit the scope of the appended claims in any manner.

FIG. 2 depicts an exemplary method where addition of streptavidin leads to binding of biotin moieties and compaction of the RCA product. Addition of streptavidin leads to high affinity binding to biotinylated nucleotides incorporated into RCA product, wherein the configuration of up to four biotinylated nucleotides bound to the streptavidin is capable of compacting the RCA product.

FIG. 3A demonstrates the changes of physical object size of RCA products without biotin-dUTP or with biotin-dUTP at increasing concentrations. FIG. 3B depicts the images of exemplary RCA products without biotin-dUTP or with biotin-dUTP at increasing concentrations. FIG. 3C illustrates the relative physical object size of RCA products with 40 μM of biotin-dUTP and 0.4 μM of streptavidin, compared to RCA product sizes from no biotin-dUTP and no streptavidin, streptavidin only, and biotin-dUTP only controls.

DETAILED DESCRIPTION

Figure 1:
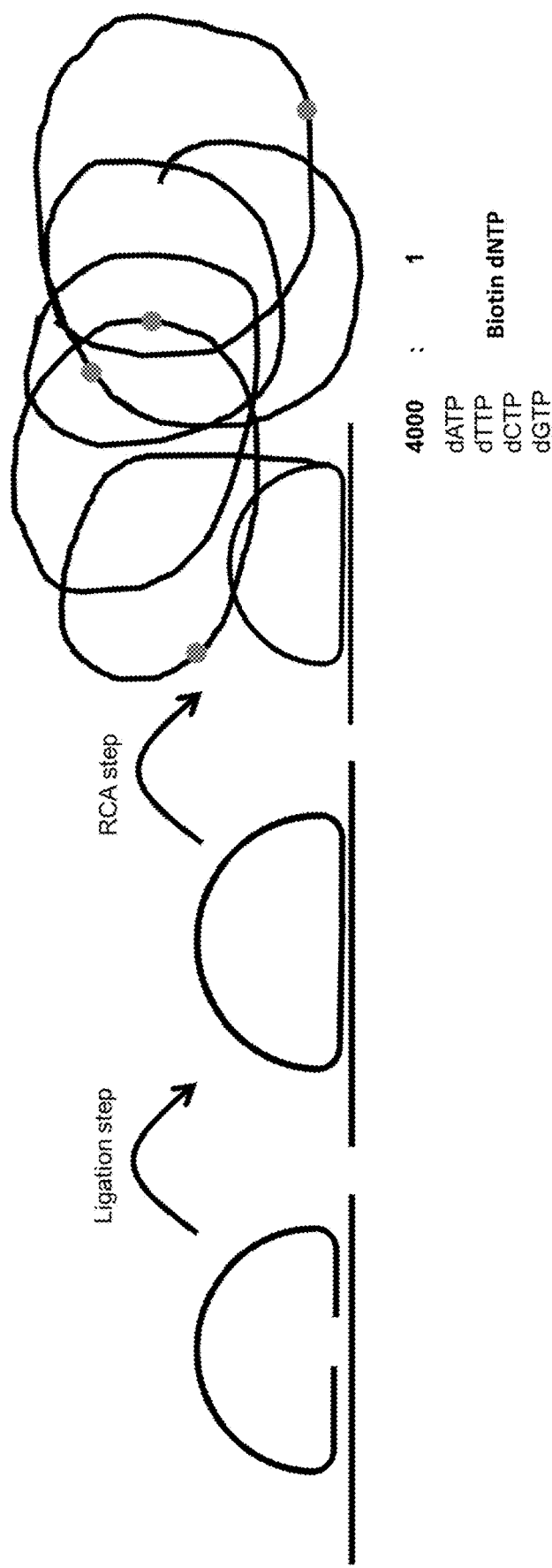
FIG. 1 depicts an exemplary method of incorporating biotin-dNTP into a rolling circle amplification (RCA) product. Any dNTP (e.g., dATP, dTTP, dUTP, dCTP, or dGTP) or modified nucleoside triphosphate can be modified with a biotin moiety and utilized to incorporate into the RCA product of a circular or circularizable probe or probe set. An exemplary circularizable probe is shown in the figure. Following ligation of the probe and RCA, the RCA product comprises nucleotide residue(s) modified with the biotin moiety, with greater numbers of non-biotinylated nucleotides compared to biotinylated nucleotides in the RCA product. An exemplary ratio of non-biotinylated nucleotides to biotin-dNTP, 4000:1, is shown.

All publications, comprising patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. Overview

Provided herein are methods involving the use of compaction probes for compacting nucleic acid concatemers (e.g., rolling circle amplification (RCA) products (RCP)). When utilizing rolling circle amplification (RCA) to detect nucleic acid targets, properly resolving densely packed rolling circle amplification products (RCPs) in a cell or surface depends upon resolution of the individual RCPs. RCPs are concatemers include multiple copies of the target sequence and the RCA probe sequence, which can be visualized using in situ detection probes. RCP detection is enhanced by compaction of the concatemers, as reduction in size results in local concentration of the detection probes to increase signal intensity. Compaction also allows for increased resolution of individual RCPs. Compaction probes are designed to hybridize to regions of the RCP and pull the concatemer together to reduce its overall size. Oligonucleotide probes are typically linear and depend only on hybridization with the RCP to maintain compaction. Linear compaction probes are typically stripped away along with detection probes following rounds of in situ hybridization and target detection. Thus, there is a need for methods and compositions for persistent compaction of RCPs that are resistant to stripping.

Provided herein are methods involving the use of oligonucleotide probes for compacting and/or stabilizing nucleic acid concatemers (e.g., rolling circle amplification (RCA) products (RCP)). In some aspects, the present disclosure provides methods and compositions for persistent compaction of RCPs. In some embodiments, circularizable oligonucleotide probes and methods of hybridization and ligation reactions are provided.

Described herein is a method including generating a rolling circle amplification (RCA) product by performing rolling circle amplification (RCA) on DNA, wherein the RCA product includes biotin conjugated to one or more nucleotides; and adding avidin or streptavidin, thereby compacting the RCA product. In some embodiments, the one or more nucleotides includes dATP. In some embodiments, the RCA includes addition of biotinylated dATP. In some embodiments, the ratio of non-biotinylated nucleotides to the biotinylated nucleotide (e.g., dATP) is between 100:1 and 10,000:1. In some embodiments, the ratio of non-biotinylated nucleotides to the biotinylated nucleotide (e.g., dATP) is between 1,000:1 and 10,000:1. In some embodiments, the ratio of non-biotinylated nucleotides to the biotinylated nucleotide (e.g., dATP) is between 3,000:1 and 7,000:1. In some embodiments, the ratio of non-biotinylated nucleotides to the biotinylated nucleotide (e.g., dATP) is 4000:1. In some embodiments, the one or more nucleotides include biotinylated dCTP. In some embodiments, the one or more nucleotide includes biotinylated dGTP. In some embodiments, the one or more nucleotides include biotinylated dUTP and/or biotinylated dTTP. In some embodiments, the RCA includes addition of biotinylated dCTP, dGTP, and/or dUTP/dTTP. In some embodiments, the concentration of biotinylated nucleotides in an RCA reaction is between 1 μM to 50 μM, inclusive. In some embodiments, the concentration of biotinylated nucleotides is between 10 μM to 40 μM, inclusive. In some embodiments, the concentration of biotinylated nucleotides is between 20 μM to 40 μM, inclusive. In some embodiments, the concentration of biotinylated nucleotides is between 30 μM to 40 μM, inclusive. In some embodiments, the concentration of biotinylated nucleotides is between 35 μM to 40 μM, inclusive. In some embodiments, the concentration of biotinylated nucleotides is 40 μM. In some embodiments, the concentration of dATP used is 40 μM. In some embodiments, the concentration of dCTP used is 40 μM. In some embodiments, the concentration of dGTP used is 40 μM. In some embodiments, the concentration of dUTP used is 40 μM. In some embodiments, the concentration of dTTP used is 40 μM.

In some embodiments, the biotin conjugated to one or more nucleotides includes a linker of 7 to 14 atoms. In some embodiments, the generating a RCA product includes $MgCl_2$ at a concentration of between 50 mM to 1 M. In some embodiments, the DNA is complementary DNA (cDNA). In some embodiments, the cDNA is complementary to mRNA. In some embodiments, the mRNA is in a sample. In some embodiments, the sample is fresh, fresh frozen or formalin-fixed paraffin embedded (FFPE) tissue. In some embodiments, the sample is fresh tissue. In some embodiments, the sample is fresh frozen tissue. In some embodiments, the sample is formalin-fixed paraffin embedded (FFPE) tissue. In some embodiments, the method includes detecting the compacted RCA product. In some embodiments, the compacting the RCA product reduces size by about 5-50%. In some embodiments, the compacting the RCA product reduces size by about 5-25%. In some embodiments, the compacting the RCA product reduces size by about 10-25%. In some embodiments, the compacting the RCA product reduces the size by about 5%. In some embodiments, the compacting the RAC product reduces the size by about 10%. In some embodiments, the compacting the RCA product reduces size by about 20%. In some embodiments, the compacting the RCA product reduces the size about 25%. In some embodiments, the compacting the RCA product reduces the size about 30%. In some embodiments, the compacting the RCA product reduces the size about 35%. In some embodiments, the compacting the RCA product reduces the size about 40%. In some embodiments, the compacting the RCA product reduces the size about 45%. In some embodiments, the compacting the RCA product reduces the RCA product size by a percentage in a range between any of the aforementioned percentages. In some embodiments, the concentration of biotinylated nucleotides used in the RCA reaction is inversely correlated with the RCA product size. In some embodiments, as the concentration of biotinylated nucleotides increases, the size of the RCA product decreases. In some embodiments, the RCA product has a diameter of about having a diameter of between about 0.1 μm and about 3 μm, e.g., between about 0.1 μm and about 0.5 μm (e.g., between about 0.2 μm and about 0.3 μm, or between about 0.3 μm and about 0.4 μm), between about 0.5 μm and about 1 μm, between about 0.8 μm and about 1.3 μm, or between about 1 μm and about 1.5 μm, each inclusive. In some embodiments, the compacting the RCA product includes adding avidin. In some embodiments, the compacting the RCA product includes adding streptavidin. In some embodiments, the concentration of streptavidin used is about 0.1 μM, about 0.2 μM, about 0.4 μM, about 0.6 μM, about 0.8 μM, about 1.0 μM, about 1.5 μM, about 2 μM, or more, or any concentration between any of the aforementioned concentrations.

In any of the preceding embodiments, a sequence (e.g., a barcode sequence or complement thereof) of the RCA product may be analyzed in situ in the biological sample. In any of the preceding embodiments, a sequence (e.g., a barcode sequence or complement thereof) of the nucleic acid concatemer may be analyzed by sequential hybridization, sequencing by hybridization, sequencing by ligation, sequencing by synthesis, sequencing by binding, or a combination thereof. In any of the preceding embodiments, the sequence to be analyzed may comprise a barcode sequence, e.g., a barcode sequence corresponding to an analyte or a portion thereof or a labelling agent for an analyte or portion thereof in the biological sample.

In any of the preceding embodiments, the method may further comprise removing one or more molecules of the oligonucleotide probe that have not bound to the oligonucleotide probe recognition site.

In any of the preceding embodiments, the biological sample may be a processed or cleared biological sample. In any of the preceding embodiments, the biological sample may be an intact tissue sample or a non-homogenized tissue sample. In any of the preceding embodiments, the tissue sample may be a tissue slice between about 1 μm and about 50 μm in thickness, optionally wherein the tissue slice is between about 5 μm and about 35 μm in thickness. In any of the preceding embodiments, the tissue sample may be embedded in a hydrogel. In any of the preceding embodiments, the nucleic acid concatemer may be crosslinked to the hydrogel. In any of the preceding embodiments, the nucleic acid concatemer may comprise one or more functional groups for attachment to the hydrogel.

Described herein is a method, including generating a rolling circle amplification (RCA) product by performing a rolling circle amplification (RCA) reaction on a template nucleic acid molecule (e.g., comprising DNA and/RNA), wherein the RCA product includes a biotin moiety conjugated to one or more nucleotides of the RCA product; and adding avidin or streptavidin to the RCA product, thereby generating a compacted RCA product. In some embodiments, the RCA reaction includes use of a biotinylated nucleotide, and wherein said biotinylated nucleotide is incorporated into the RCA product to generate the RCA product including the biotin moiety. In some embodiments, the biotinylated nucleotide is a biotinylated dATP. In some embodiments, the ratio of non-biotinylated nucleotides to the biotinylated nucleotide is between 100:1 and 10,000:1. In some embodiments, the ratio of non-biotinylated nucleotides to the biotinylated nucleotides is between 3,000:1 and 7,000:1. In some embodiments, the ratio of non-biotinylated nucleotides to the biotinylated nucleotide is 4000:1. In some embodiments, the biotinylated nucleotide is a biotinylated dCTP. In some embodiments, the biotinylated nucleotide is a biotinylated dGTP. In some embodiments, the biotinylated nucleotide is a biotinylated dUTP and/or dTTP. In some embodiments, the moiety conjugated to one or more nucleotides includes a linker of 7 to 14 atoms. In some embodiments, the concentration of biotinylated nucleotides is between 1 µM to 40 µM, inclusive. In some embodiments, the concentration of biotinylated nucleotides is between 10 µM to 40 µM, inclusive. In some embodiments, the concentration of biotinylated nucleotides is between 20 µM to 40 µM, inclusive. In some embodiments, the concentration of biotinylated nucleotides is between 30 µM to 40 µM, inclusive. In some embodiments, the concentration of biotinylated nucleotides is between 35 µM to 40 µM, inclusive. In some embodiments, the concentration of biotinylated nucleotides is 40 µM. In some embodiments, the concentration of dATP used is 40 µM. In some embodiments, the concentration of dCTP used is 40 µM. In some embodiments, the concentration of dGTP used is 40 µM. In some embodiments, the concentration of dUTP used is 40 µM. In some embodiments, the concentration of dTTP used is 40 µM.

In some embodiments, the adding avidin or streptavidin includes $MgCl_2$ at a concentration of between 50 mM to 1 M. In some embodiments, the template nucleic acid molecule (e.g., comprising DNA and/RNA) is a circular molecule. In some embodiments, the circular molecule is a circularized probe. In some embodiments, the circularized probe is a circularized padlock probe complementary to a target nucleic acid molecule, and wherein the method further includes hybridizing the padlock probe to the target nucleic acid molecule and circularizing the padlock probe to generate said circularized probe according to the methods described herein. In some embodiments, the target nucleic acid molecule is an RNA molecule. In some embodiments, the RNA molecule is an mRNA molecule. In some embodiments, the target nucleic acid molecule is a complementary DNA (cDNA) molecule. In some embodiments, the cDNA molecule is generated by performing a reverse transcription reaction on an mRNA template according to the methods described herein. In some embodiments, the RNA molecule is in a biological sample. In some embodiments, the biological sample includes a plurality of cells. In some embodiments, the biological sample is or is derived from a fresh, fresh frozen or formalin-fixed paraffin embedded (FFPE) tissue. In some embodiments, the method includes detecting the compacted RCA product according to the methods described herein. In some embodiments, the compacting the RCA product reduces size by about 20%.

Described herein is a method for analysis, including: (a) contacting a biological sample with a probe to provide the probe bound to a target nucleic acid molecule; (b) generating a rolling circle amplification (RCA) product in said biological sample by performing a rolling circle amplification (RCA) reaction using the probe as a template according to the methods described herein, wherein the RCA product includes a biotin moiety conjugated to one or more nucleotides of the RCA product; (c) using avidin or streptavidin to generate a compacted RCA product; and (d) detecting the compacted RCA product according to the methods described herein. In some embodiments, the probe is a circular probe. In some embodiments, the probe is a circularizable probe, wherein the method further includes, prior to the generating in step (b), circularizing the circularizable probe.

Also described herein is a method, including generating a rolling circle amplification (RCA) product by performing rolling circle amplification on complementary DNA (cDNA), wherein the cDNA is complementary to mRNA in a sample and the RCA product includes biotin conjugated to one or more nucleotides; and adding avidin or streptavidin, thereby compacting the RCA product. In some embodiments, the one or more nucleotides includes dNTP or an analog thereof. In some embodiments, the RCA includes addition of biotinylated dNTP. In some embodiments, the ratio of non-biotinylated nucleotides to the biotinylated dNTP is between 100:1 and 10,000:1. In some embodiments, the ratio of non-biotinylated nucleotides to the biotinylated dNTP is between 1,000:1 and 10,000:1. In some embodiments, the ratio of non-biotinylated nucleotides to the biotinylated dNTP is between 3,000:1 and 7,000:1. In some embodiments, the ratio of non-biotinylated nucleotides to the biotinylated nucleotides is 4000:1. In some embodiments, the ratio of non-biotinylated nucleotides to the biotinylated nucleotides is between any of the aforementioned ratios.

In some embodiments, the one or more nucleotides includes dATP. In some embodiments, the one or more nucleotides includes dCTP. In some embodiments, the one or more nucleotides includes dGTP. In some embodiments, the one or more nucleotides includes dUTP and/or dTTP. In some embodiments, the RCA includes addition of biotinylated dATP, dCTP, dGTP, dTTP, and/or dUTP. In some embodiments, the compacting the RCA product includes adding avidin. In some embodiments, the compacting the RCA product includes adding streptavidin, avidin, or analog or variant or mutein thereof. In some embodiments, the concentration of biotinylated nucleotides is between 1 µM to 40 µM, inclusive. In some embodiments, the concentration of biotinylated nucleotides is between 10 µM to 40 µM, inclusive. In some embodiments, the concentration of biotinylated nucleotides is between 20 µM to 40 µM, inclusive. In some embodiments, the concentration of biotinylated nucleotides is between 30 µM to 40 µM, inclusive. In some embodiments, the concentration of biotinylated nucleotides is between 35 µM to 40 µM, inclusive. In some embodiments, the concentration of biotinylated nucleotides is 40 µM. In some embodiments, the concentration of dATP used is 40 µM. In some embodiments, the concentration of dCTP used is 40 µM. In some embodiments, the concentration of dGTP used is 40 µM. In some embodiments, the concentration of dUTP used is 40 µM. In some embodiments, the concentration of dTTP used is 40 µM.

In some embodiments, the streptavidin can be wild-type streptavidin, streptavidin muteins or analogs, such as streptavidin-like polypeptides. Likewise, avidin, in some aspects, includes wild-type avidin or muteins or analogs of avidin such as neutravidin, a deglycosylated avidin with modified arginines that typically exhibits a more neutral pI and is available as an alternative to native avidin. Generally, deglycosylated, neutral forms of avidin include those commercially available forms such as "Extravidin", available through Sigma Aldrich, or "NeutrAvidin" available from Thermo Scientific or Invitrogen, for example.

In some embodiments, a streptavidin or a streptavidin mutein or analog can be used to compact an RCA product comprising biotin, a biotin derivative or analog or a biotin mimic. In general, streptavidin naturally occurs as a tetramer of four identical subunits, and it is a homo-tetramer, where each subunit contains a single binding site for biotin, a biotin derivative or analog or a biotin mimic. An exemplary sequence of a streptavidin subunit can include a sequence present in homologs thereof from other *Streptomyces* species. In particular, each subunit of streptavidin may exhibit a strong binding affinity for biotin with a dissociation constant ($K_d$) on the order of about $10^{-14}$ M. In some cases, streptavidin can exist as a divalent tetramer in which two of the four binding sites are functional (Fairhead et al. (2013) *J. Mol. Biol.*, 426:199-214), or can be present in dimeric form (Wu et al. (2005) *J. Biol. Chem.*, 280:23225-31; Lim et al. (2010) *Biochemistry*, 50:8682-91). In some embodiments, streptavidin may be in any form, such as wild-type or unmodified streptavidin, such as a streptavidin from a *Streptomyces* species or a functionally active fragment thereof that includes at least one functional subunit containing a binding site for biotin, a biotin derivative or analog or a biotin mimic (Strep-tag®; or Strep-tag® II; or Twin-Strep-tag® from IBA GmbH, Göttingen, Germany), such as generally contains at least one functional subunit of a wild-type streptavidin from *Streptomyces avidinii* or a functionally active fragment thereof. For example, in some embodiments, streptavidin can include a fragment of wild-type streptavidin, which is shortened at the N- and/or C-terminus. In some aspects, streptavidin muteins include polypeptides that are distinguished from the sequence of an unmodified or wild-type streptavidin by one or more amino acid substitutions, deletions, or additions, but that include at least one functional subunit containing a binding site for biotin, a biotin derivative or analog or a streptavidin-binding peptide. In some aspects, streptavidin-like polypeptides and streptavidin muteins can be polypeptides which essentially are immunologically equivalent to wild-type streptavidin and are in particular capable of binding biotin, biotin derivatives or biotin analogues with the same or different affinity as wild-type streptavidin. In some cases, streptavidin-like polypeptides or streptavidin muteins may contain amino acids which are not part of wild-type streptavidin or they may include only a part of wild-type streptavidin. In some embodiments, streptavidin-like polypeptides are polypeptides which are not identical to wild-type streptavidin, since the host does not have the enzymes which are required in order to transform the host-produced polypeptide into the structure of wild-type streptavidin. In some embodiments, streptavidin also may be present as streptavidin tetramers and streptavidin dimers, in particular streptavidin homotetramers, streptavidin homodimers, streptavidin heterotetramers and streptavidin heterodimers. Generally, each subunit normally has a binding site for biotin or biotin analogues or for streptavidin-binding peptides. Examples of streptavidins or streptavidin muteins are mentioned, for example, in U.S. Pat. Nos. 5,168,049, 6,103,493, 6,022,951, 6,368,813, 6,156,493 or U.S. Pat. No. 10,065,996, all of which are incorporated by reference in their entireties. In some cases, such streptavidin mutein are described, for example, in U.S. Pat. No. 6,103,493, incorporated herein by reference in its entirety, and is commercially available under the trademark Strep-Tactin®.

II. Samples, Analytes, and Target Sequences

A method disclosed herein may be used to process and/or analyze any analyte(s) of interest, for example, for detecting the analyte(s) in situ in a sample of interest. A target nucleic acid sequence as disclosed herein may be or be comprised in an analyte (e.g., a nucleic acid analyte, such as genomic DNA, mRNA transcript, or cDNA, or a product thereof, e.g., an extension or amplification product, such as an RCA product) and/or may be or be comprised in a labelling agent for one or more analytes (e.g., a nucleic acid analyte or a non-nucleic acid analyte) in a sample or a product of the labelling agent. Exemplary analytes and labelling agents are described below.

A. Samples

A sample disclosed herein can be or derived from any biological sample. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. In addition to the subjects described above, a biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can include nucleic acids (such as DNA or RNA), proteins/polypeptides, carbohydrates, and/or lipids The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some embodiments, the biological sample may comprise cells which are deposited on a surface.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

Biological samples can include analytes (e.g., protein, RNA, and/or DNA) embedded in a 3D matrix. In some embodiments, amplicons (e.g., rolling circle amplification products) derived from or associated with analytes (e.g., protein, RNA, and/or DNA) can be embedded in a 3D matrix. In some embodiments, a 3D matrix may comprise a network of natural molecules and/or synthetic molecules that are chemically and/or enzymatically linked, e.g., by crosslinking. In some embodiments, a 3D matrix may comprise a synthetic polymer. In some embodiments, a 3D matrix comprises a hydrogel.

In some embodiments, a substrate herein can be any support that is insoluble in aqueous liquid and which allows for positioning of biological samples, analytes, features, and/or reagents (e.g., probes) on the support. In some embodiments, a biological sample can be attached to a substrate. Attachment of the biological sample can be irreversible or reversible, depending upon the nature of the sample and subsequent steps in the analytical method. In certain embodiments, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. Hydrogels are examples of polymers that are suitable for this purpose.

In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

(i) Tissue Sectioning

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 μm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 μm. Thicker sections can also be used if desired or convenient, e.g., at least 70, 80, 90, or 100 μm or more. Typically, the thickness of a tissue section is between 1-100 μm, 1-50 μm, 1-30 μm, 1-25 μm, 1-20 μm, 1-15 μm, 1-10 μm, 2-8 μm, 3-7 μm, or 4-6 μm, but as mentioned above, sections with thicknesses larger or smaller than these ranges can also be analysed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analysed successively to obtain three-dimensional information about the biological sample.

(ii) Freezing

In some embodiments, the biological sample (e.g., a tissue section as described above) can be prepared by deep freezing at a temperature suitable to maintain or preserve the integrity (e.g., the physical characteristics) of the tissue structure. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C.

(iii) Fixation and Postfixation

In some embodiments, the biological sample can be prepared using formalin-fixation and paraffin-embedding (FFPE), which are established methods. In some embodiments, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some embodiments, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some embodiments, the methods provided herein comprises one or more post-fixing (also referred to as postfixation) steps. In some embodiments, one or more post-fixing step is performed after contacting a sample with a polynucleotide disclosed herein, e.g., one or more probes such as a circular probe or circularizable probe or probe set (e.g., padlock probe). In some embodiments, one or more post-fixing step is performed after a hybridization complex comprising a probe and a target is formed in a sample. In some embodiments, one or more post-fixing step is performed prior to a ligation reaction disclosed herein, such as the ligation to circularize a circularizable probe or probe set (e.g., padlock probe).

In some embodiments, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some embodiments, the labelling agent can comprise a reporter oligonucleotide comprising one or more barcode sequences.

A post-fixing step may be performed using any suitable fixation reagent disclosed herein, for example, 3% (w/v) paraformaldehyde in DEPC-PBS.

(iv) Embedding

As an alternative to paraffin embedding described above, a biological sample can be embedded in any of a variety of other embedding materials to provide structural substrate to the sample prior to sectioning and other handling steps. In some cases, the embedding material can be removed e.g., prior to analysis of tissue sections obtained from the sample. Suitable embedding materials include, but are not limited to, waxes, resins (e.g., methacrylate resins), epoxies, and agar.

In some embodiments, the biological sample can be embedded in a matrix (e.g., a hydrogel matrix). Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some embodiments, the hydrogel is formed such that the hydrogel is internalized within the biological sample.

In some embodiments, the biological sample is immobilized in the hydrogel via cross-linking of the polymer material that forms the hydrogel. Cross-linking can be performed chemically and/or photochemically, or alternatively by any other suitable hydrogel-formation method.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample comprises cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 µm to about 2 mm.

Additional methods and aspects of hydrogel embedding of biological samples are described for example in Chen et al., *Science* 347(6221):543-548, 2015, the entire contents of which are incorporated herein by reference.

(v) Staining and Immunohistochemistry (IHC)

To facilitate visualization, biological samples can be stained using a wide variety of stains and staining techniques. In some embodiments, for example, a sample can be stained using any number of stains and/or immunohistochemical reagents. One or more staining steps may be performed to prepare or process a biological sample for an assay described herein or may be performed during and/or after an assay. In some embodiments, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some embodiments, cells in the sample can be segmented using one or more images taken of the stained sample.

In some embodiments, the stain is performed using a lipophilic dye. In some examples, the staining is performed with a lipophilic carbocyanine or aminostyryl dye, or analogs thereof (e.g, DiI, DiO, DiR, DiD). Other cell membrane stains may include FM and RH dyes or immunohistochemical reagents specific for cell membrane proteins. In some examples, the stain may include but not limited to, acridine orange, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine or derivatives thereof. In some embodiments, the sample may be stained with haematoxylin and eosin (H & E).

The sample can be stained using hematoxylin and eosin (H & E) staining techniques, using Papanicolaou staining techniques, Masson's trichrome staining techniques, silver staining techniques, Sudan staining techniques, and/or using Periodic Acid Schiff (PAS) staining techniques. PAS staining is typically performed after formalin or acetone fixation. In some embodiments, the sample can be stained using Romanowsky stain, including Wright's stain, Jenner's stain, Can-Grunwald stain, Leishman stain, and Giemsa stain.

In some embodiments, biological samples can be destained. Any suitable methods of destaining or discoloring a biological sample may be utilized, and generally depend on the nature of the stain(s) applied to the sample. For example, in some embodiments, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

(vi) Isometric Expansion

In some embodiments, a biological sample embedded in a matrix (e.g., a hydrogel) can be isometrically expanded. Isometric expansion methods that can be used include hydration, a preparative step in expansion microscopy, as described, e.g., in Chen et al., *Science* 347(6221):543-548, 2015 and U.S. Pat. No. 10,059,990, which are herein incorporated by reference in their entireties.

Isometric expansion can be performed by anchoring one or more components of a biological sample to a gel, followed by gel formation, proteolysis, and swelling. In some embodiments, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some embodiments, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, cross-linking), and/or the analyte of interest (e.g., different conditions to anchor RNA, DNA, and protein to a gel).

In some embodiments, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl)amino) hexanoic acid (Acryloyl-X SE) (available from ThermoFisher, Waltham, MA), Label-IT Amine (available from MirusBio, Madison, WI) and Label X (described for example in Chen et al., Nat. Methods 13:679-684, 2016 and U.S. Pat. No. 10,059,990, the entire contents of which are incorporated herein by reference.

Isometric expansion of the sample can increase the spatial resolution of the subsequent analysis of the sample. The increased resolution in spatial profiling can be determined by comparison of an isometrically expanded sample with a sample that has not been isometrically expanded.

In some embodiments, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some embodiments, the sample is isometrically expanded to at least 2× and less than 20× of its non-expanded size.

(vii) Crosslinking and De-Crosslinking

In some embodiments, the biological sample is reversibly cross-linked prior to or during an in situ assay. In some aspects, the analytes, polynucleotides and/or amplification product (e.g., amplicon) of an analyte or a probe bound thereto can be anchored to a polymer matrix. For example, the polymer matrix can be a hydrogel. In some embodiments, one or more of the polynucleotide probes and/or amplification product (e.g., amplicon) thereof can be modified to contain functional groups that can be used as an anchoring site to attach the polynucleotide probes and/or amplification product to a polymer matrix. In some embodiments, a modified probe comprising oligo dT may be used to bind to mRNA molecules of interest, followed by reversible crosslinking of the mRNA molecules.

In some embodiments, the biological sample is immobilized in a hydrogel via cross-linking of the polymer material that forms the hydrogel. Cross-linking can be performed chemically and/or photochemically, or alternatively by any other suitable hydrogel-formation method. A hydrogel may include a macromolecular polymer gel including a network. Within the network, some polymer chains can optionally be cross-linked, although cross-linking does not always occur.

In some embodiments, a hydrogel can include hydrogel subunits, such as, but not limited to, acrylamide, bis-acrylamide, polyacrylamide and derivatives thereof, poly(ethylene glycol) and derivatives thereof (e.g., PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

In some embodiments, a hydrogel includes a hybrid material, e.g., the hydrogel material includes elements of both synthetic and natural polymers. Examples of suitable hydrogels are described, for example, in U.S. Pat. Nos. 6,391,937, 9,512,422, and 9,889,422, and in U.S. Patent Application Publication Nos. 2017/0253918, 2018/0052081 and 2010/0055733, the entire contents of each of which are incorporated herein by reference.

In some embodiments, the hydrogel can form the substrate. In some embodiments, the substrate includes a hydrogel and one or more second materials. In some embodiments, the hydrogel is placed on top of one or more second materials. For example, the hydrogel can be pre-formed and then placed on top of, underneath, or in any other configuration with one or more second materials. In some embodiments, hydrogel formation occurs after contacting one or more second materials during formation of the substrate. Hydrogel formation can also occur within a structure (e.g., wells, ridges, projections, and/or markings) located on a substrate.

In some embodiments, hydrogel formation on a substrate occurs before, contemporaneously with, or after probes are provided to the sample. For example, hydrogel formation can be performed on the substrate already containing the probes.

In some embodiments, hydrogel formation occurs within a biological sample. In some embodiments, a biological sample (e.g., tissue section) is embedded in a hydrogel. In some embodiments, hydrogel subunits are infused into the biological sample, and polymerization of the hydrogel is initiated by an external or internal stimulus.

In embodiments in which a hydrogel is formed within a biological sample, functionalization chemistry can be used. In some embodiments, functionalization chemistry includes hydrogel-tissue chemistry (HTC). Any hydrogel-tissue backbone (e.g., synthetic or native) suitable for HTC can be used for anchoring biological macromolecules and modulating functionalization. Non-limiting examples of methods using HTC backbone variants include CLARITY, PACT, ExM, SWITCH and ePACT. In some embodiments, hydrogel formation within a biological sample is permanent. For example, biological macromolecules can permanently adhere to the hydrogel allowing multiple rounds of interrogation. In some embodiments, hydrogel formation within a biological sample is reversible.

In some embodiments, additional reagents are added to the hydrogel subunits before, contemporaneously with, and/or after polymerization. For example, additional reagents can include but are not limited to oligonucleotides (e.g., probes), endonucleases to fragment DNA, fragmentation buffer for DNA, DNA polymerase enzymes, dNTPs used to amplify the nucleic acid and to attach the barcode to the amplified fragments. Other enzymes can be used, including without limitation, RNA polymerase, transposase, ligase, proteinase K, and DNAse. Additional reagents can also include reverse transcriptase enzymes, including enzymes with terminal transferase activity, primers, and switch oligonucleotides. In some embodiments, optical labels are added to the hydrogel subunits before, contemporaneously with, and/or after polymerization.

In some embodiments, HTC reagents are added to the hydrogel before, contemporaneously with, and/or after polymerization. In some embodiments, a cell labelling agent is added to the hydrogel before, contemporaneously with, and/or after polymerization. In some embodiments, a cell-penetrating agent is added to the hydrogel before, contemporaneously with, and/or after polymerization.

Hydrogels embedded within biological samples can be cleared using any suitable method. For example, electrophoretic tissue clearing methods can be used to remove biological macromolecules from the hydrogel-embedded sample. In some embodiments, a hydrogel-embedded sample is stored before or after clearing of hydrogel, in a medium (e.g., a mounting medium, methylcellulose, or other semi-solid mediums).

In some embodiments, a method disclosed herein comprises de-crosslinking the reversibly cross-linked biological sample. The de-crosslinking does not need to be complete. In some embodiments, only a portion of crosslinked molecules in the reversibly cross-linked biological sample are de-crosslinked and allowed to migrate.

(viii) Tissue Permeabilization and Treatment

In some embodiments, a biological sample can be permeabilized to facilitate transfer of species (such as probes) into the sample. If a sample is not permeabilized sufficiently, the amount of species (such as probes) in the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases). In some embodiments, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some embodiments, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some embodiments, the biological sample can be permeabilized by non-chemical permeabilization methods. For example, non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some embodiments, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to opening up DNA in a cell for hybridization by a probe. For example, proteinase K treatment may be used to free up DNA with proteins bound thereto.

(ix) Selective Enrichment of RNA Species

In some embodiments, where RNA is the analyte, one or more RNA analyte species of interest can be selectively enriched. For example, one or more species of RNA of interest can be selected by addition of one or more oligonucleotides to the sample. In some embodiments, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

Alternatively, one or more species of RNA can be down-selected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics*, 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxyapatite chromatography to enrich transcriptome diversity in RNA-seq applications, *Biotechniques*, 53(6) 373-80, (2012), the entire contents of which are incorporated herein by reference).

A biological sample may comprise one or a plurality of analytes of interest. Methods for performing multiplexed assays to analyze two or more different analytes in a single biological sample are provided.

B. Analytes

The methods and compositions disclosed herein can be used to detect and analyze a wide variety of different analytes. In some aspects, an analyte can include any biological substance, structure, moiety, or component to be analyzed. In some aspects, a target disclosed herein may similarly include any analyte of interest. In some examples, a target or analyte can be directly or indirectly detected.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g. an affinity binding partner) can be developed. Such a specific binding partner may be a nucleic acid probe (for a nucleic acid analyte) and may lead directly to the generation of a RCA template (e.g. a padlock or other circularizable probe). Alternatively, the specific binding partner may be coupled to a nucleic acid, which may be detected using an RCA strategy, e.g. in an assay which uses or generates a circular nucleic acid molecule which can be the RCA template.

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which comprise a lipid or carbohydrate component. The analyte may be a single molecule or a complex that contains two or more molecular subunits, e.g. including but not limited to protein-DNA complexes, which may or may not be covalently bound to one another, and which may be the same or different. Thus in addition to cells or microorganisms, such a complex analyte may also be a protein complex or protein interaction. Such a complex or interaction may thus be a homo- or hetero-multimer. Aggregates of molecules, e.g. proteins may also be target analytes, for example aggregates of the same protein or different proteins. The analyte may also be a complex between proteins or peptides and nucleic acid molecules such as DNA or RNA, e.g. interactions between proteins and nucleic acids, e.g. regulatory factors, such as transcription factors, and DNA or RNA.

(i) Endogenous Analytes

In some embodiments, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some embodiments, the analyte is inside a cell or on a cell surface, such as a transmembrane analyte or one that is attached to the cell membrane. In some embodiments, the analyte can be an organelle (e.g., nuclei or mitochondria). In some embodiments, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some embodiments described herein, an analyte may be a denatured nucleic acid (e.g., an analyte comprising the complementary strand), wherein the resulting denatured nucleic acid is single-stranded. The nucleic acid may be denatured, for example, optionally using formamide, heat, or both formamide and heat. In some embodiments, the nucleic acid is not denatured for use in a method disclosed herein.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any embodiment described herein, the analyte comprises a target sequence. In some embodiments, the target sequence may be endogenous to the sample, generated in the sample, added to the sample, or associated with an analyte in the sample. In some embodiments, the target sequence is a single-stranded target sequence (e.g., a sequence in a rolling circle amplification product). In some embodiments, the analytes comprise one or more single-stranded target sequences. In one aspect, a first single-stranded target sequence is not identical to a second single-stranded target sequence. In another aspect, a first single-stranded target sequence is identical to one or more second single-stranded target sequence. In some embodiments, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

(ii) Labelling Agents

In some embodiments, provided herein are methods and compositions for analyzing endogenous analytes (e.g., RNA, ssDNA, and cell surface or intracellular proteins and/or metabolites) in a sample using one or more labelling agents. In some embodiments, an analyte labelling agent may include an agent that interacts with an analyte (e.g., an endogenous analyte in a sample). In some embodiments, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some embodiments, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some embodiments, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some embodiments, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some embodiments, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some embodiments, an analyte binding moiety includes one or more antibodies or epitope binding fragments thereof. The antibodies or epitope binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte labelling agents comprising a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte labelling agents are the same. In some embodiments in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected, e.g., the in situ techniques described herein.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, the content of which is entirely incorporated herein by reference. Likewise, protein and peptide biotinylation techniques have been developed and are readily available. See, e.g., U.S. Pat. No. 6,265,552, the content of which is entirely incorporated herein by reference. Furthermore, click reaction chemistry may be used to couple reporter oligonucleotides to labelling agents. Commercially available kits, such as those from Thunder-link and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some embodiments, the reporter oligonucleotides are releasable from the labelling agent, such as upon application of a stimulus. For example, the reporter oligonucleotide may be attached to the labeling agent through a labile bond (e.g., chemically labile, photolabile, thermally labile, etc.) as generally described for releasing molecules from supports elsewhere herein.

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (e.g., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

(iii) Products of Endogenous Analyte and/or Labelling Agent

In some embodiments, provided herein are methods and compositions for analyzing one or more products of an endogenous analyte and/or a labelling agent in a biological sample. In some embodiments, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product such as a rolling circle amplification (RCA) product) thereof is analyzed. In some embodiments, a labelling agent that directly or indirectly binds to an analyte in the biological sample is analyzed. In some embodiments, a product (e.g., a hybridization product, a ligation product, an extension product (e.g., by a DNA or RNA polymerase), a replication product, a transcription/reverse transcription product, and/or an amplification product such as a rolling circle amplification (RCA) product) of a labelling agent that directly or indirectly binds to an analyte in the biological sample is analyzed.

(a) Hybridization

In some embodiments, a product of an endogenous analyte and/or a labelling agent is a hybridization product comprising the pairing of substantially complementary or complementary nucleic acid sequences within two different molecules, one of which is the endogenous analyte or the labelling agent (e.g., reporter oligonucleotide attached thereto). The other molecule can be another endogenous molecule or another labelling agent such as a probe. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

Various probes and probe sets can be hybridized to an endogenous analyte and/or a labelling agent and each probe may comprise one or more barcode sequences. Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set, and RNA-templated ligation probes. The specific probe or probe set design can vary.

(b) Ligation

In some embodiments, a product of an endogenous analyte and/or a labelling agent is a ligation product. In some embodiments, the ligation product is formed between two or more endogenous analytes. In some embodiments, the ligation product is formed between an endogenous analyte and a labelling agent. In some embodiments, the ligation product is formed between two or more labelling agent. In some embodiments, the ligation product is an intramolecular ligation of an endogenous analyte. In some embodiments, the ligation product is an intramolecular ligation of a labelling agent, for example, the circularization of a circularizable probe or probe set upon hybridization to a target sequence. The target sequence can be comprised in an endogenous analyte (e.g., nucleic acid such as a genomic DNA or mRNA) or a product thereof (e.g., cDNA from a cellular mRNA transcript), or in a labelling agent (e.g., the reporter oligonucleotide) or a product thereof.

In some embodiments, provided herein is a probe or probe set capable of DNA-templated ligation, such as from a cDNA molecule. See, e.g., U.S. Pat. No. 8,551,710, which is hereby incorporated by reference in its entirety. In some embodiments, provided herein is a probe or probe set capable of RNA-templated ligation. See, e.g., U.S. Pat. Pub. 2020/0224244 which is hereby incorporated by reference in its entirety. In some embodiments, the probe set is a SNAIL probe set. See, e.g., U.S. Pat. Pub. 2019/0055594, which is hereby incorporated by reference in its entirety. In some embodiments, provided herein is a multiplexed proximity ligation assay. See, e.g., U.S. Pat. Pub. 2014/0194311 which is hereby incorporated by reference in its entirety. In some embodiments, provided herein is a probe or probe set capable of proximity ligation, for instance a proximity ligation assay for RNA (e.g., PLAYR) probe set. See, e.g., U.S. Pat. Pub. 20160108458, which is hereby incorporated by reference in its entirety. In some embodiments, a circular probe can be indirectly hybridized to the target nucleic acid. In some embodiments, the circular construct is formed from a probe set capable of proximity ligation, for instance a proximity ligation in situ hybridization (PLISH) probe set. See, e.g., U.S. Pat. Pub. 2020/0224243 which is hereby incorporated by reference in its entirety.

In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as *E. coli* DNA ligase, Tth DNA ligase, *Thermococcus* sp. (strain 9° N) DNA ligase (9°N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some embodiments, the ligase is a T4 RNA ligase. In some embodiments, the ligase is a splintR ligase. In some embodiments, the ligase is a single stranded DNA ligase. In some embodiments, the ligase is a T4 DNA ligase. In some embodiments, the ligase is a ligase that has a DNA-splinted DNA ligase activity. In some embodiments, the ligase is a ligase that has an RNA-splinted DNA ligase activity.

In some embodiments, the ligation herein is a direct ligation. In some embodiments, the ligation herein is an indirect ligation. "Direct ligation" can comprise ligating the ends of polynucleotides hybridized immediately adjacently to one another to form a substrate for a ligase enzyme resulting in their ligation to each other (intramolecular ligation). "Indirect ligation" can comprise ligating the ends of polynucleotides hybridized non-adjacently to one another, e.g., separated by one or more intervening nucleotides or gaps. In some embodiments, said ends are not ligated directly to each other, but instead are ligated either via the intermediacy of one or more intervening (so-called gap or gap-filling (oligo)nucleotides) or by the extension of the 3' end of a probe to fill the gap corresponding to said intervening nucleotides (intermolecular ligation). In some cases, the gap of one or more nucleotides between the hybridized ends of the polynucleotides may be filled by one or more gap (oligo)nucleotide(s) which are complementary to a splint, a circularizable probe or probe set (e.g., padlock probe), or a target nucleic acid. The gap may be a gap of 1 to 60 nucleotides or a gap of 1 to 40 nucleotides or a gap of 3 to 40 nucleotides. In specific embodiments, the gap may be a gap of about 1, 2, 3, 4, 5, 6, 7, 8, 9 or 10 or more nucleotides, of any integer (or range of integers) of nucleotides in between the indicated values. In some embodiments, the gap between said terminal regions may be filled by a gap oligonucleotide or by extending the 3' end of a polynucleotide. In some cases, ligation involves ligating the ends of the probe to at least one gap (oligo)nucleotide, such that the gap (oligo)nucleotide becomes incorporated into the resulting polynucleotide. In some embodiments, the ligation herein is preceded by gap filling, for example, by Mu polymerase, DNA polymerase, RNA polymerase, reverse transcriptase, VENT polymerase, Taq polymerase, and/or any combinations, derivatives, and variants (e.g., engineered mutants) thereof. In some embodiments, the ligation herein does not require gap filling.

In some embodiments, ligation of the polynucleotides produces polynucleotides with melting temperature higher than that of unligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some embodiments, the ligation herein is a proximity ligation of ligating two (or more) nucleic acid sequences that are in proximity with each other, e.g., through enzymatic means (e.g., a ligase). In some embodiments, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

(c) Primer Extension and Amplification

In some embodiments, a product is a primer extension product of an analyte, a labelling agent, a probe or probe set bound to the analyte (e.g., a padlock probe bound to genomic DNA, mRNA, or cDNA), or a probe or probe set bound to the labelling agent (e.g., a padlock probe bound to one or more reporter oligonucleotides from the same or different labelling agents).

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence. A primer extension reaction generally refers to any method where two nucleic acid sequences become linked (e.g., hybridized) by an overlap of their respective terminal complementary nucleic acid sequences (e.g., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some embodiments, a product of an endogenous analyte and/or a labelling agent is an amplification product of one or more polynucleotides, for instance, a circular probe or circularizable probe or probe set. In some embodiments, the amplifying is achieved by performing rolling circle amplification (RCA). In some embodiments, a primer that hybridizes to the circular probe or circularized probe is added and used as such for amplification. In some embodiments, the RCA comprises a linear RCA, a branched RCA, a dendritic RCA, or any combination thereof.

In some embodiments, the amplification is performed at a temperature between or between about 20° C. and about 60° C. In some embodiments, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some embodiments, upon addition of a DNA polymerase in the presence of appropriate dNTP precursors and other cofactors, a primer is elongated to produce multiple copies of the circular template. This amplification step can utilize isothermal amplification or non-isothermal amplification. In some embodiments, after the formation of the hybridization complex and association of the amplification probe, the hybridization complex is rolling-circle amplified to generate a cDNA nanoball (e.g., amplicon) containing multiple copies of the cDNA. Techniques for rolling circle amplification (RCA), for example, include linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49(11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29:e1 18, 2001; Dean et al. Genome Res. 1 1:1095-1099, 2001; Schweitzer et al, Nature Biotech. 20:359-365, 2002; U.S. Pat. Nos. 6,054, 274, 6,291,187, 6,323,009, 6,344,329 and 6,368,801, all of which herein are incorporated by reference in its entirety). Exemplary polymerases for use in RCA comprise DNA polymerase such phi29 ((φ29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some embodiments, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some embodiments, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some aspects, the polynucleotides and/or amplification product (e.g., amplicon) can be anchored to a polymer matrix. For example, the polymer matrix can be a hydrogel. In some embodiments, one or more of the polynucleotide probe(s) can be modified to contain functional groups that can be used as an anchoring site to attach the polynucleotide probes and/or amplification product to a polymer matrix. Exemplary modification and polymer matrix that can be employed in accordance with the provided embodiments comprise those described in, for example, U.S. Pat. Nos.

10,138,509, 11,118,220, 11,078,520, 11,118,220 and US 2017/0219465, all of which are incorporated by reference in their entireties. In some examples, the scaffold also contains modifications or functional groups that can react with or incorporate the modifications or functional groups of the probe set or amplification product. In some examples, the scaffold can comprise oligonucleotides, polymers or chemical groups, to provide a matrix and/or support structures.

The amplification products may be immobilized within the matrix generally at the location of the nucleic acid being amplified, thereby creating a localized colony of amplicons. The amplification products may be immobilized within the matrix by steric factors. The amplification products may also be immobilized within the matrix by covalent or noncovalent bonding. In this manner, the amplification products may be considered to be attached to the matrix. By being immobilized to the matrix, such as by covalent bonding or cross-linking, the size and spatial relationship of the original amplicons is maintained. By being immobilized to the matrix, such as by covalent bonding or cross-linking, the amplification products are resistant to movement or unraveling under mechanical stress.

In some aspects, the amplification products are copolymerized and/or covalently attached to the surrounding matrix thereby preserving their spatial relationship and any information inherent thereto. For example, if the amplification products are those generated from DNA or RNA within a cell embedded in the matrix, the amplification products can also be functionalized to form covalent attachment to the matrix preserving their spatial information within the cell thereby providing a subcellular localization distribution pattern. In some embodiments, the provided methods involve embedding the one or more polynucleotide probe sets and/or the amplification products in the presence of hydrogel subunits to form one or more hydrogel-embedded amplification products. In some embodiments, the hydrogel-tissue chemistry described comprises covalently attaching nucleic acids to in situ synthesized hydrogel for tissue clearing, enzyme diffusion, and multiple-cycle sequencing while an existing hydrogel-tissue chemistry method cannot. In some embodiments, to enable amplification product embedding in the tissue-hydrogel setting, amine-modified nucleotides are comprised in the amplification step (e.g., RCA), functionalized with an acrylamide moiety using acrylic acid N-hydroxysuccinimide esters, and copolymerized with acrylamide monomers to form a hydrogel.

In some embodiments, the RCA template may comprise the target analyte, or a part thereof, where the target analyte is a nucleic acid, or it may be provided or generated as a proxy, or a marker, for the analyte. As noted above, many assays are known for the detection of numerous different analytes, which use a RCA-based detection system, e.g., where the signal is provided by generating a RCP from a circular RCA template which is provided or generated in the assay, and the RCP is detected to detect the analyte. The RCP may thus be regarded as a reporter which is detected to detect the target analyte. However, the RCA template may also be regarded as a reporter for the target analyte; the RCP is generated based on the RCA template, and comprises complementary copies of the RCA template. The RCA template determines the signal which is detected, and is thus indicative of the target analyte. As will be described in more detail below, the RCA template may be a probe, or a part or component of a probe, or may be generated from a probe, or it may be a component of a detection assay (e.g., a reagent in a detection assay), which is used as a reporter for the assay, or a part of a reporter, or signal-generation system.

The RCA template used to generate the RCP may thus be a circular (e.g. circularized) reporter nucleic acid molecule, namely from any RCA-based detection assay which uses or generates a circular nucleic acid molecule as a reporter for the assay. Since the RCA template generates the RCP reporter, it may be viewed as part of the reporter system for the assay.

In some embodiments, a product herein includes a molecule or a complex generated in a series of reactions, e.g., hybridization, ligation, extension, replication, transcription/reverse transcription, and/or amplification (e.g., rolling circle amplification), in any suitable combination. For example, a product comprising a target sequence for a probe disclosed herein (e.g., a probe comprising the hybridizing region comprising one or more photoreactive nucleotides) may be a hybridization complex formed of a cellular nucleic acid in a sample and an exogenously added nucleic acid probe. The exogenously added nucleic acid probe may comprise an overhang that does not hybridize to the cellular nucleic acid but hybridizes to another probe. The exogenously added nucleic acid probe may be optionally ligated to a cellular nucleic acid molecule or another exogenous nucleic acid molecule. In other examples, a product comprising a target sequence for a probe disclosed herein may be an RCP of a circularizable probe or probe set which hybridizes to a cellular nucleic acid molecule (e.g., genomic DNA or mRNA) or product thereof (e.g., a transcript such as cDNA, a DNA-templated ligation product of two probes, or an RNA-templated ligation product of two probes). In other examples, a product comprising a target sequence for a probe disclosed herein may a probe hybridizing to an RCP. The probe may comprise an overhang that does not hybridize to the RCP but hybridizes to another probe. The probe may be optionally ligated to a cellular nucleic acid molecule or another probe, e.g., an anchor probe that hybridize to the RCP.

C. Target Sequences

A target sequence for a probe disclosed herein may be comprised in any analyte disclose herein, including an endogenous analyte (e.g., a viral or cellular nucleic acid), a labelling agent, or a product of an endogenous analyte and/or a labelling agent.

In some aspects, one or more of the target sequences includes one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI"). In some aspects, a barcode comprises about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some embodiments, a barcode includes two or more sub-barcodes that together function as a single barcode. For example, a polynucleotide barcode can include two or more polynucleotide sequences (e.g., sub-barcodes) that are separated by one or more non-barcode sequences. In some embodiments, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In any of the preceding embodiments, barcodes (e.g., primary and/or secondary barcode sequences) can be analyzed (e.g., detected or sequenced) using any suitable methods or techniques, including those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), in situ sequencing, hybridization-based in situ sequencing (HybISS), targeted in situ sequencing, fluorescent in situ sequencing (FISSEQ), sequencing by synthesis (SBS), sequencing by ligation (SBL), sequencing by hybridization (SBH), or spatially-resolved transcript amplicon readout mapping (STARmap). In any of the preceding embodiments, the methods provided herein can include analyzing the barcodes by sequential hybridization and detection with a plurality of labelled probes (e.g., detection oligos).

In some embodiments, in a barcode sequencing method, barcode sequences are detected for identification of other molecules including nucleic acid molecules (DNA or RNA) longer than the barcode sequences themselves, as opposed to direct sequencing of the longer nucleic acid molecules. In some embodiments, a N-mer barcode sequence comprises $4^N$ complexity given a sequencing read of N bases, and a much shorter sequencing read may be required for molecular identification compared to non-barcode sequencing methods such as direct sequencing. For example, 1024 molecular species may be identified using a 5-nucleotide barcode sequence (4$^5$=1024), whereas 8 nucleotide barcodes can be used to identify up to 65,536 molecular species, a number greater than the total number of distinct genes in the human genome. In some embodiments, the barcode sequences contained in the probes or RCPs are detected, rather than endogenous sequences, which can be an efficient read-out in terms of information per cycle of sequencing. Because the barcode sequences are pre-determined, they can also be designed to feature error detection and correction mechanisms, see, e.g., U.S. Patent Publications 2019/0055594 and 2021/0164039, which are hereby incorporated by reference in their entirety.

III. Nucleic Acid Concatemer and RCA

In some aspects, provided herein are methods and compositions for processing a biological sample comprising a nucleic acid concatemer, such as a product (e.g., an amplification product such as an RCA product) associated with an analyte in the biological sample. In some aspects, the nucleic acid concatemer is an RCA product of one or more probes associated with (e.g., hybridized to or otherwise bound to) an analyte in the biological sample. In some embodiments, the nucleic acid concatemer is a product associated with a labelling agent that directly or indirectly binds to an analyte in the biological sample. In some embodiments, the analyte is a nucleic acid analyte or a non-nucleic acid analyte, and wherein the labelling agent comprises a reporter oligonucleotide and an analyte-binding moiety coupled thereto.

In some embodiments, the nucleic acid concatemer comprises nucleic acids. In some embodiments, the nucleic acid concatemer contains natural and unnatural nucleotides. For example, the nucleic acid concatemer may comprise modified nucleotides, non-nucleotides, or synthetic nucleotides. Nucleotides amendable to the present application include the natural nucleotides of DNA (deoxyribonucleic acid), including adenine (A), guanine (G), cytosine (C), and thymine (T), and the natural nucleotides of RNA (ribonucleic acid), adenine (A), uracil (U), guanine (G), and cytosine (C). Additional suitable bases include natural bases, such as deoxyadenosine, deoxythymidine, deoxyguanosine, deoxycytidine, inosine, diamino purine; base analogs, such as 2-aminoadenosine, 2-thiothymidine, inosine, pyrrolo-pyrimidine, 3-methyl adenosine, C5-propynylcytidine, C5-propynyluridine, C5-bromouridine, C5-fluorouridine, C5-iodouridine, C5-methylcytidine, 7-deazaadenosine, 7-deazaguanosine, 8-oxoadenosine, 8-oxoguanosine, 0(6)-methylguanine, 4-((3-(2-(2-(3-aminopropoxy)ethoxy)ethoxy)propyl)amino)pyrimidin-2(1H)-one, 4-amino-5-(hepta-1,5-diyn-1-yl)pyrimidin-2(1H)-one, 6-methyl-3,7-dihydro-2H-pyrrolo[2,3-d]pyrimidin-2-one, 3H-benzo[b]pyrimido[4,5-e][1,4]oxazin-2(10H)-one, and 2-thiocytidine; modified nucleotides, such as 2'-substituted nucleotides, including 2'-O-methylated bases and 2'-fluoro bases; and modified sugars, such as 2'-fluororibose, ribose, 2'-deoxyribose, arabinose, and hexose; and/or modified phosphate groups, such as phosphorothioates and 5'-N-phosphoramidite linkages. In some embodiments, the modified nucleotides are amine-modified nucleotides.

In some embodiments, the nucleic acid concatemer is between about 1 and about 85 kilobases in length, such as between any of about 1 and about 15 kilobases, about 10 and about 30 kilobases, about 20 and about 40 kilobases, about 30 and about 50 kilobases, about 40 and about 60 kilobases, about 50 and about 70 kilobases, and about 60 and about 85 kilobases in length. In some embodiments, the nucleic acid concatemer is at least 1 kilobase in length, such as any of about 15, 25, 35, 45, 55, 65, or 85 kilobases in length. In some embodiments, the nucleic acid concatemer is more than 85 kilobases in length.

In some embodiments, the nucleic acid concatemer is a rolling circle amplification product comprising a barcode sequence corresponding to an analyte in the biological sample, and the nucleic acid concatemer is between about 1 and about 15 kilobases, between about 15 and about 25 kilobases, between about 25 and about 35 kilobases, between about 35 and about 45 kilobases, between about 45 and about 55 kilobases, between about 55 and about 65 kilobases, between about 65 and about 75 kilobases, or more than 75 kilobases in length.

In some embodiments, the nucleic acid concatemer forms a nanoball such as one having a diameter between about 0.1 µm and about 3 µm. The nanoball may be a product of amplification, such as RCA. In some embodiments, the nanoball has a diameter of between about 0.1 µm and about 4 µm, such as between any of about 0.1 µm and about 0.5 µm, about 0.2 µm and about 2 µm, about 1 µm and about 3 µm, and about 2 µm and about 4 µm. In some embodiments, the nanoball diameter is at least about 0.1 µm, such as at least any of about 0.2 µm, 0.5 µm, 1 µm, 1.5 µm, 2 µm, 2.5 µm, 3 µm, 3.5 µm, and 4 µm.

In some embodiments, as described in Section II.B., the analyte associated with the nucleic acid concatemer may be a nucleic acid analyte. For example, the nucleic acid analyte may be DNA, ssDNA, or RNA. In some embodiments, the analyte is a non-nucleic acid analyte (e.g., a protein). In some embodiments, the nucleic acid concatemer is generated from a labelling agent that directly or indirectly binds to an analyte in the biological sample. Examples of labelling agents are described in Section II.B.ii.

In some aspects, the polynucleotides and/or amplification product (e.g., amplicon) can be further anchored to a polymer matrix. For example, the polymer matrix can be a hydrogel. In some embodiments, one or more of the oligonucleotides probe(s) can be modified to contain functional groups (e.g., photoreactive nucleotides) that can be used as an anchoring site to attach the polynucleotide probes and/or amplification product to a polymer matrix. In some embodiments, the nucleic acid concatemer can further comprise one or more amine-modified nucleotides. Exemplary polymer matrix that can be employed in accordance with the provided embodiments comprise those described in, for example, US 2016/0024555, US 2018/0251833, US 2016/0024555, US 2018/0251833 and US 2017/0219465, all of which are herein incorporated by reference in their entireties. In some examples, the scaffold can comprise oligonucleotides, polymers or chemical groups, to provide a matrix and/or support structures. In some embodiments, the biological sample is not embedded in a polymer matrix.

In some preferred embodiments, the nucleic acid concatemer is an amplification product, such as a rolling circle amplification (RCA) product. RCA may comprise contacting the biological sample with one or more probes to produce an RCA product (RCP).

In some embodiments, the methods disclosed herein involve the use of one or more probes or probe sets that directly or indirectly hybridize to a target nucleic acid, such as a nucleic acid analyte. Various probes and probe sets can be hybridized to a molecule (e.g., an endogenous analyte and/or a labeling agent) in a sample and each probe may comprise one or more barcode sequences. The probes or probes sets can be used to generate a circularized probe for rolling circle amplification, thereby generating the nucleic acid concatemer. In some aspects, the biological sample is contacted with a barcoded probe or barcoded probe set. In some embodiments, the barcode probe or barcoded probe set comprises one or more barcode sequences. Therefore, in some embodiments, the nucleic acid concatemer comprises one or more barcode sequences. The barcode sequence may be specific to a target nucleic acid (e.g., an analyte) in the biological sample, thereby serving to identify the target nucleic acid during downstream analyses.

In some embodiments, the one or more probes or probe sets comprise a circular probe, or a circularizable probe or probe set. In some embodiments, the circular probe or the circularizable probe or probe set is or comprises an oligonucleotide. A circularizable probe or probe set may be ligated to form a circularized probe. In some embodiments, the ligation is templated. In some embodiments, the circular probe or the circularizable probe or probe set comprises a barcode sequence. In some embodiments, the barcode sequence of the circular probe or the circularizable probe or probe set is incorporated into the nucleic acid concatemer during amplification (e.g., RCA).

In some aspects, provided herein are methods for generating a nucleic acid concatemer, wherein the nucleic acid concatemer comprises multiple copies of an oligonucleotide probe recognition site. In some embodiments, the nucleic acid concatemer is contacted with a plurality of oligonucleotide probes that hybridize to the oligonucleotide probe recognition site. In some embodiments, the circular probe, or the circularizable probe or probe set that is incorporated into the nucleic acid concatemer during amplification comprises the oligonucleotide probe recognition site. In some embodiments, the amplification of the circular probe, or the circularizable probe or probe set results in a nucleic acid concatemer comprising multiple copies of the oligonucleotide probe recognition site. In some embodiments, the nucleic acid concatemer comprises at least two copies of the oligonucleotide probe recognition site. In some embodiments, the nucleic acid concatemer comprises about 10, 100, 1,000, or 10,000 copies of the oligonucleotide probe recognition site. In some embodiments, the oligonucleotide probe recognition site comprises between about 10 and about 40 nucleotides in length. In some embodiments, the oligonucleotide probe recognition site comprises about 10, 11, 12, 13, 14, 15, 16, 17, 18, 19, 20, 25, 30, 35, or 40 nucleotides in length.

In some embodiments, the oligonucleotide probe recognition site comprises a first recognition sequence and a second recognition sequence. In some embodiments, the first recognition sequence and the second recognition sequence are identical (e.g., comprise the same sequence of nucleic acids and are the same length). In some embodiments, the first recognition sequence and the second recognition sequence are identical in length, but not in nucleic acid sequence. In some embodiments, the first recognition sequence and the second recognition sequence are different in length and in nucleic acid sequence. In some embodiments, the first and/or second recognition sequences are between about 5 and about 20 nucleotides in length, such as any of about 5, 10, 15, or 20 nucleotides in length. In some embodiments, the first recognition sequence and the second recognition sequences do not overlap.

In some embodiments, a probe disclosed herein is amplified through rolling circle amplification (RCA). In some embodiments, the method comprises using a circular or circularizable construct hybridized to the nucleic acid of interest to generate a circular nucleic acid. In some embodiments, the RCA comprises a linear RCA. In some embodiments, the RCA comprises a branched RCA. In some embodiments, the RCA comprises a dendritic RCA. In some embodiments, the RCA comprises any combination of the foregoing. In some embodiments, the circular nucleic acid is a construct formed using ligation. In some embodiments, the circular construct is formed using template primer extension followed by ligation. In some embodiments, the circular construct is formed by providing an insert between ends to be ligated. In some embodiments, the circular construct is formed using a combination of any of the foregoing. In some embodiments, the ligation is a DNA-DNA templated ligation. In some embodiments, the ligation is an RNA-RNA templated ligation. Exemplary RNA-templated ligation probes and methods are described in US 2020/0224244 which is incorporated herein by reference in its entirety. In some embodiments, the ligation is a RNA-DNA templated ligation. In some embodiments, a splint is provided as a template for ligation.

Any suitable circularizable probe or probe set, or indeed more generally circularizable reporter molecules, may be used to generate the RCA template. By "circularizable" is meant that the probe or reporter (the RCA template) is in the form of a linear molecule having ligatable ends which may circularized by ligating the ends together directly or indirectly to each other, or to the respective ends of an intervening ("gap") oligonucleotide or to an extended 3' end of the circularizable RCA template. A circularizable template may also be provided in two or more parts, namely two or more molecules (e.g., oligonucleotides) which may be ligated together to form a circle. When said RCA template is circularizable it is circularized by ligation prior to RCA. Ligation may be templated using a ligation template, and in the case of padlock and molecular inversion probes and such like the target analyte may provide the ligation template, or it may be separately provided. The circularizable RCA template (or template part or portion) will comprise at its respective 3' and 5' ends regions of complementarity to corresponding cognate complementary regions (or binding sites) in the ligation template, which may be adjacent where the ends are directly ligated to each other, or non-adjacent, with an intervening "gap" sequence, where indirect ligation is to take place.

In the case of padlock probes, in one embodiment the ends of the padlock probe may be brought into proximity to each other by hybridization to adjacent sequences on a target nucleic acid molecule (such as a target analyte), which acts as a ligation template, thus allowing the ends to be ligated together to form a circular nucleic acid molecule, allowing the circularized padlock probe to act as a template for an RCA reaction. In such an example the terminal sequences of the padlock probe which hybridize to the target nucleic acid molecule will be specific to the target analyte in question, and will be replicated repeatedly in the RCA product. They may therefore act as a marker sequence indicative of that target analyte. Accordingly, it can be seen that the marker sequence in the RCA product may be equivalent to a sequence present in the target analyte itself. Alternatively, a marker sequence (e.g. tag or barcode sequence) may be provided in the non-target complementary parts of the padlock probe. In still a further embodiment, the marker sequence may be present in the gap oligonucleotide which is hybridized between the respective hybridized ends of the padlock probe, where they are hybridized to non-adjacent sequences in the target molecule. Such gap-filling padlock probes are akin to molecular inversion probes.

In some embodiments, similar circular RCA template molecules can be generated using molecular inversion probes. Like padlock probes, these are also typically linear nucleic acid molecules capable of hybridizing to a target nucleic acid molecule (such as a target analyte) and being circularized. The two ends of the molecular inversion probe may hybridize to the target nucleic acid molecule at sites which are proximate but not directly adjacent to each other, resulting in a gap between the two ends. The size of this gap may range from only a single nucleotide in some embodiments, to larger gaps of 100 to 500 nucleotides, or longer, in some embodiments. Accordingly, it is necessary to supply a polymerase and a source of nucleotides, or an additional gap-filling oligonucleotide, in order to fill the gap between the two ends of the molecular inversion probe, such that it can be circularized.

As with the padlock probe, the terminal sequences of the molecular inversion probe which hybridize to the target nucleic acid molecule, and the sequence between them, will be specific to the target analyte in question, and will be replicated repeatedly in the RCA product. They may therefore act as a marker sequence indicative of that target analyte. Alternatively, a marker sequence (e.g. tag or barcode sequence) may be provided in the non-target complementary parts of the molecular inversion probe.

In some embodiments, the probes disclosed herein may be invader probes, e.g., for generating a circular nucleic acid such as a circularized probe. Such probes are of particular utility in the detection of single nucleotide polymorphisms. The detection method of the present disclosure may, therefore, be used in the detection of a single nucleotide polymorphism, or indeed any variant base, in the target nucleic acid sequence. Probes for use in such a method may be designed such that the 3' ligatable end of the probe is complementary to and capable of hybridizing to the nucleotide in the target molecule which is of interest (the variant nucleotide), and the nucleotide at the 3' end of the 5' additional sequence at the 5' end of the probe or at the 5' end of another, different, probe part is complementary to the same said nucleotide, but is prevented from hybridizing thereto by a 3' ligatable end (e.g., it is a displaced nucleotide). Cleavage of the probe to remove the additional sequence provides a 5' ligatable end, which may be ligated to the 3' ligatable end of the probe or probe part if the 3' ligatable end is hybridized correctly to the target nucleic acid molecule. Probes designed according to this principle provide a high degree of discrimination between different variants at the position of interest, as only probes in which the 3' ligatable end is complementary to the nucleotide at the position of interest may participate in a ligation reaction. In one embodiment, the probe is provided in a single part, and the 3' and 5' ligatable ends are provided by the same probe. In some embodiments, an invader probe is a padlock probe (an invader padlock or "iLock"), e.g., as described in Krzywkowski et al., *Nucleic Acids Research* 45, e161, 2017 and US 2020/0224244, which are incorporated herein by reference in its entirety.

Other types of probe which result in circular molecules which can be detected by RCA and which comprise either a target analyte sequence or a complement thereof include selector-type probes described in US20190144940, which comprise sequences capable of directing the cleavage of a target nucleic acid molecule so as to release a fragment comprising a target sequence from the target analyte and sequences capable of templating the circularization and ligation of the fragment. US20180327818 describes probes which comprise a 3' sequence capable of hybridizing to a target nucleic acid molecule and acting as a primer for the production of a complement of a target sequence within the target nucleic acid molecule (e.g., by target templated extension of the primer), and an internal sequence capable of templating the circularization and ligation of the extended probe comprising the reverse complement of the target sequence within the target analyte and a portion of the probe. In the case of both such probes, target sequences or complements thereof are incorporated into a circularized molecule which acts as the template for the RCA reaction to generate the RCA product, which consequently comprises concatenated repeats of said target sequence. In some embodiments, said target sequence may act as, or may comprise a marker sequence within the RCA product indicative of the target analyte in question. Alternatively, a marker sequence (e.g. tag or barcode sequence) may be provided in the non-target complementary parts of the probes.

In some embodiments, a probe disclosed herein (e.g., a padlock probe) can comprise a 5' flap which may be recognized by a structure-specific cleavage enzyme, e.g. an enzyme capable of recognizing the junction between single-stranded 5' overhang and a DNA duplex, and cleaving the single-stranded overhang. It will be understood that the branched three-strand structure which is the substrate for the structure-specific cleavage enzyme may be formed by 5' end of one probe part and the 3' end of another probe part when both have hybridized to the target nucleic acid molecule, as well as by the 5' and 3' ends of a one-part probe. Enzymes suitable for such cleavage include Flap endonucleases (FENS), which are a class of enzymes having endonucleolytic activity and being capable of catalyzing the hydrolytic cleavage of the phosphodiester bond at the junction of single- and double-stranded DNA. Thus, in some embodiment, cleavage of the additional sequence 5' to the first target-specific binding site is performed by a structure-specific cleavage enzyme, e.g. a Flap endonuclease. Suitable Flap endonucleases are described in Ma et al. 2000. *JBC* 275, 24693-24700 and in US 2020/0224244 and may include *P. furiosus* (Pfu), *A. fulgidus* (Afu), *M. jannaschii*

(Mja) or *M. thermoautotrophicum* (Mth). In some embodiments an enzyme capable of recognizing and degrading a single-stranded oligonucleotide having a free 5' end may be used to cleave an additional sequence (5' flap) from a structure as described above. Thus, an enzyme having 5' nuclease activity may be used to cleave a 5' additional sequence. Such 5' nuclease activity may be 5' exonuclease and/or 5' endonuclease activity. A 5' nuclease enzyme is capable of recognizing a free 5' end of a single-stranded oligonucleotide and degrading said single-stranded oligonucleotide. A 5' exonuclease degrades a single-stranded oligonucleotide having a free 5' end by degrading the oligonucleotide into constituent mononucleotides from its 5' end. A 5' endonuclease activity may cleave the 5' flap sequence internally at one or more nucleotides. Further, a 5' nuclease activity may take place by the enzyme traversing the single-stranded oligonucleotide to a region of duplex once it has recognized the free 5' end, and cleaving the single-stranded region into larger constituent nucleotides (e.g. dinucleotides or trinucleotides), or cleaving the entire 5' single-stranded region, e.g. as described in Lyamichev et al. 1999. *PNAS* 96, 6143-6148 for Taq DNA polymerase and the 5' nuclease thereof. Preferred enzymes having 5' nuclease activity include Exonuclease VIII, or a native or recombinant DNA polymerase enzyme from *Thermus aquaticus* (Taq), *Thermus thermophilus* or *Thermus flavus*, or the nuclease domain therefrom.

In some embodiments, a nucleic acid probe disclosed herein can be pre-assembled from multiple components, e.g., prior to contacting the nucleic acid probe with a target nucleic acid or a sample. In some embodiments, a nucleic acid probe disclosed herein can be assembled during and/or after contacting a target nucleic acid or a sample with multiple components. In some embodiments, a nucleic acid probe disclosed herein is assembled in situ in a sample. In some embodiments, the multiple components can be contacted with a target nucleic acid or a sample in any suitable order and any suitable combination.

Following formation of the circular nucleic acid, in some instances, an amplification primer is added. In other instances, the amplification primer is added with the primary and/or secondary probes. In some instances, the amplification primer may also be complementary to the target nucleic acid and the circularizable probe (e.g. a padlock probe or a SNAIL probe). In some embodiments, a washing step is performed to remove any unbound probes, primers, etc. In some embodiments, the wash is a stringency wash. Washing steps can be performed at any point during the process to remove non-specifically bound probes, probes that have ligated, etc.

In some instances, upon addition of a DNA polymerase in the presence of appropriate dNTP precursors and other cofactors, the amplification primer is elongated by replication of multiple copies of the template. The amplification step can utilize isothermal amplification or non-isothermal amplification. In some embodiments, after the formation of the hybridization complex and any subsequent circularization (such as ligation of, e.g., a padlock probe) the circular probe is rolling-circle amplified to generate a RCA product (e.g., amplicon) containing multiple copies of the circular.

Suitable examples of DNA polymerases that can be used include, but are not limited to: *E. coli* DNA polymerase I, Bsu DNA polymerase, Bst DNA polymerase, Taq DNA polymerase, VENT™ DNA polymerase, DEEPVENT™ DNA polymerase, LongAmp® Taq DNA polymerase, LongAmp® Hot Start Taq DNA polymerase, Crimson LongAmp® Taq DNA polymerase, Crimson Taq DNA polymerase, OneTaq® DNA polymerase, OneTaq® QuickLoad® DNA polymerase, Hemo KlenTaq® DNA polymerase, REDTaq® DNA polymerase, Phusion® DNA polymerase, Phusion® High-Fidelity DNA polymerase, Platinum Pfx DNA polymerase, AccuPrime Pfx DNA polymerase, Phi29 DNA polymerase, Klenow fragment, Pwo DNA polymerase, Pfu DNA polymerase, T4 DNA polymerase and T7 DNA polymerase enzymes.

In some embodiments, rolling circle amplification products are generated using a polymerase selected from the group consisting of Phi29 DNA polymerase, Phi29-like DNA polymerase, M2 DNA polymerase, B103 DNA polymerase, GA-1 DNA polymerase, phi-PRD1 polymerase, Vent DNA polymerase, Deep Vent DNA polymerase, Vent (exo-) DNA polymerase, KlenTaq DNA polymerase, DNA polymerase I, Klenow fragment of DNA polymerase I, DNA polymerase III, T3 DNA polymerase, T4 DNA polymerase, T5 DNA polymerase, T7 DNA polymerase, Bst polymerase, rBST DNA polymerase, N29 DNA polymerase, TopoTaq DNA polymerase, T7 RNA polymerase, SP6 RNA polymerase, T3 RNA polymerase, and a variant or derivative thereof.

Following amplification, the sequence of the amplicon (e.g., RCA product) or a portion thereof, is determined or otherwise analyzed, for example by using detectably labeled probes and imaging. The sequencing or analysis of the amplification products can comprise sequencing by hybridization, sequencing by ligation, and/or fluorescent in situ sequencing, and/or wherein the in situ hybridization comprises sequential fluorescent in situ hybridization. In some instances, a sequence of the RCA product is detected using, e.g., the secondary and higher order probes and detection oligonucleotides described herein.

In some embodiments, a padlock probe or a probe set that comprises a padlock probe contains one or more barcodes. In some embodiments, the barcodes are bound by detectable probes, which may but do not need to be detectably labeled. In some embodiments, one or more decoding schemes are used to decode the signals, such as fluorescence, for sequence determination. Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); WO 2018/026873; U.S. Pat. No. 10,457,980; US 2016/0369329; and 2017/0220733, all of which are incorporated by reference in their entirety. In some embodiments, these assays enable signal amplification, combinatorial decoding, and error correction schemes at the same time.

IV. Compaction Probe Design, Hybridization, and Ligation

The present disclosure provides methods for stabilizing and/or compacting a nucleic acid concatemer for in situ analyses. A biological sample comprising a nucleic acid concatemer may be contacted with one or more oligonucleotide probes. The oligonucleotide probes comprise two hybridizing regions capable of hybridizing with one or more copies of an oligonucleotide probe recognition site present on the nucleic acid concatemer, and between the two hybridizing regions, a linker not complementary to the oligonucleotide probe recognition site or portion thereof. The ends of the one or more oligonucleotide probes may be connected to form a circular product that remains hybridized to the nucleic acid concatemer. The described methods are useful for the stabilization and/or compaction of nucleic acid concatemers in a biological sample, which provides advantages for downstream in situ analyses (e.g., target sequence detection).

In some aspects, provided herein is a method for analyzing a biological sample, comprising generating a nucleic acid concatemer (e.g., a rolling circle product (RCP) generated from rolling circle amplification (RCA)) in the biological sample. In some embodiments, the nucleic acid concatemer comprises multiple copies of an oligonucleotide probe recognition site. In some embodiments, the biological sample comprising the nucleic acid concatemer is contacted with one or more oligonucleotide probes. In some embodiments, the one or more oligonucleotide probes comprise two hybridizing regions complementary to the oligonucleotide probe recognition site or a portion thereof, and between the two hybridizing regions, a linker not complementary to the oligonucleotide probe recognition site or portion thereof. In some embodiments, the ends of the one or more oligonucleotide probes are connected to form a circular product hybridized to the nucleic acid concatemer.

In some embodiments, the biological sample is contacted with a first oligonucleotide probe and a second oligonucleotide probe. In some embodiments, the first oligonucleotide probe and the second oligonucleotide probe are hybridized to different copies of an oligonucleotide probe recognition site on a nucleic acid concatemer.

In some embodiments, the hybridizing regions of a first oligonucleotide probe are hybridized to a first copy and a second copy of the oligonucleotide probe recognition site, respectively, the hybridizing regions of a second oligonucleotide probe are hybridized to the first copy and the second copy, respectively, and the connecting step comprises ligating the hybridizing regions of the first and second oligonucleotide probes hybridized to each of the first and second copies. In some embodiments, the hybridizing regions of a first oligonucleotide probe are hybridized to a first copy and a second copy of the oligonucleotide probe recognition site, respectively, the hybridizing regions of a second oligonucleotide probe are hybridized to the first copy and a third copy, respectively, and the connecting step comprises ligating the hybridizing regions of the first and second oligonucleotide probes hybridized to the first copy.

In some aspects, provided herein is a method for analyzing a biological sample, comprising contacting the biological sample with a circular probe or circularizable probe or probe set comprising a sequence that hybridizes to a target nucleic acid in the biological sample and a sequence complementary to an oligonucleotide probe recognition site. In some embodiments, the biological sample is further contacted with a first oligonucleotide probe and a second oligonucleotide probe concurrently with the circular probe or circularizable probe or probe set. In some embodiments, the circular probe or a circularized probe generated from the circularizable probe or probe set is used as a template to generate a RCP in the biological sample, wherein the RCP comprises multiple copies of the oligonucleotide probe recognition site. In some embodiments, the oligonucleotide probe recognition site comprises a first recognition sequence and a second recognition sequence. In some embodiments, the first oligonucleotide probe comprises two hybridizing regions complementary to the first recognition sequence, and the second oligonucleotide probe comprises two hybridizing regions complementary to the second recognition sequence. In some embodiments, the ends of the first and second oligonucleotide probes are ligated using the oligonucleotide probe recognition site as a template, thereby form a circular product hybridized to the RCP.

In some aspects, provided herein is a method for analyzing a biological sample, comprising contacting the biological sample with a circular probe or circularizable probe or probe set comprising a sequence that hybridizes to a target nucleic acid in the biological sample and a sequence complementary to an oligonucleotide probe recognition site. In some embodiments, the biological sample is further contacted with a first oligonucleotide probe concurrently with the circular probe or circularizable probe or probe set. In some embodiments, the circular probe or a circularized probe generated from the circularizable probe or probe set is used as a template to generate a RCP in the biological sample, wherein the RCP comprises multiple copies of the oligonucleotide probe recognition site. In some embodiments, the oligonucleotide probe recognition site comprises a first recognition sequence and a second recognition sequence. In some embodiments, the first oligonucleotide probe comprises two hybridizing regions complementary to the first recognition sequence and two hybridizing regions complementary to the second recognition sequence. In some embodiments, the ends of the first oligonucleotide probe are ligated using the oligonucleotide probe recognition site as a template, thereby form a circular product hybridized to the RCP.

In some aspects, provided herein is a method for analyzing a biological sample, comprising contacting the biological sample with a circular probe or circularizable probe or probe set comprising a sequence that hybridizes to a target nucleic acid in the biological sample and a sequence complementary to an oligonucleotide probe recognition site. In some embodiments, the biological sample is further contacted with a first oligonucleotide probe concurrently with the circular probe or circularizable probe or probe set. In some embodiments, the circular probe or a circularized probe generated from the circularizable probe or probe set is used as a template to generate a RCP in the biological sample, wherein the RCP comprises multiple copies of the oligonucleotide probe recognition site. In some embodiments, the first oligonucleotide probe comprises two hybridizing regions complementary to the recognition site. In some embodiments, the ends of the first oligonucleotide probe are ligated using the oligonucleotide probe recognition site as a template, thereby form a circular product hybridized to the RCP.

Certain features and steps of the methods disclosed herein are described with additional detail in the sections below. The modular discussion of certain features and steps is not intended to limit the scope of the methods described herein, and using the teachings provided herein one can readily combine various modularly described features and steps to arrive at the full scope of the methods provided herein.

A. Oligonucleotide Probes

In some aspects, the methods described herein comprise contacting a biological sample with one or more oligonucleotide probes. The oligonucleotide probes provided herein are capable of hybridizing to specific sites on a nucleic acid concatemer (e.g., oligonucleotide probe recognition sites) in the biological sample.

In some embodiments, the biological sample is in contact with the one or more oligonucleotide probes prior to or at the initiation of the generation of the nucleic acid concatemer (e.g., a rolling circle product (RCP)). In some embodiments, the biological sample is in contact with the one or more oligonucleotide probes during the generation of the nucleic acid concatemer. In some embodiments, the biological sample is in contact with the one or more oligonucleotide probes after the generation of the nucleic acid concatemer. For example, the nucleic acid concatemer may have about ten copies of an oligonucleotide recognition site at the time one or more oligonucleotide probes are added to the biological sample. In some embodiments, the nucleic acid can be continued to be generated in the biological sample (e.g., by rolling circle amplification (RCA)) to extend the nucleic acid concatemer (e.g., RCP) to 100, 1000, or more copies of the oligonucleotide recognition site after contacting the biological sample with one or more oligonucleotide probes.

In some embodiments, the oligonucleotide probe comprises a hybridizing region capable of hybridizing with a nucleic acid concatemer. In some embodiments, the hybridizing region of the oligonucleotide probe hybridizes with an oligonucleotide probe recognition site on a nucleic acid concatemer, or a portion thereof (e.g., a recognition sequence). In some embodiments, the hybridizing region comprises a nucleic acid sequence of between about 5 and about 15 base pairs in length. In some embodiments, the hybridizing region comprises a nucleic acid sequence of about 10 base pairs in length.

In some embodiments, the oligonucleotide probe comprises at least two hybridizing regions. In some embodiments, the oligonucleotide probe comprises any of two, three, four, five, or six hybridizing regions. In some embodiments, the hybridizing regions are identical in sequence. In some embodiments, the hybridizing regions comprise different sequences. In some embodiments, the hybridizing regions are identical in length. In some embodiments, the hybridizing regions are of different length. In some embodiments, the hybridizing regions are identical in length but comprises different sequences. In some embodiments, the oligonucleotide probe comprises two hybridizing regions. In some embodiments, the ends of the oligonucleotide probe are in one of the two hybridizing regions. In some embodiments, the hybridizing regions do not overlap. In some embodiments, the at least two hybridizing regions are positioned directly adjacent to one another on the oligonucleotide probe.

In some embodiments, the oligonucleotide probe further comprises a linker. In some embodiments, the linker is not complementary (e.g., does not hybridize) to an oligonucleotide probe recognition site, or a portion thereof, on a nucleic acid concatemer. In some embodiments, the linker comprises a nucleic acid sequence that is any of about 19, 18, 17, 16, 15, 14, 13, 12, 11, 10, 9, 8, 7, 6, 5, 4, 3, 2, or 1 base pairs in length. In some embodiments, the linker comprises about 1, 2, 3, 4, 5, 6, 7, 8, 9, 10, 11, 12, 13, 14, 15, 16, 17, 18, 19, or 20 or more base pairs in length. In some embodiments, the oligonucleotide probe comprises one, two, three, or four linkers. In some embodiments, the nonhybrdizing regions are identical in sequence. In some embodiments, the linkers comprise different sequences. In some embodiments, the linkers are identical in length. In some embodiments, the linkers are of different length. In some embodiments, the linkers are identical in length but comprises different sequences. In some embodiments, the linkers do not overlap.

In some embodiments, the linker position on the oligonucleotide probe is relative to that of the two or more hybridizing regions of the oligonucleotide probe. In some embodiments, the linker is positioned between two hybridizing regions of the oligonucleotide probe. In some embodiments, the ends of the oligonucleotide probe are in the linker. In some embodiments, the linker comprises a stem-loop structure, and the ends of the oligonucleotide probe are in the stem of the stem-loop structure. For example, the oligonucleotide probe may comprise two hybridizing regions positioned adjacent to one another, with a linker flanking the hybridizing regions on one or bother ends of the oligonucleotide probe. In some embodiments, the linker is flanked on its 5' end, 3' end, or on both its 5' end and 3' end, by a hybridizing region.

B. Oligonucleotide Probe Hybridization and Ligation Methods

In some aspects of the methods provided herein, one or more oligonucleotide probes hybridize (e.g., via a hybridizing region) to an oligonucleotide probe recognition site on a nucleic acid concatemer (e.g., RCP) in a biological sample. The ends of the oligonucleotide probe may be connected (e.g., ligated) to form a circularized product hybridized to the nucleic acid concatemer. In some embodiments, the connecting of the ends of the oligonucleotide probe generates a circular product hybridized to the nucleic acid concatemer. In some embodiments, the connecting of the ends of the oligonucleotide probe stabilizes and/or compacts the nucleic acid concatemer in the biological sample.

In some embodiments, the biological sample comprising a nucleic acid concatemer is contacted with one or more oligonucleotide probes, each comprising two or more hybridizing regions. The oligonucleotide probes may be any of the oligonucleotide probes described herein. In some embodiments, the nucleic acid concatemer comprises multiple copies of an oligonucleotide probe recognition site. In some embodiments, the one or more oligonucleotide probes hybridize with the oligonucleotide probe recognition site, or a portion thereof (e.g., a first recognition sequence and a second recognition sequence). In some embodiments, the ends of the one or more oligonucleotide probes hybridize adjacently to one another on the same copy of an oligonucleotide recognition site, e.g., not separated by any intervening nucleotides or gaps. In some embodiments, the ends of the one or more oligonucleotide probes hybridize nonadjacently to one another on the same copy of an oligonucleotide recognition site, e.g., separated by one or more intervening nucleotides or gaps.

In some embodiments, the biological sample is contacted with a plurality of oligonucleotide probes. In some embodiments, the plurality of oligonucleotide probes hybridize with multiple copies of the oligonucleotide probe recognition site, or a portion thereof. In some embodiments, the hybridizing regions of a first oligonucleotide probe of a plurality of oligonucleotide probes hybridizes with two different copies of the oligonucleotide probe recognition site. In some embodiments, the hybridizing regions (e.g., a first hybridizing region and a second hybridizing region) of a first oligonucleotide probe hybridize to a first copy and a second copy of the oligonucleotide probe recognition site.

In some embodiments, the hybridizing regions (e.g., a first hybridizing region and a second hybridizing region) of a first oligonucleotide probe are hybridized to a first copy and a second copy of the oligonucleotide probe recognition site. In some embodiments, the hybridizing regions of a second oligonucleotide probe are hybridized to a first copy and a second copy of the oligonucleotide probe recognition site. In some embodiments wherein the hybridizing regions of the first oligonucleotide probe are hybridized to a first copy and a second copy of the oligonucleotide probe recognition site, the hybridizing regions of a second oligonucleotide probe are hybridized to a first copy and a third copy of the oligonucleotide probe recognition site. In some embodiments wherein the hybridizing regions of the first oligonucleotide probe are hybridized to a first copy and a second copy of the oligonucleotide probe recognition site, the hybridizing regions of a second oligonucleotide probe are hybridized to a second copy and a third copy of the oligonucleotide probe recognition site.

In some embodiments, the first hybridizing region and the second hybridizing region of an oligonucleotide probe are identical. In some embodiments, the first hybridizing region of a first oligonucleotide probe hybridizes with a first recognition sequence of a first copy of the oligonucleotide recognition site, and the second hybridizing region of a first oligonucleotide probe hybridizes with a first recognition sequence of a second copy of the oligonucleotide recognition site. In some embodiments, the first hybridizing region and the second hybridizing region of an oligonucleotide probe are different. In some embodiments, the first hybridizing region of a first oligonucleotide probe hybridizes with a first recognition sequence of a first copy of the oligonucleotide recognition site, and the second hybridizing region of a first oligonucleotide probe hybridizes with a second recognition sequence of a second copy of the oligonucleotide recognition site.

In some embodiments, the method further comprises connecting the ends of one or more oligonucleotide probes. In some embodiments, the connecting of the ends of the one or more oligonucleotide probes occurs while the probes are hybridized to the oligonucleotide probe recognition sites of the nucleic acid concatemer, or a portion thereof. In some embodiments, the connecting of the ends comprises connecting the hybridizing regions of one or more oligonucleotide probes hybridized to the nucleic acid concatemer. In some embodiments, the connecting of the ends comprises connecting the linkers of one or more oligonucleotide probes hybridized to the nucleic acid concatemer. In some embodiments, the connecting of the ends of the one or more oligonucleotide probes forms a circular product hybridized to the nucleic acid concatemer.

In some embodiments, the connecting of the ends of one or more oligonucleotide probes comprises ligating the ends of one or more oligonucleotide probes hybridized to the oligonucleotide probe recognition sites of the nucleic acid concatemer, or a portion thereof. In some embodiments, the ligation comprises the joining of a 5' phosphate and a 3' hydroxyl of one or more oligonucleotide probes. In some embodiments, the ligation is performed using any other suitable technique.

In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein can comprise an enzyme that is commonly used to join polynucleotides together or to join the ends of a single polynucleotide. An RNA ligase, a DNA ligase, or another variety of ligase can be used to ligate one or more oligonucleotide probes together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as E. coli DNA ligase, Tth DNA ligase, Thermococcus sp. (strain 9° N) DNA ligase (9°N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some embodiments, the ligase is a T4 RNA ligase. In some embodiments, the ligase is a splintR ligase. In some embodiments, the ligase is a single stranded DNA ligase. In some embodiments, the ligase is a T4 DNA ligase. In some embodiments, the ligase is a ligase that has a DNA-splinted DNA ligase activity. In some embodiments, the ligase is a ligase that has an RNA-splinted DNA ligase activity.

In some embodiments, the connecting of the ends of one or more oligonucleotide probes comprises direct ligation. In some embodiments, the connecting of the ends of one or more oligonucleotide probes comprises indirect ligation, such as via the intermediacy of one or more gap or gap-filling oligonucleotides or by the extension of the 3' end of the oligonucleotide probe to fill the gap. In some embodiments, the connecting of the ends of one or more oligonucleotide probes comprises ligating the ends of one or more oligonucleotide probes to at least one gap (oligo)nucleotide, such that the gap (oligo)nucleotide becomes incorporated into the resulting circular product hybridized to the nucleic acid concatemer. In some embodiments, the ligation of the hybridized oligonucleotide probes herein is preceded by gap filling. In some embodiments, the ligation of the hybridized oligonucleotides probes herein does not require gap filling.

In some embodiments, ligation of the one or more hybridized oligonucleotide probes produces a circular product hybridized to the nucleic acid concatemer with a melting temperature higher than that of unligated hybridized oligonucleotide probes. Thus, in some aspects, ligation stabilizes the nucleic acid concatemer containing the ligated oligonucleotide probes prior to subsequent analysis. In some embodiments, the ligation of the one or more hybridized oligonucleotide probes produces a circular product hybridized to the nucleic acid concatemer that is compacted compared to that of unligated hybridized oligonucleotide probes. Thus, in some aspects, ligation compacts the nucleic acid concatemer containing the ligated oligonucleotide probes prior to subsequent analysis.

In some aspects, a high fidelity ligase, such as a thermostable DNA ligase (e.g., a Taq DNA ligase), is used to ligate the ends of one or more oligonucleotide probes. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some embodiments, the ligation herein is a proximity ligation of ligating two nucleic acid sequences of one or more oligonucleotide probes, that are in proximity with each other, e.g., through enzymatic means (e.g., a ligase). In some embodiments, proximity ligation can include a gap-filling step that involves incorporation of one or more nucleic acids by a polymerase, based on the nucleic acid sequence of a template nucleic acid molecule, spanning a distance between the ends of the one or more oligonucleotide probes (see, e.g., U.S. Pat. No. 7,264,929, the entire contents of which are incorporated herein by reference). A wide variety of different methods can be used for proximity ligating one or more oligonucleotide probes, including (but not limited to) sticky-end and blunt-end ligations. Additionally, single-stranded ligation can be used to perform proximity ligation on one or more oligonucleotide probes. Sticky-end proximity ligations involve the hybridization of complementary single-stranded sequences between the one or more oligonucleotide probes to be joined, prior to the ligation event itself. Blunt-end proximity ligations generally do not include hybridization of complementary regions from each end of the one or more oligonucleotide probes, because both molecules lack a single-stranded overhang at the site of ligation.

C. Hydrogel Embedding

In some aspects, the methods provided herein further comprise embedding and/or immobilizing a sample (e.g., a biological sample) in a hydrogel matrix. In some embodiments, the nucleic acid concatemer (e.g., RCPs) generated by any of the methods described herein are embedded in a hydrogel matrix. Methods for embedding a sample in a matrix have been described in, e.g., US Patent Publications 2016/0024555 and 2019/0276881, which are incorporated herein by reference in their entirety. In some embodiments, the hydrogel comprises a three dimensional matrix. For example, the matrix may be a three dimensional nucleic acid-containing polymer. In some embodiments, the polymer is a gel or a hydrogel. In some embodiments, the nucleic acids described herein (e.g., oligonucleotide probes) may be bound a hydrogel matrix to stabilize a nucleic acid concatemer.

In some embodiments, the matrix may encapsulate a biological sample, such as a tissue sample. In some embodiments, the sample is embedded or immobilized, partially or completely, in the matrix. In some embodiments, the matrix comprises polyacrylamide, cellulose, alginate, polyamide, cross-linked agarose, cross-linked dextran or cross-linked polyethylene glycol. In some embodiments, the matrix comprises any suitable polymerizing and/or crosslinking material. In some embodiments, polymerization initiators and/or crosslinkers may be present. In some embodiments, the matrix is porous, such that exogenous reagents and/or oligonucleotide probes described herein may be introduced to the matrix.

In some aspects, the oligonucleotide probe bound to the three dimensional matrix comprises naturally or non-naturally occurring nucleic acids (e.g., synthetic or modified nucleic acids). In some embodiments, the oligonucleotide probe is modified to incorporate a functional moiety for attachment to the matrix (such as, by covalent cross-linking or non-covalent binding). In some embodiments, the functional moiety is bound to the oligonucleotide probe at the 3' end of the probe. In some embodiments, the functional moiety is bound to the oligonucleotide probe at the 5' end of the probe. In some embodiments, the functional moiety is cross-linked to a modified nucleic acid (e.g., dNTP or dUTP) on the oligonucleotide probe. In some embodiments, the cross-linker reactive group is any suitable reactive group.

In some embodiments, the matrix is modified to incorporate a functional moiety for attachment to the oligonucleotide probe. In some embodiments, the functional moiety of the oligonucleotide probe is attached (e.g., by covalent cross-linking or non-covalent binding) to the matrix via the functional group of the matrix. In some embodiments, the cross-linkers further include a spacer for attachment to the matrix. In some embodiments, the spacer comprises polyethylene glycol, carbon spacers, and/or photo-cleavable spacers.

The functional moiety of the oligonucleotide probe and/or the matrix may comprise a ligand. In some embodiments, the ligand reacts with a cross-linker or another ligand (e.g., the ligand of the oligonucleotide probe reacts with the ligand of the matrix). In some embodiments, the functional moiety is any of an amine, acrydite, alkyne, biotin, azide, and thiol.

In some embodiments, the method comprises embedding an oligonucleotide probe comprising a functional moiety described herein to the matrix. In some embodiments, the functional moiety of the matrix is an alkyne, and the functional moiety of the oligonucleotide probe is an azide.

V. Detection and Analysis

In some aspects, the provided methods involve analyzing, e.g., detecting or determining, one or more sequences present in the target nucleic acid and/or in the nucleic acid concatemers described herein. In some embodiments, the detecting comprises hybridizing one or more detectably labeled probes to the nucleic acid concatemer, or via hybridization to adaptor probes that hybridize to the nucleic acid concatemer). In some embodiments, the analysis comprises determining the sequence of all or a portion of the nucleic acid concatemer (e.g., a barcode sequence or a complement thereof), wherein the sequence is indicative of a sequence of the target nucleic acid.

In some cases, analysis is performed on one or more images captured, and may comprise processing the image(s) and/or quantifying signals observed. In some embodiments, images of signals from different fluorescent channels and/or detectable probe hybridization cycles can be compared and analyzed. In some embodiments, images of signals (or absence thereof) at a particular location in a sample from different fluorescent channels and/or sequential detectable probe hybridization cycles can be aligned to analyze an analyte at the location. For instance, a particular location in a sample can be tracked and signal spots from sequential probe hybridization (and optionally ligation) cycles can be analyzed to detect a target polynucleotide sequence (e.g., a barcode sequence or subsequence thereof) in a nucleic acid at the location. The analysis may comprise processing information of one or more cell types, one or more types of analytes, a number or level of analyte, and/or a number or level of cells detected in a particular region of the sample. In some embodiments, the analysis comprises detecting a sequence e.g., a barcode sequence present in an amplification product at a location in the sample. In some embodiments, the analysis includes quantification of puncta (e.g., if amplification products are detected). In some cases, the analysis includes determining whether particular cells and/or signals are present that correlate with one or more analytes from a particular panel. In some embodiments, the obtained information may be compared to a positive and negative control, or to a threshold of a feature to determine if the sample exhibits a certain feature or phenotype. In some cases, the information may comprise signals from a cell, a region, and/or comprise readouts from multiple detectable labels. In some case, the analysis further includes displaying the information from the analysis or detection step. In some embodiments, software may be used to automate the processing, analysis, and/or display of data.

Methods for binding and identifying a target nucleic acid that uses various probes or oligonucleotides have been described in, e.g., US2003/0013091, US2007/0166708, US2010/0015607, US2010/0261026, US2010/0262374, US2010/0112710, US2010/0047924, and US2014/0371088, each of which is incorporated herein by reference in its entirety. Detectably-labeled probes can be useful for detecting multiple target nucleic acids and be detected in one or more hybridization cycles (e.g., sequential hybridization in a FISH-type assay, sequencing by hybridization).

In some embodiments, the methods comprise determining the sequence of all or a portion of the nucleic acid concatemer, such as one or more barcode sequences present in the nucleic acid concatemer. In some embodiments, the sequence of the nucleic acid concatemer, or barcode thereof, is indicative of a sequence of the target nucleic acid to which the nucleic acid concatemer is hybridized. In some embodiments, the analysis and/or sequence determination comprises sequencing all or a portion of the nucleic acid concatemer and/or in situ hybridization to the nucleic acid concatemer. In some embodiments, the sequencing step involves sequencing by hybridization, sequencing by ligation, sequencing by synthesis, sequencing by binding, and/or fluorescent in situ sequencing (FISSEQ), hybridization-based in situ sequencing and/or wherein the in situ hybridization comprises sequential fluorescent in situ hybridization. In some embodiments, the analysis and/or sequence determination comprises detecting a polymer generated by a hybridization chain reaction (HCR) reaction, see e.g., US2017/0009278, which is incorporated herein by reference in its entirety, for exemplary probes and HCR reaction components. In some embodiments, the detection or determination comprises hybridizing to the first overhang a detection oligonucleotide labeled with a fluorophore, an isotope, a mass tag, or a combination thereof. In some embodiments, the detection or determination comprises imaging the probe hybridized to the target nucleic acid (e.g., imaging one or more detectably labeled probes hybridized thereto). In some embodiments, the target nucleic acid is an mRNA in a tissue sample, and the detection or determination is performed when the target nucleic acid and/or the amplification product is in situ in the tissue sample. In some embodiments, the target nucleic acid is an amplification product (e.g., a rolling circle amplification product/nucleic acid concatemer).

In some embodiments, nucleic acid sequence determination (e.g., of a barcode sequence in the RCP of a circular or circularizable probe or probe set disclosed herein) can be carried out using a method that comprises signal amplification. Exemplary signal amplification methods include targeted deposition of detectable reactive molecules around the site of probe hybridization, targeted assembly of branched structures (e.g., bDNA or branched assay using locked nucleic acid (LNA)), hybridization chain reaction (HCR), linear oligonucleotide hybridization chain reaction (LO-HCR), programmed in situ growth of concatemers by enzymatic rolling circle amplification (RCA) (e.g., as described in US 2019/0055594 incorporated herein by reference), hybridization chain reaction, assembly of topologically catenated DNA structures using serial rounds of chemical ligation (clampFISH), signal amplification via hairpin-mediated concatemerization (e.g., as described in US 2019/0106733 and US 2020/0362398 incorporated herein by reference), e.g., primer exchange reactions such as signal amplification by exchange reaction (SABER) or SABER with DNA-Exchange (Exchange-SABER). In some embodiments, a non-enzymatic signal amplification method may be used.

In some embodiments, the assembly for branched signal amplification can comprises an amplifier hybridized directly or indirectly (via one or more oligonucleotides) to a sequence of the target nucleic acid or a probe or probe product. In some embodiments, the assembly includes one or more amplifiers each including an amplifier repeating sequence. In some aspects, the one or more amplifiers is labeled. For exemplary branched signal amplification, see e.g., U.S. Pat. Pub. No. US20200399689A1, US20220064697A1, and Xia et al., Multiplexed Detection of RNA using MERFISH and branched DNA amplification. Scientific Reports (2019), each of which is fully incorporated by reference herein.

HCR is an enzyme-free nucleic acid amplification based on a triggered chain of hybridization of nucleic acid molecules starting from HCR monomers, which hybridize to one another to form a nicked nucleic acid polymer. This polymer is the product of the HCR reaction which is ultimately detected in order to indicate the presence of the target analyte. HCR is described in detail in Dirks and Pierce, 2004, PNAS, 101(43), 15275-15278 and in U.S. Pat. Nos. 7,632,641 and 7,721,721 (see also US 2006/00234261; Chemeris et al, 2008 Doklady Biochemistry and Biophysics, 419, 53-55; Niu et al, 2010, 46, 3089-3091; Choi et al, 2010, Nat. Biotechnol. 28(11), 1208-1212; and Song et al, 2012, Analyst, 137, 1396-1401). HCR monomers typically comprise a hairpin, or other metastable nucleic acid structure. In some embodiments, similar to HCR reactions that use hairpin monomers, LO-HCR can be used for signal amplification. Exemplary methods and compositions for LO-HCR are described in US 2021/0198723, incorporated herein by reference in its entirety.

In some aspects, the provided methods comprise imaging the probe hybridized to the nucleic acid concatemer, for example, via binding of the secondary probe (e.g., a detection probe) and detecting the detectable label. In some embodiments, the detection probe comprises a detectable label that can be measured and quantitated. The label or detectable label can comprise a directly or indirectly detectable moiety that is associated with (e.g., conjugated to) a molecule to be detected, e.g., a secondary probe that is a detectable probe, comprising, but not limited to, fluorophores, radioactive isotopes, fluorescers, chemiluminescers, enzymes, enzyme substrates, enzyme cofactors, enzyme inhibitors, chromophores, dyes, metal ions, metal sols, ligands (e.g., biotin or haptens) and the like.

A fluorophore can comprise a substance or a portion thereof that is capable of exhibiting fluorescence in the detectable range. Particular examples of labels that may be used in accordance with the provided embodiments comprise, but are not limited to phycoerythrin, Alexa dyes, fluorescein, YPet, CyPet, Cascade blue, allophycocyanin, Cy3, Cy5, Cy7, rhodamine, dansyl, umbelliferone, Texas red, luminol, acradimum esters, biotin, green fluorescent protein (GFP), enhanced green fluorescent protein (EGFP), yellow fluorescent protein (YFP), enhanced yellow fluorescent protein (EYFP), blue fluorescent protein (BFP), red fluorescent protein (RFP), firefly luciferase, Renilla luciferase, NADPH, beta-galactosidase, horseradish peroxidase, glucose oxidase, alkaline phosphatase, chloramphenical acetyl transferase, and urease.

Fluorescence detection in tissue samples can often be hindered by the presence of strong background fluorescence. Background fluorescence can include autofluorescence (that can arise from a variety of sources, including aldehyde fixation, extracellular matrix components, red blood cells, lipofuscin, and the like) as opposed to the desired immunofluorescence from the fluorescently labeled antibodies or probes. Tissue autofluorescence can lead to difficulties in distinguishing the signals due to fluorescent antibodies or probes from the general background. In some embodiments, a method disclosed herein utilizes one or more agents to reduce tissue autofluorescence, for example, Autofluorescence Eliminator (Sigma/EMD Millipore), TrueBlack Lipofuscin Autofluorescence Quencher (Biotium), MaxBlock Autofluorescence Reducing Reagent Kit (MaxVision Biosciences), and/or a very intense black dye (e.g., Sudan Black, or comparable dark chromophore).

In some embodiments, a detectable probe containing a detectable label can be used to detect one or more nucleic acid concatemer(s) described herein. In some embodiments, the methods involve incubating the detectable probe containing the detectable label with the sample, washing unbound detectable probe, and detecting the label, e.g., by imaging. In some embodiments, the nucleic acid concatemer(s) remain crosslinked to the target nucleic acid during the washing and detecting steps.

Examples of detectable labels comprise but are not limited to various radioactive moieties, enzymes, prosthetic groups, fluorescent markers, luminescent markers, bioluminescent markers, metal particles, protein-protein binding pairs and protein-antibody binding pairs. Examples of fluorescent proteins comprise, but are not limited to, yellow fluorescent protein (YFP), green fluorescence protein (GFP), cyan fluorescence protein (CFP), umbelliferone, fluorescein, fluorescein isothiocyanate, rhodamine, dichlorotriazinylamine fluorescein, dansyl chloride and phycoerythrin.

Examples of bioluminescent markers comprise, but are not limited to, luciferase (e.g., bacterial, firefly and click beetle), luciferin, aequorin and the like. Examples of enzyme systems having visually detectable signals comprise, but are not limited to, galactosidases, glucorimidases, phosphatases, peroxidases and cholinesterases. Identifiable markers also comprise radioactive compounds such as $^{125}I$, $^{35}S$, $^{14}C$, or $^{3}H$. Identifiable markers are commercially available from a variety of sources.

Examples of fluorescent labels and nucleotides and/or polynucleotides conjugated to such fluorescent labels comprise those described in, for example, Hoagland, Handbook of Fluorescent Probes and Research Chemicals, Ninth Edition (Molecular Probes, Inc., Eugene, 2002); Keller and Manak, DNA Probes, 2nd Edition (Stockton Press, New York, 1993); Eckstein, editor, Oligonucleotides and Analogues: A Practical Approach (IRL Press, Oxford, 1991); and Wetmur, Critical Reviews in Biochemistry and Molecular Biology, 26:227-259 (1991). In some embodiments, exemplary techniques and methods methodologies applicable to the provided embodiments comprise those described in, for example, U.S. Pat. Nos. 4,757,141, 5,151,507 and 5,091,519, all of which are herein incorporated by reference in their entireties. In some embodiments, one or more fluorescent dyes are used as labels for labeled target sequences, for example, as described in U.S. Pat. No. 5,188,934 (4,7-dichlorofluorescein dyes); U.S. Pat. No. 5,366,860 (spectrally resolvable rhodamine dyes); U.S. Pat. No. 5,847,162 (4,7-dichlororhodamine dyes); U.S. Pat. No. 4,318,846 (ether-substituted fluorescein dyes); U.S. Pat. No. 5,800,996 (energy transfer dyes); U.S. Pat. No. 5,066,580 (xanthine dyes); and U.S. Pat. No. 5,688,648 (energy transfer dyes), all of which are herein incorporated by reference in their entireties. Labelling can also be carried out with quantum dots, as described in U.S. Pat. Nos. 6,322,901, 6,576,291, 6,423,551, 6,251,303, 6,319,426, 6,426,513, 6,444,143, 5,990,479, 6,207,392, US 2002/0045045 and US 2003/0017264, all of which are incorporated by reference in their entireties. In some embodiments, a fluorescent label comprises a signaling moiety that conveys information through the fluorescent absorption and/or emission properties of one or more molecules. Exemplary fluorescent properties comprise fluorescence intensity, fluorescence lifetime, emission spectrum characteristics and energy transfer.

Examples of commercially available fluorescent nucleotide analogues readily incorporated into nucleotide and/or polynucleotide sequences comprise, but are not limited to, Cy3-dCTP, Cy3-dUTP, Cy5-dCTP, Cy5-dUTP (Amersham Biosciences, Piscataway, N.J.), fluorescein-!2-dUTP, tetramethylrhodamine-6-dUTP, TEXAS RED™-5-dUTP, CASCADE BLUE™-7-dUTP, BODIPY TMFL-14-dUTP, BODIPY TMR-14-dUTP, BODIPY TMTR-14-dUTP, RHOD AMINE GREEN™-5-dUTP, OREGON GREENR™ 488-5-dUTP, TEXAS RED™-12-dUTP, BODIPY™ 630/650-14-dUTP, BODIPY™ 650/665-14-dUTP, ALEXA FLUOR™ 488-5-dUTP, ALEXA FLUOR™ 532-5-dUTP, ALEXA FLUOR™ 568-5-dUTP, ALEXA FLUOR™ 594-5-dUTP, ALEXA FLUOR™ 546-14-dUTP, fluorescein-12-UTP, tetramethylrhodamine-6-UTP, TEXAS RED™-5-UTP, mCherry, CASCADE BLUE™-7-UTP, BODIPY™ FL-14-UTP, BODIPY TMR-14-UTP, BODIPY™ TR-14-UTP, RHOD AMINE GREEN™-5-UTP, ALEXA FLUOR™ 488-5-UTP, and ALEXA FLUOR™ 546-14-UTP (Molecular Probes, Inc. Eugene, Oreg.). Methods are known for custom synthesis of nucleotides having other fluorophores (See, Henegariu et al. (2000) Nature Biotechnol. 18:345).

Other fluorophores available for post-synthetic attachment comprise, but are not limited to, ALEXA FLUOR™ 350, ALEXA FLUOR™ 532, ALEXA FLUOR™ 546, ALEXA FLUOR™ 568, ALEXA FLUOR™ 594, ALEXA FLUOR™ 647, BODIPY 493/503, BODIPY FL, BODIPY R6G, BODIPY 530/550, BODIPY TMR, BODIPY 558/568, BODIPY 558/568, BODIPY 564/570, BODIPY 576/589, BODIPY 581/591, BODIPY 630/650, BODIPY 650/665, Cascade Blue, Cascade Yellow, Dansyl, lissamine rhodamine B, Marina Blue, Oregon Green 488, Oregon Green 514, Pacific Blue, rhodamine 6G, rhodamine green, rhodamine red, tetramethyl rhodamine, Texas Red (available from Molecular Probes, Inc., Eugene, Oreg.), Cy2, Cy3.5, Cy5.5, and Cy7 (Amersham Biosciences, Piscataway, N.J.). FRET tandem fluorophores may also be used, comprising, but not limited to, PerCP-Cy5.5, PE-Cy5, PE-Cy5.5, PE-Cy7, PE-Texas Red, APC-Cy7, PE-Alexa dyes (610, 647, 680), and APC-Alexa dyes.

In some cases, metallic silver or gold particles may be used to enhance signal from fluorescently labeled nucleotide and/or polynucleotide sequences (Lakowicz et al. (2003) Bio Techniques 34:62).

Biotin, or a derivative thereof, may also be used as a label on a nucleotide and/or a polynucleotide sequence, and subsequently bound by a detectably labeled avidin/streptavidin derivative (e.g., phycoerythrin-conjugated streptavidin), or a detectably labeled anti-biotin antibody. Digoxigenin may be incorporated as a label and subsequently bound by a detectably labeled anti-digoxigenin antibody (e.g., fluoresceinated anti-digoxigenin). An aminoallyl-dUTP residue may be incorporated into a polynucleotide sequence and subsequently coupled to an N-hydroxy succinimide (NHS) derivatized fluorescent dye. In general, any member of a conjugate pair may be incorporated into a detection polynucleotide provided that a detectably labeled conjugate partner can be bound to permit detection.

Other suitable labels for a polynucleotide sequence may comprise fluorescein (FAM), digoxigenin, dinitrophenol (DNP), dansyl, biotin, bromodeoxyuridine (BrdU), hexahistidine (6×His), and phosphor-amino acids (e.g., P-tyr, P-ser, P-thr). In some embodiments the following hapten/antibody pairs are used for detection, in which each of the antibodies is derivatized with a detectable label: biotin/a-biotin, digoxigenin/a-digoxigenin, dinitrophenol (DNP)/a-DNP, 5-Carboxyfluorescein (FAM)/a-FAM.

In some embodiments, a nucleotide and/or an oligonucleotide sequence can be indirectly labeled, especially with a hapten that is then bound by a capture agent, e.g., as disclosed in U.S. Pat. Nos. 5,344,757, 5,702,888, 5,354,657, 5,198,537 and 4,849,336, and PCT publication WO 91/17160, all of which are incorporated by reference in their entireties. Many different hapten-capture agent pairs are available for use. Exemplary haptens comprise, but are not limited to, biotin, des-biotin and other derivatives, dinitrophenol, dansyl, fluorescein, Cy5, and digoxigenin. For biotin, a capture agent may be avidin, streptavidin, or antibodies. Antibodies may be used as capture agents for the other haptens (many dye-antibody pairs being commercially available, e.g., Molecular Probes, Eugene, Oreg.).

In some aspects, the detecting involves using detection methods such as flow cytometry; sequencing; probe binding and electrochemical detection; pH alteration; catalysis induced by enzymes bound to DNA tags; quantum entanglement; Raman spectroscopy; terahertz wave technology; and/or scanning electron microscopy. In some aspects, the flow cytometry is mass cytometry or fluorescence-activated flow cytometry. In some aspects, the detecting comprises performing microscopy, scanning mass spectrometry or other imaging techniques described herein. In such aspects, the detecting comprises determining a signal, e.g., a fluorescent signal.

In some aspects, the detection (comprising imaging) is carried out using any of a number of different types of microscopy, e.g., confocal microscopy, two-photon microscopy, light-field microscopy, intact tissue expansion microscopy, and/or CLARITY™-optimized light sheet microscopy (COLM).

In some embodiments, fluorescence microscopy is used for detection and imaging of the detection probe. In some aspects, a fluorescence microscope is an optical microscope that uses fluorescence and phosphorescence instead of, or in addition to, reflection and absorption to study properties of organic or inorganic substances. In fluorescence microscopy, a sample is illuminated with light of a wavelength which excites fluorescence in the sample. The fluoresced light, which is usually at a longer wavelength than the illumination, is then imaged through a microscope objective. Two filters may be used in this technique; an illumination (or excitation) filter which ensures the illumination is near monochromatic and at the correct wavelength, and a second emission (or barrier) filter which ensures none of the excitation light source reaches the detector. Alternatively, these functions may both be accomplished by a single dichroic filter. The fluorescence microscope can be any microscope that uses fluorescence to generate an image, whether it is a more simple set up like an epifluorescence microscope, or a more complicated design such as a confocal microscope, which uses optical sectioning to get better resolution of the fluorescent image.

In some embodiments, confocal microscopy is used for detection and imaging of the detection probe. Confocal microscopy uses point illumination and a pinhole in an optically conjugate plane in front of the detector to eliminate out-of-focus signal. As only light produced by fluorescence very close to the focal plane can be detected, the image's optical resolution, particularly in the sample depth direction, is much better than that of wide-field microscopes. However, as much of the light from sample fluorescence is blocked at the pinhole, this increased resolution is at the cost of decreased signal intensity—so long exposures are often required. As only one point in the sample is illuminated at a time, 2D or 3D imaging requires scanning over a regular raster (e.g., a rectangular pattern of parallel scanning lines) in the specimen. The achievable thickness of the focal plane is defined mostly by the wavelength of the used light divided by the numerical aperture of the objective lens, but also by the optical properties of the specimen. The thin optical sectioning possible makes these types of microscopes particularly good at 3D imaging and surface profiling of samples. CLARITY™-optimized light sheet microscopy (COLM) provides an alternative microscopy for fast 3D imaging of large clarified samples. COLM interrogates large immunostained tissues, permits increased speed of acquisition and results in a higher quality of generated data.

Other types of microscopy that can be employed comprise bright field microscopy, oblique illumination microscopy, dark field microscopy, phase contrast, differential interference contrast (DIC) microscopy, interference reflection microscopy (also known as reflected interference contrast, or RIC), single plane illumination microscopy (SPIM), super-resolution microscopy, laser microscopy, electron microscopy (EM), Transmission electron microscopy (TEM), Scanning electron microscopy (SEM), reflection electron microscopy (REM), Scanning transmission electron microscopy (STEM) and low-voltage electron microscopy (LVEM), scanning probe microscopy (SPM), atomic force microscopy (ATM), ballistic electron emission microscopy (BEEM), chemical force microscopy (CFM), conductive atomic force microscopy (C-AFM), electrochemical scanning tunneling microscope (ECSTM), electrostatic force microscopy (EFM), fluidic force microscope (FluidFM), force modulation microscopy (FMM), feature-oriented scanning probe microscopy (FOSPM), kelvin probe force microscopy (KPFM), magnetic force microscopy (MFM), magnetic resonance force microscopy (MRFM), near-field scanning optical microscopy (NSOM) (or SNOM, scanning near-field optical microscopy, SNOM, Piezoresponse Force Microscopy (PFM), PSTM, photon scanning tunneling microscopy (PSTM), PTMS, photothermal microspectroscopy/microscopy (PTMS), SCM, scanning capacitance microscopy (SCM), SECM, scanning electrochemical microscopy (SECM), SGM, scanning gate microscopy (SGM), SHPM, scanning Hall probe microscopy (SHPM), SICM, scanning ion-conductance microscopy (SICM), SPSM spin polarized scanning tunneling microscopy (SPSM), SSRM, scanning spreading resistance microscopy (SSRM), SThM, scanning thermal microscopy (SThM), STM, scanning tunneling microscopy (STM), STP, scanning tunneling potentiometry (STP), SVM, scanning voltage microscopy (SVM), and synchrotron x-ray scanning tunneling microscopy (SXSTM), and intact tissue expansion microscopy (exM).

In some embodiments, sequencing can be performed in situ. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing are described, for example, in Mitra et al., (2003) *Anal. Biochem.* 320, 55-65, and Lee et al., (2014) *Science,* 343(6177), 1360-1363, the contents are herein incorporated by reference in their entireties. In addition, examples of methods and systems for performing in situ sequencing are described in US 2016/0024555, US 2019/0194709, and in U.S. Pat. Nos. 10,138,509, 10,494,662 and 10,179,932, all of which are herein by reference in their entireties. Exemplary techniques for in situ sequencing or in situ sequence detection comprise, but are not limited to, STARmap (described for example in Wang et al., (2018) *Science,* 361(6499) 5691), MERFISH (described for example in Moffitt, (2016) *Methods in Enzymology,* 572, 1-49), hybridization-based in situ sequencing (HybISS) (described for example in Gyllborg et al., *Nucleic Acids Res* (2020) 48(19):e112, and FISSEQ (described for example in US 2019/0032121), all of which are herein incorporated by reference in their entireties.

In some embodiments, sequencing can be performed by sequencing-by-synthesis (SBS). In some embodiments, a sequencing primer is complementary to sequences at or near the one or more barcode(s). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/0059865, US 2005/0100900, U.S. Pat. No. 9,217,178, US 2009/0118128, US 2012/0270305, US 2013/0260372, and US 2013/0079232, the contents are herein incorporated by reference in their entireties.

In some embodiments, sequence analysis of nucleic acids (e.g., nucleic acids such as probes or RCA products comprising barcode sequences) can be performed by sequential hybridization (e.g., sequencing by hybridization and/or sequential in situ fluorescence hybridization). Sequential fluorescence hybridization can involve sequential hybridization of detectable probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, all of which are incorporated herein by reference. In some embodiments, the methods provided herein can include analyzing the identifier sequences (e.g., analyte sequences or barcode sequences) by sequential hybridization and detection with a plurality of labeled probes (e.g., detection oligonucleotides).

In some embodiments, sequence detection comprises contacting the biological sample with one or more intermediate probes that directly or indirectly hybridize to a rolling circle amplification product, wherein the one or more intermediate probes are detectable using one or more detectably-labeled probes, and dehybridizing the one or more intermediate probes and/or the one or more detectably-labeled probes from the rolling circle amplification product. In some embodiments, the one or more intermediate probes comprise one or more overhang regions (e.g., a 5' and/or 3' end of the probe that does not hybridize to the rolling circle amplification product). A probe comprising a single overhang region may be referred to as an "L-shaped probe," and a probe comprising two overhangs may be referred to as a "U-shaped probe." In some cases, the overhang region comprises a binding region for binding one or more detectably-labeled probes. In some embodiments, the detecting comprises contacting the biological sample with a pool of intermediate probes corresponding to different barcode sequences or portions thereof, and a pool of detectably-labeled probes corresponding to different detectable labels. In some embodiments, the biological sample is sequentially contacted with different pools of intermediate probes. In some instances, a common or universal pool of detectably-labeled probes is used in a plurality of sequential hybridization steps (e.g., with different pools of intermediate probes).

In some embodiments, provided herein are methods for in situ analysis of analytes in a sample using sequential probe hybridization. In some aspects provided herein is a method for analyzing a biological sample, comprising: a) generating a rolling circle amplification product (RCP) of a circular or circularizable probe or probe set described herein (e.g., in Section III), the RCP comprising an identifier sequence such as a barcode sequence or analyte sequence, wherein the identifier sequence is associated with an analyte of interest and is assigned a signal code sequence; b) contacting the biological sample with a first probe (e.g., an intermediate probe such as an L-probe) and a first detectably labeled probe to generate a first complex comprising the first probe hybridized to the RCP and the first detectably labeled probe hybridized to the first probe, wherein the first probe comprises (i) a recognition sequence (e.g., a target-binding sequence) complementary to the identifier sequence (e.g., barcode sequence or analyte sequence) and (ii) a first landing sequence (e.g., an overhang sequence), and wherein the first detectably labeled probe comprises a sequence complementary to the first landing sequence; c) detecting a first signal associated with the first detectably labeled probe, wherein the first signal corresponds to a first signal code in the signal code sequence; d) contacting the biological sample with a second probe (e.g., an intermediate probe such as L-probe) and a second detectably labeled probe to generate a second complex comprising the second probe hybridized to the RCP and the second detectably labeled probe hybridized to the second probe, wherein the second probe comprises (i) a recognition sequence (e.g., a target-binding sequence) complementary to the identifier sequence (e.g., barcode sequence or analyte sequence) and (ii) a second landing sequence (e.g., an overhang sequence), and wherein the second detectably labeled probe comprises a sequence complementary to the second landing sequence; and e) detecting a second signal associated with the second detectably labeled probe, wherein the second signal corresponds to a second signal code in the signal code sequence, wherein the signal code sequence comprising the first signal code and the second signal code is determined at a location in the biological sample, thereby decoding the identifier sequence (e.g., barcode sequence or analyte sequence) and identifying the analyte of interest at the location in the biological sample. In some embodiments, the detectable label of the first detectably labeled probe and the detectable label of the second detectably labeled probe are the same. In some embodiments, the detectable labels of the first detectably labeled probe and the second detectably labeled probe are different. In some embodiments, the first signal code and the second signal code are the same. In some embodiments, the first signal code and the second signal code are different.

In some embodiments, the first probe (e.g., a first intermediate probe such as a first L-probe), the second probe (e.g., a second intermediate probe such as a second L-probe), and one or more subsequent probes (e.g., subsequent intermediate probe such as subsequent L-probes) are contacted with the biological sample sequentially in a predetermined sequence which corresponds to the signal code sequence assigned to the identifier sequence (e.g., barcode sequence or analyte sequence), wherein the one or more subsequent probes each comprises (i) a recognition sequence complementary to the identifier sequence (e.g., barcode sequence or analyte sequence) and (ii) an overhang sequence complementary to a detectably labeled probe of a pool (e.g., a universal pool across different cycles of probe hybridization) of detectably labeled probes. In some embodiments, the biological sample is contacted with the first probe before the second probe and one or more subsequent probes. In some embodiments, the biological sample is contacted with the second after the first probe and before and one or more subsequent probes. In some embodiments, the biological sample is contacted with the one or more subsequent probes after the first probe. In some embodiments, the biological sample is contacted with the one or more subsequent probes after the first probe and the second probe.

In some embodiments, the first detectably labeled probe and the second detectably labeled probe are in the pool of detectably labeled probes. A pool of detectably labeled probes may comprises at least two detectably labeled probes, and may be used for multiplexing analyses of two or more target analytes (e.g., target nucleic acids) in a biological sample. In some embodiments, the contacting in b) comprises contacting the biological sample with the universal pool of detectably labeled probes, and the contacting in d) comprises contacting the biological sample with the universal pool of detectably labeled probes. In some embodiments, the universal pool of detectably labeled probes used in the contacting in b) is the same as the universal pool of detectably labeled probes used in the contacting in d). In some embodiments, the universal pool comprises detectably labeled probes each having a detectable label corresponding to a different nucleic acid sequence for hybridization to a landing sequence (e.g., an overhang sequence) in a probe (e.g., an intermediate probe such as an L-probe). In some embodiments, the number of different detectably labeled probes in the universal pool is four.

In some embodiments, the one or more subsequent probes are contacted with the biological sample to determine signal codes in the signal code sequence until sufficient signal codes have been determined to decode the identifier sequence (e.g., barcode sequence or analyte sequence), thereby identifying the target analyte (e.g., target nucleic acid). In some embodiments, the method further comprises a step of removing the first probe and/or the first detectably labeled probe from the biological sample before contacting the sample with a subsequent probe and a detectably labeled probe hybridizing to the subsequent probe. In some embodiments, the method further comprises a step of removing the second probe and/or the second detectably labeled probe from the biological sample, before contacting the sample with a subsequent probe and a detectably labeled probe hybridizing to the subsequent probe.

In some embodiments, the method further comprises identifying multiple different target analytes present at locations (e.g., different locations) in the biological sample. In some embodiments, each different target analyte is assigned a different signal code sequence and is targeted by a circular or circularizable probe or probe set (e.g., described in Section III) comprising a complement of a different barcode sequence of the plurality of barcode sequences. In some embodiments, the number of different probes (e.g., L-probes that have different recognition sequences that bind to the barcode sequences) in each pool of probes is greater than the number of different detectably labeled probes in the universal pool of detectably labeled probes. In some embodiments, the number of different detectably labeled probes in the universal pool is four. In some embodiments, the number of different probes in each pool of probes (e.g., L-probes) is about 10, about 20, about 30, about 40, about 50, about 100, about 200, about 500, about 1,000, or more. In some embodiments, the number of different recognition sequences (e.g., recognition sequences that bind to the barcode sequences) of probes in each pool of probes in at least about 10, such as at least any of about 20, 30, 40, 50, 100, 200, 500, 1,000, or more.

In some embodiments, sequence determination can be performed using single molecule sequencing by ligation. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. *Science* (2005), 309: 1728-1732, and in U.S. Pat. Nos. 5,599,675; 5,750,341; 6,969,488; 6,172,218; and 6,306,597, the contents are herein incorporated by reference in their entireties.

In some embodiments, the barcodes of the detection probes are targeted by detectably labeled secondary probe oligonucleotides, such as fluorescently labeled oligonucleotides. In some embodiments, one or more decoding schemes are used to decode the signals, such as fluorescence, for sequence determination. In any of the embodiments herein, barcodes (e.g., primary and/or secondary barcode sequences) can be analyzed (e.g., detected or sequenced) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides). Exemplary decoding schemes are described in Eng et al., "Transcriptome-scale Super-Resolved Imaging in Tissues by RNA SeqFISH+," *Nature* 568(7751):235-239 (2019); Chen et al., "Spatially resolved, highly multiplexed RNA profiling in single cells," *Science;* 348(6233):aaa6090 (2015); Gyllborg et al., *Nucleic Acids Res* (2020) 48(19):e112; WO 2018/026873; U.S. Pat. No. 10,457,980; US Patent Publications 2016/0369329; and US 2017/0220733, all of which are incorporated by reference in their entireties. In some embodiments, these assays enable signal amplification, combinatorial decoding, and error correction schemes at the same time.

In some embodiments, nucleic acid hybridization can be used for sequence determination. These methods utilize labeled nucleic acid decoder probes that are complementary to at least a portion of a barcode sequence. Multiplex decoding can be performed with pools of many different probes with distinguishable labels. Non-limiting examples of nucleic acid hybridization sequencing are described for example in U.S. Pat. No. 8,460,865, and in Gunderson et al., *Genome Research* 14:870-877 (2004), all of which are herein incorporated by reference in their entireties.

In some embodiments, real-time monitoring of DNA polymerase activity can be used during sequence determination. For example, nucleotide incorporations can be detected through fluorescence resonance energy transfer (FRET), as described for example in Levene et al., *Science* (2003), 299, 682-686, Lundquist et al., *Opt. Lett.* (2008), 33, 1026-1028, and Korlach et al., *Proc. Natl. Acad. Sci. USA* (2008), 105, 1176-1181, all of which are herein incorporated by reference in their entireties.

In some aspects, the analysis and/or sequence determination can be carried out at room temperature for best preservation of tissue morphology with low background noise and error reduction. In some embodiments, the analysis and/or sequence determination comprises eliminating error accumulation as sequencing proceeds.

In some embodiments, the analysis and/or sequence determination involves washing to remove unbound polynucleotides, thereafter revealing a fluorescent product for imaging.

VI. Compositions, Kits, and Systems

In some embodiments, disclosed herein is a composition that comprises a complex containing a target nucleic acid (e.g., a target nucleic amplification product, such as a rolling circle amplification product), an oligonucleotide probe, and a recognition site of a nucleic acid concatemer, e.g., any of the target nucleic acids, oligonucleotide probes, and circular probes described in Section IV. In some embodiments, the complex further comprises a secondary probe (e.g., a detection probe), e.g., as described in Section V. In some embodiments, the end of one or more oligonucleotide probes hybridized to a nucleic acid concatemer are connected, such that the nucleic acid concatemer is stabilized and/or compacted.

Also provided herein are kits, for example comprising one or more oligonucleotide probes, e.g., any described in Section IV, and instructions for performing the methods provided herein. In some embodiments, the kit further comprises one or more reagents for performing the methods provided herein (e.g., biotin, nucleotides modified using a biotin moiety or analog thereof, or streptavidin or analog thereof) In some embodiments, the kits further comprise one or more reagents required for one or more steps comprising hybridization, ligation, extension, detection, sequencing, and/or sample preparation as described herein. In some embodiments, the kit further comprises a target nucleic acid, e.g., any described in Sections III and IV. In some embodiments, any or all of the oligonucleotides are DNA molecules. In some embodiments, the target nucleic acid is a messenger RNA molecule. In some embodiments, the target nucleic acid is a probe (e.g., a padlock probe) or an amplification product thereof (e.g., a rolling circle amplification product, such as a nucleic acid concatemer). The various components of the kit may be present in separate containers or certain compatible components may be pre-combined into a single container. In some embodiments, the kits further contain instructions for using the components of the kit to practice the provided methods.

In some embodiments, the kits can contain reagents and/or consumables required for performing one or more steps of the provided methods. In some embodiments, the kits contain reagents for fixing, embedding, and/or permeabilizing the biological sample. In some embodiments, the kits contain reagents, such as enzymes and buffers for ligation and/or amplification, such as ligases and/or polymerases. In some aspects, the kit can also comprise any of the reagents described herein, e.g., wash buffer and ligation buffer. In some embodiments, the kits contain reagents for detection and/or sequencing, such as barcode detection probes or detectable labels. In some embodiments, the kits optionally contain other components, for example nucleic acid primers, enzymes and reagents, buffers, nucleotides, and reagents for additional assays.

VII. Applications

In some aspects, the provided embodiments can be applied in an in situ method of analyzing nucleic acid sequences, such as an in situ transcriptomic analysis or in situ sequencing, for example from intact tissues or samples in which the spatial information has been preserved. In some aspects, the embodiments can be applied in an imaging or detection method for multiplexed nucleic acid analysis. In some aspects, the provided embodiments can be used to compact nucleic acid concatemers via compaction probes, to increase the resolution and stability of the nucleic acid concatemers in situ.

In some aspects, the embodiments can be applied in investigative and/or diagnostic applications, for example, for characterization or assessment of particular cell or a tissue from a subject. Applications of the provided method can comprise biomedical research and clinical diagnostics. For example, in biomedical research, applications comprise, but are not limited to, spatially resolved gene expression analysis for biological investigation or drug screening. In clinical diagnostics, applications comprise, but are not limited to, detecting gene markers such as disease, immune responses, bacterial or viral DNA/RNA for patient samples.

In some aspects, the embodiments can be applied to visualize the distribution of genetically encoded markers in whole tissue at subcellular resolution, for example, chromosomal abnormalities (inversions, duplications, translocations, etc.), loss of genetic heterozygosity, the presence of gene alleles indicative of a predisposition towards disease or good health, likelihood of responsiveness to therapy, or in personalized medicine or ancestry.

VIII. Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

The terms "polynucleotide," "polynucleotide," and "nucleic acid molecule", used interchangeably herein, refer to polymeric forms of nucleotides of any length, either ribonucleotides or deoxyribonucleotides. Thus, this term comprises, but is not limited to, single-, double-, or multi-stranded DNA or RNA, genomic DNA, cDNA, DNA-RNA hybrids, or a polymer comprising purine and pyrimidine bases or other natural, chemically or biochemically modified, non-natural, or derivatized nucleotide bases. The backbone of the polynucleotide can comprise sugars and phosphate groups (as may typically be found in RNA or DNA), or modified or substituted sugar or phosphate groups.

"Hybridization" as used herein may refer to the process in which two single-stranded polynucleotides bind non-covalently to form a stable double-stranded polynucleotide. In one aspect, the resulting double-stranded polynucleotide can be a "hybrid" or "duplex." "Hybridization conditions" typically include salt concentrations of approximately less than 1 M, often less than about 500 mM and may be less than about 200 mM. A "hybridization buffer" includes a buffered salt solution such as 5% SSPE, or other such suitable buffers. Hybridization temperatures can be as low as 5° C., but are typically greater than 22° C., and more typically greater than about 30° C., and typically in excess of 37° C. Hybridizations are often performed under stringent conditions, e.g., conditions under which a sequence will hybridize to its target sequence but will not hybridize to other, non-complementary sequences. Stringent conditions are sequence-dependent and are different in different circumstances. For example, longer fragments may require higher hybridization temperatures for specific hybridization than short fragments. As other factors may affect the stringency of hybridization, including base composition and length of the complementary strands, presence of organic solvents, and the extent of base mismatching, the combination of parameters is more important than the absolute measure of any one parameter alone. Generally stringent conditions are selected to be about 5° C. lower than the $T_m$ for the specific sequence at a defined ionic strength and pH. The melting temperature $T_m$ can be the temperature at which a population of double-stranded nucleic acid molecules becomes half dissociated into single strands. There are several equations for calculating the $T_m$ of nucleic acids. As indicated by standard references, a simple estimate of the $T_m$ value may be calculated by the equation, $T_m=81.5+0.41$ (% G+C), when a nucleic acid is in aqueous solution at 1 M NaCl (see e.g., Anderson and Young, Quantitative Filter Hybridization, in Nucleic Acid Hybridization (1985)). Other references (e.g., Allawi and SantaLucia, Jr., Biochemistry, 36:10581-94 (1997)) include alternative methods of computation which take structural and environmental, as well as sequence characteristics into account for the calculation of $T_m$.

In general, the stability of a hybrid is a function of the ion concentration and temperature. Typically, a hybridization reaction is performed under conditions of lower stringency, followed by washes of varying, but higher, stringency. Exemplary stringent conditions include a salt concentration of at least 0.01 M to no more than 1 M sodium ion concentration (or other salt) at a pH of about 7.0 to about 8.3 and a temperature of at least 25° C. For example, conditions of 5×SSPE (750 mM NaCl, 50 mM sodium phosphate, 5 mM EDTA at pH 7.4) and a temperature of approximately 30° C. are suitable for allele-specific hybridizations, though a suitable temperature depends on the length and/or GC content of the region hybridized. In one aspect, "stringency of hybridization" in determining percentage mismatch can be as follows: 1) high stringency: 0.1×SSPE, 0.1% SDS, 65° C.; 2) medium stringency: 0.2×SSPE, 0.1% SDS, 50° C. (also referred to as moderate stringency); and 3) low stringency: 1.0×SSPE, 0.1% SDS, 50° C. It is understood that equivalent stringencies may be achieved using alternative buffers, salts and temperatures. For example, moderately stringent hybridization can refer to conditions that permit a nucleic acid molecule such as a probe to bind a complementary nucleic acid molecule. The hybridized nucleic acid molecules generally have at least 60% identity, including for example at least any of 70%, 75%, 80%, 85%, 90%, or 95% identity. Moderately stringent conditions can be conditions equivalent to hybridization in 50% formamide, 5×Denhardt's solution, 5×SSPE, 0.2% SDS at 42° C., followed by washing in 0.2×SSPE, 0.2% SDS, at 42° C. High stringency conditions can be provided, for example, by hybridization in 50% formamide, 5×Denhardt's solution, 5×SSPE, 0.2% SDS at 42° C., followed by washing in 0.1×SSPE, and 0.1% SDS at 65° C. Low stringency hybridization can refer to conditions equivalent to hybridization in 10% formamide, 5×Denhardt's solution, 6×SSPE, 0.2% SDS at 22° C., followed by washing in 1×SSPE, 0.2% SDS, at 37° C. Denhardt's solution contains 1% Ficoll, 1% polyvinylpyrolidone, and 1% bovine serum albumin (BSA). 20×SSPE (sodium chloride, sodium phosphate, ethylene diamide tetraacetic acid (EDTA)) contains 3M sodium chloride, 0.2M sodium phosphate, and 0.025 M EDTA. Other suitable moderate stringency and high stringency hybridization buffers and conditions are described, for example, in Sambrook et al., Molecular Cloning: A Laboratory Manual, 2nd ed., Cold Spring Harbor Press, Plainview, N.Y. (1989); and Ausubel et al., Short Protocols in Molecular Biology, 4th ed., John Wiley & Sons (1999).

Alternatively, substantial complementarity exists when an RNA or DNA strand will hybridize under selective hybridization conditions to its complement. Typically, selective hybridization will occur when there is at least about 65% complementary over a stretch of at least 14 to 25 nucleotides, preferably at least about 75%, more preferably at least about 90% complementary. See M. Kanehisa, Nucleic Acids Res. 12:203 (1984).

A "primer" used herein can be an oligonucleotide, either natural or synthetic, that is capable, upon forming a duplex with a polynucleotide template, of acting as a point of initiation of nucleic acid synthesis and being extended from its 3' end along the template so that an extended duplex is formed. The sequence of nucleotides added during the extension process is determined by the sequence of the template polynucleotide. Primers usually are extended by a DNA polymerase.

"Ligation" may refer to the formation of a covalent bond or linkage between the termini of two or more nucleic acids, e.g., oligonucleotides and/or polynucleotides, in a template-driven reaction. The nature of the bond or linkage may vary widely and the ligation may be carried out enzymatically or chemically. As used herein, ligations are usually carried out enzymatically to form a phosphodiester linkage between a 5' carbon terminal nucleotide of one oligonucleotide with a 3' carbon of another nucleotide.

"Sequencing," "sequence determination" and the like means determination of information relating to the nucleotide base sequence of a nucleic acid. Such information may include the identification or determination of partial as well as full sequence information of the nucleic acid. Sequence information may be determined with varying degrees of statistical reliability or confidence. In one aspect, the term includes the determination of the identity and ordering of a plurality of contiguous nucleotides in a nucleic acid. "High throughput digital sequencing" or "next generation sequencing" means sequence determination using methods that determine many (typically thousands to billions) of nucleic acid sequences in an intrinsically parallel manner, e.g., where DNA templates are prepared for sequencing not one at a time, but in a bulk process, and where many sequences are read out preferably in parallel, or alternatively using an ultra-high throughput serial process that itself may be parallelized. Such methods include but are not limited to pyrosequencing (for example, as commercialized by 454 Life Sciences, Inc., Branford, Conn.); sequencing by ligation (for example, as commercialized in the SOLiD™ technology, Life Technologies, Inc., Carlsbad, Calif.); sequencing by synthesis using modified nucleotides (such as commercialized in TruSeq™ and HiSeq™ technology by Illumina, Inc., San Diego, Calif.; HeliScope™ by Helicos Biosciences Corporation, Cambridge, Ma.; and PacBio RS by Pacific Biosciences of California, Inc., Menlo Park, Calif.), sequencing by ion detection technologies (such as Ion Torrent™ technology, Life Technologies, Carlsbad, Calif.); sequencing of DNA nanoballs (Complete Genomics, Inc., Mountain View, Calif.); nanopore-based sequencing technologies (for example, as developed by Oxford Nanopore Technologies, LTD, Oxford, UK), and like highly parallelized sequencing methods.

"Multiplexing" or "multiplex assay" herein may refer to an assay or other analytical method in which the presence and/or amount of multiple targets, e.g., multiple nucleic acid target sequences, can be assayed simultaneously by using more than one probes, each of which has at least one different detection characteristic, e.g., fluorescence characteristic (for example excitation wavelength, emission wavelength, emission intensity, FWHM (full width at half maximum peak height), or fluorescence lifetime) or a unique nucleic acid or protein sequence characteristic.

The term "fluorescent label" comprises a signaling moiety that conveys information through the fluorescent absorption and/or emission properties of one or more molecules.

The term antibody comprises an antibody molecule of any class, or any sub-fragment thereof, such as an Fab.

The term "about" as used herein refers to the usual error range for the respective value readily known to the skilled person in this technical field. Reference to "about" a value or parameter herein comprises (and describes) embodiments that are directed to that value or parameter per se.

As used herein, the singular forms "a," "an," and "the" comprise plural referents unless the context clearly dictates otherwise. For example, "a" or "an" means "at least one" or "one or more."

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be comprised in the smaller ranges, and are also encompassed within the claimed subject matter, subject to any specifically excluded limit in the stated range. Where the stated range comprises one or both of the limits, ranges excluding either or both of those comprised limits are also comprised in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

Examples

The following examples are included for illustrative purposes only and are not intended to limit the scope of the present disclosure.

Example 1: Incorporation of Biotin-dATP into the RCA Product

In this example, FIG. 1 depicts incorporation of biotin-dATP into the rolling circle amplification (RCA) product. A biological sample (e.g., a processed or cleared biological sample, a tissue sample, a sample embedded in a hydrogel, etc.) is contacted with a primary probe, such as a circular probe or a circularizable probe or probe set (e.g., a padlock probe). Padlock probes can be hybridized to a target nucleic acid sequence, such as an mRNA or cDNA, in the tissue sample and are ligated to generate a closed circle from each padlock probe. The closed circle is then amplified by a polymerase in a RCA reaction to generate a RCP incorporating biotinylated nucleotides. While biotinylated dATP is depicted, other nucleotides such as biotinylated dTTP, dUTP, dCTP, and dGTP can be utilized for nucleotide incorporation following ligation of padlock probes, and RCA step. Ratio of non-biotinylated nucleotides to dATP can be 4000:1 (e.g., much greater concentration of non-biotinylated nucleotides to biotinylated nucleotides).

Example 2: Addition of Streptavidin Leads to Binding of Biotin and Compaction of the RCA Product In another example, FIG. 2 depicts addition of streptavidin leads to binding of biotin moieties in an RCA product and compaction of the RCA product. Exemplary biotin-conjugated dNTPs include biotin-dUTP, and biotin-14-dATP (a dATP analog with biotin attached at the 6-position of the purine base by a 14-atom linker). One or more different biotin-conjugated dNTPs can be incorporated into RCA product at random sites during the RCA reaction. The addition of streptavidin leads to high affinity binding to the biotin moieties in the RCA product. Biotinylated nucleotides (e.g., dATP, dUTP, or any one or more other biotinylated nucleotides) from random segments can be bound to streptavidin along with other segments of the RCA product at high affinity. In some examples, the streptavidin is provided as a homo-tetramer, and this configuration allows up to four biotin moieties to bind to the streptavidin, thereby compacting the RCA product by bringing random segments of RCA product into proximity with other segments, centered around the streptavidin.

Figure 3A:
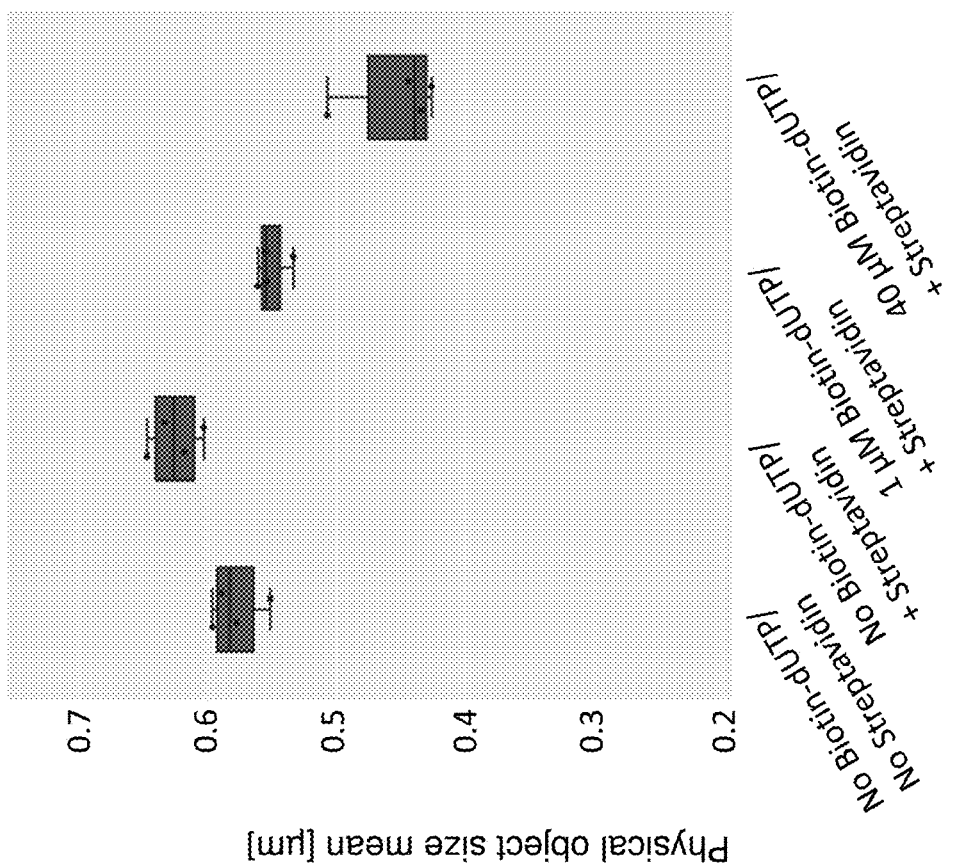
FIGS. 3A-3C depict a concentration dependent effect on the size of RCA products of including biotin-dNTP (e.g., biotin-dUTP) in the RCA reaction.
Figure 3B:
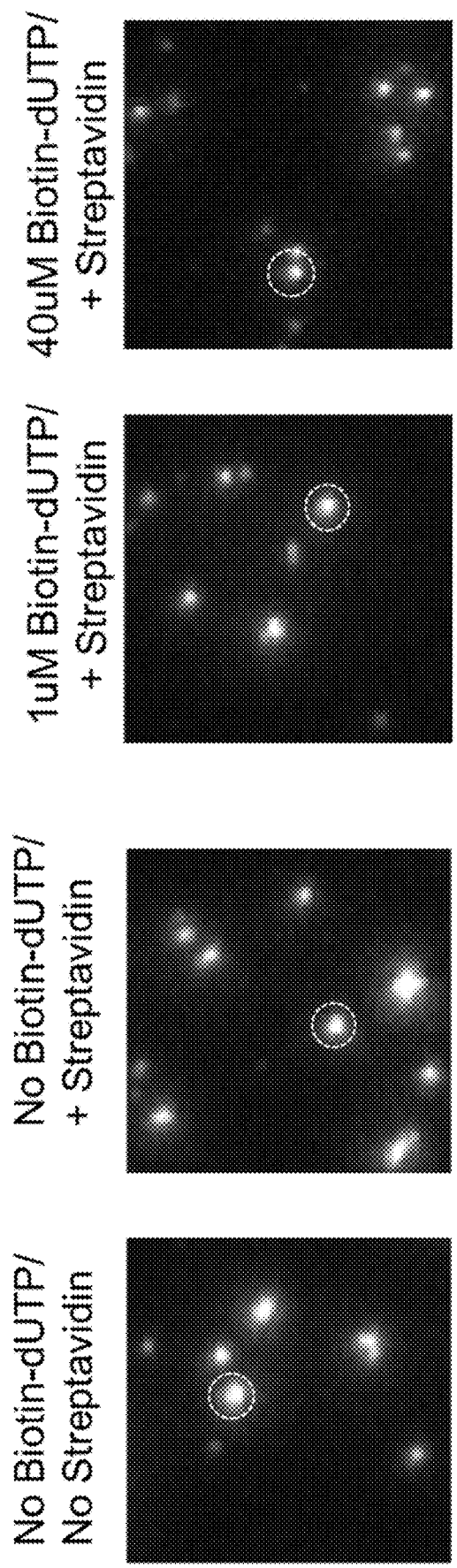
Figure 3C:
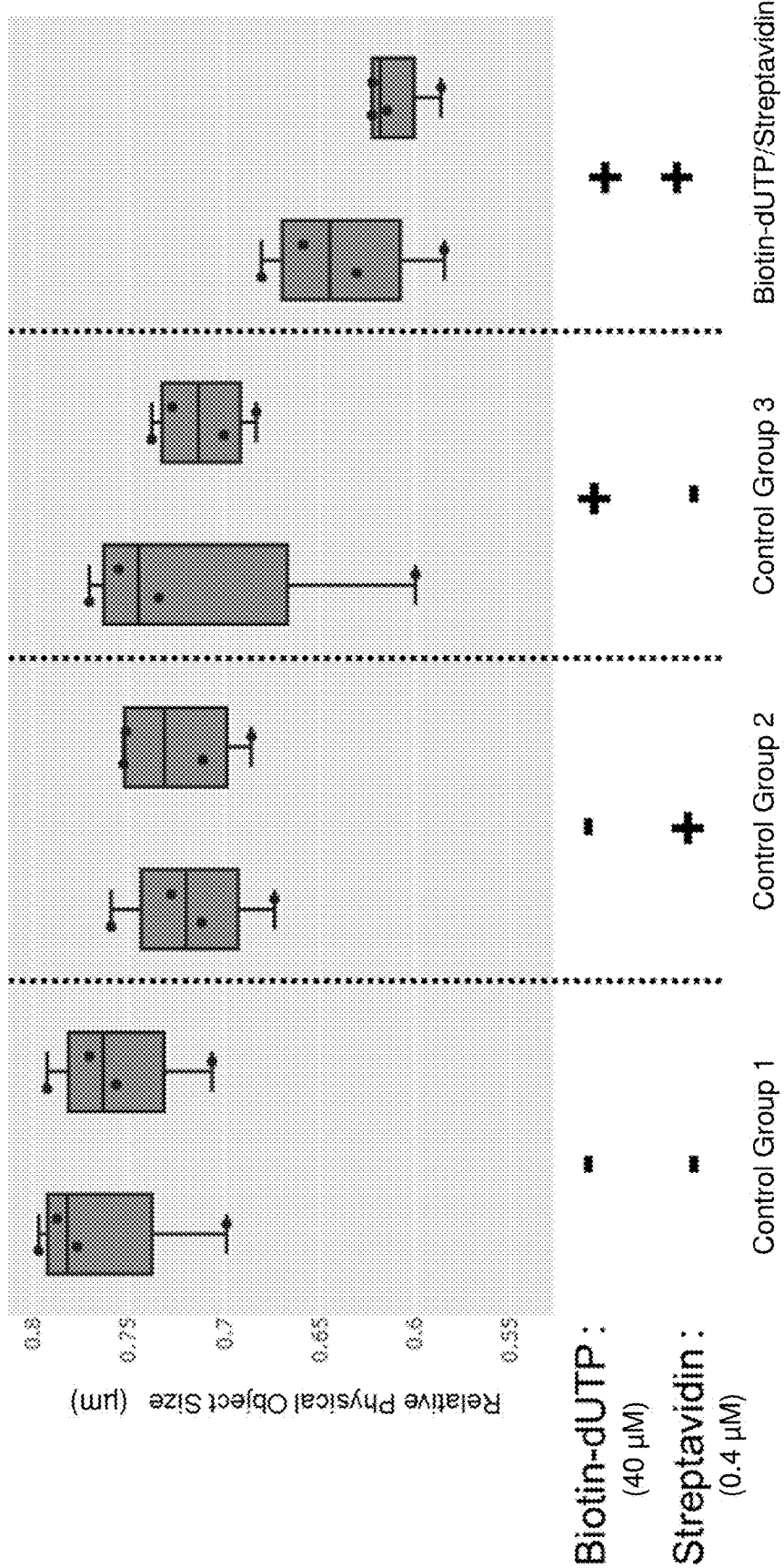

Physical object sizes of RCA products were measured in groups where biotin-dUTP was spiked in the RCA dNTP mix and streptavidin was added to bind to the biotin moieties in the RCA products. The RCA product sizes were compared to those measured in Control Group 1 (no biotin-dUTP in the dNTP mix for RCA and no streptavidin added), Control Group 2 (no biotin-dUTP in the RCA dNTP mix for RCA, streptavidin added to the sample containing RCA products), and Control Group 3 (biotin-dUTP in the RCA dNTP mix for RCA, no streptavidin added to the sample). FIG. 3A demonstrates the means of RCA product sizes, showing the mean of the physical object size decreased as the biotin-dUTP concentration in RCA increased from 1 μM to 40 μM. The RCA product sizes with addition of biotin-dUTP and streptavidin were smaller than those in Control Group 1 and Control Group 2. Images depicting exemplary RCA products are shown in FIG. 3B. FIG. 3C demonstrates that the relative physical object size (e.g., RCA product size) was smallest when biotin-dUTP was spiked in the RCA dNTP mix and streptavidin was added to bind to the biotin moieties in the RCA products. Control Group 1 (no biotin-dUTP and no streptavidin), Control Group 2 (no biotin-dUTP, streptavidin only), and Control Group 3 (biotin-dUTP only and no streptavidin) all led to larger RCA product sizes. Two replicates are shown for each group. These results demonstrate that binding of biotin moieties in the RCA product by streptavidin can lead to smaller RCA product size.

The present disclosure is not intended to be limited in scope to the particular disclosed embodiments, which are provided, for example, to illustrate various aspects of the disclosure. Various modifications to the compositions and methods described will become apparent from the description and teachings herein. Such variations may be practiced without departing from the true scope and spirit of the disclosure and are intended to fall within the scope of the present disclosure.

The invention claimed is:

1. A method, comprising:
    generating a rolling circle amplification (RCA) product by performing a rolling circle amplification (RCA) reaction on a template nucleic acid molecule, wherein the RCA product comprises a biotin moiety conjugated to one or more nucleotides of the RCA product; and
    adding unconjugated avidin or unconjugated streptavidin to the RCA product, thereby generating a compacted RCA product.

2. The method of claim 1, wherein the RCA reaction comprises incorporating non-biotinylated nucleotides and one or more biotinylated nucleotides into the RCA product to generate the RCA product comprising the biotin moiety.

3. The method of claim 2, wherein the one or more biotinylated nucleotides comprise a biotinylated dATP, a biotinylated dCTP, a biotinylated dGTP, and/or a biotinylated dUTP.

4. The method of claim 2, wherein the ratio of the non-biotinylated nucleotides to the biotinylated nucleotide(s) is between 100:1 and 10,000:1.

5. The method of claim 2, wherein the ratio of the non-biotinylated nucleotides to the biotinylated nucleotide(s) is 4000:1.

6. The method of claim 2, wherein the biotin moiety conjugated to one or more nucleotides comprises a linker of 7 to 14 atoms.

7. The method of claim 2, wherein the unconjugated avidin or the unconjugated streptavidin is added to the RCA product in the presence of $MgCl_2$ at a concentration of between 50 mM to 1 M.

8. The method of claim 1, wherein the template nucleic acid molecule is a circular molecule or circularized molecule.

9. The method of claim 8, wherein the template nucleic acid molecule is a circularized molecule and the circularized molecule is a circularized probe generated from a circularizable probe or probe set.

10. The method of claim 9, wherein the circularized probe is a circularized padlock probe complementary to a target nucleic acid molecule, and wherein the method further comprises hybridizing said padlock probe to said target nucleic acid molecule and circularizing said padlock probe to generate said circularized probe.

11. The method of claim 10, wherein the target nucleic acid molecule is an RNA molecule.

12. The method of claim 11, wherein the RNA molecule is an mRNA molecule.

13. The method of claim 10, wherein the target nucleic acid molecule is a complementary DNA (cDNA) molecule.

14. The method of claim 10, wherein the target nucleic acid molecule is in a biological sample comprising a plurality of cells.

15. The method of claim 14, wherein the biological sample is or is derived from a fresh, fresh frozen or formalin-fixed paraffin embedded (FFPE) tissue.

16. The method of claim 1, comprising detecting the compacted RCA product.

17. The method of claim 1, wherein generating the compacted RCA product reduces the size of the RCA product by about 20%.

18. A method for analysis, comprising:
    (a) contacting a biological sample with a probe to provide the probe bound to a target nucleic acid molecule;
    (b) generating a rolling circle amplification (RCA) product in said biological sample by performing a rolling circle amplification (RCA) reaction using said probe as a template, wherein the RCA product comprises a biotin moiety conjugated to one or more nucleotides of the RCA product;
    (c) using unconjugated avidin or unconjugated streptavidin to generate a compacted RCA product; and
    (d) detecting the compacted RCA product.

19. The method of claim 18, wherein the probe is a circular probe.

20. The method of claim 18, wherein the probe is a circularizable probe, wherein the method further comprises, prior to the generating in step (b), circularizing the circularizable probe.

* * * * *